(12) United States Patent
Dua et al.

(10) Patent No.: US 12,495,851 B2
(45) Date of Patent: Dec. 16, 2025

(54) APPAREL AND OTHER PRODUCTS INCORPORATING A THERMOPLASTIC POLYMER MATERIAL

(71) Applicant: NIKE, Inc., Beaverton, OR (US)

(72) Inventors: Bhupesh Dua, Portland, OR (US); Carrie L. Davis, Portland, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 18/353,645

(22) Filed: Jul. 17, 2023

(65) Prior Publication Data
US 2024/0081451 A1 Mar. 14, 2024

Related U.S. Application Data

(63) Continuation of application No. 15/339,485, filed on Oct. 31, 2016, now Pat. No. 11,779,071, which is a
(Continued)

(51) Int. Cl.
*A41D 27/24* (2006.01)
*A41B 1/00* (2006.01)
(Continued)

(52) U.S. Cl.
CPC ............ *A41D 27/245* (2013.01); *A41B 1/00* (2013.01); *A43B 1/028* (2022.01); *A43B 9/02* (2013.01);
(Continued)

(58) Field of Classification Search
CPC .... A43B 1/04; A43B 1/02; A43B 1/14; A43B 1/028; A43B 1/00; A43B 1/0063;
(Continued)

(56) References Cited

U.S. PATENT DOCUMENTS

| 236,323 A | 1/1881 | Graf |
| 610,390 A | 9/1898 | Felbel |

(Continued)

FOREIGN PATENT DOCUMENTS

| CA | 2489217 A1 | 12/2003 |
| CA | 2483333 A1 | 4/2005 |

(Continued)

OTHER PUBLICATIONS

Estane® 2355-75A Technical Data Sheet, https://plastics.ulprospector.com/datasheel/e7702/estane-2355-75a-tpu, 3 pp, accessed Jun. 29, 2020.
(Continued)

*Primary Examiner* — Uyen T Nguyen
(74) *Attorney, Agent, or Firm* — Bookoff McAndrews, PLLC

(57) ABSTRACT

A yarn or thread may include a plurality of substantially aligned filaments, with at least ninety-five percent of a material of the filaments being a thermoplastic polymer material. Various woven textiles and knitted textiles may be formed from the yarn or thread. The woven textiles or knitted textiles may be thermal bonded to other elements to form seams. A strand that is at least partially formed from a thermoplastic polymer material may extend through the seam, and the strand may be thermal bonded at the seam. The woven textiles or knitted textiles may be shaped or molded, incorporated into products, and recycled to form other products.

20 Claims, 48 Drawing Sheets

Related U.S. Application Data continuation of application No. 13/438,554, filed on Apr. 3, 2012, now abandoned.

(51) Int. Cl.

| | | |
|---|---|---|
| *A43B 1/028* | (2022.01) | |
| *A43B 9/02* | (2006.01) | |
| *A43B 23/02* | (2006.01) | |
| *A43B 23/04* | (2006.01) | |
| *A43C 1/04* | (2006.01) | |
| *A43C 3/00* | (2006.01) | |
| *A43C 5/00* | (2006.01) | |
| *A43D 8/24* | (2006.01) | |
| *B29C 65/00* | (2006.01) | |
| *B29C 65/18* | (2006.01) | |
| *B29C 65/20* | (2006.01) | |
| *B29C 65/62* | (2006.01) | |
| *B29C 65/72* | (2006.01) | |
| *B29D 35/02* | (2010.01) | |
| *B29D 35/12* | (2010.01) | |
| *B29L 31/48* | (2006.01) | |
| *B29L 31/50* | (2006.01) | |
| *D02G 3/40* | (2006.01) | |
| *D03D 15/283* | (2021.01) | |
| *D03D 15/587* | (2021.01) | |
| *D04B 1/16* | (2006.01) | |

(52) U.S. Cl.
CPC ...... *A43B 23/0205* (2013.01); *A43B 23/0215* (2013.01); *A43B 23/025* (2013.01); *A43B 23/0255* (2013.01); *A43B 23/042* (2013.01); *A43C 1/04* (2013.01); *A43C 3/00* (2013.01); *A43C 5/00* (2013.01); *A43D 8/24* (2013.01); *B29C 65/18* (2013.01); *B29C 65/20* (2013.01); *B29C 65/62* (2013.01); *B29C 65/72* (2013.01); *B29C 66/1122* (2013.01); *B29C 66/1282* (2013.01); *B29C 66/12841* (2013.01); *B29C 66/133* (2013.01); *B29C 66/135* (2013.01); *B29C 66/14* (2013.01); *B29C 66/223* (2013.01); *B29C 66/244* (2013.01); *B29C 66/43* (2013.01); *B29C 66/431* (2013.01); *B29C 66/45* (2013.01); *B29C 66/472* (2013.01); *B29C 66/729* (2013.01); *B29C 66/73116* (2013.01); *B29C 66/73118* (2013.01); *B29C 66/7392* (2013.01); *B29C 66/73921* (2013.01); *B29C 66/81422* (2013.01); *B29C 66/81423* (2013.01); *B29C 66/81435* (2013.01); *B29C 66/83221* (2013.01); *B29C 66/91411* (2013.01); *B29C 66/91443* (2013.01); *B29C 66/91933* (2013.01); *B29C 66/91935* (2013.01); *B29C 66/91943* (2013.01); *B29C 66/91951* (2013.01); *B29D 35/02* (2013.01); *B29D 35/126* (2013.01); *D02G 3/402* (2013.01); *D03D 15/283* (2021.01); *D03D 15/587* (2021.01); *D04B 1/16* (2013.01); *A41D 2300/326* (2013.01); *A41D 2300/52* (2013.01); *A41D 2500/10* (2013.01); *A41D 2500/20* (2013.01); *A41D 2500/52* (2013.01); *B29C 66/71* (2013.01); *B29C 66/727* (2013.01); *B29C 66/7294* (2013.01); *B29K 2313/00* (2013.01); *B29L 2031/48* (2013.01); *B29L 2031/4842* (2013.01); *B29L 2031/50* (2013.01); *D10B 2331/10* (2013.01); *D10B 2401/041* (2013.01); *Y10T 428/19* (2015.01)

(58) Field of Classification Search
CPC .... A43B 9/02; A43B 9/16; A43B 9/18; A43B 9/20; A43B 23/0205; A43B 23/0215; A43B 23/025; A43B 23/0255; A43B 23/042; A43B 13/04
See application file for complete search history.

(56) References Cited

U.S. PATENT DOCUMENTS

| | | |
|---|---|---|
| 1,077,556 A | 11/1913 | Richards |
| 2,440,393 A | 4/1948 | Clark |
| 2,536,163 A | 1/1951 | Feild, Jr. et al. |
| 2,763,759 A | 9/1956 | Sanai et al. |
| 3,100,926 A | 8/1963 | Richmond |
| 3,249,129 A | 5/1966 | Renfroe |
| 3,375,156 A | 3/1968 | Edgar, Jr. |
| 3,389,446 A | 6/1968 | Parrish |
| 3,415,919 A | 12/1968 | Kippan |
| 3,617,417 A | 11/1971 | Olson |
| 3,635,625 A | 1/1972 | Voss |
| 3,681,826 A | 8/1972 | Bergwerk |
| 3,694,873 A | 10/1972 | Crowley |
| 3,785,915 A | 1/1974 | Closson |
| 3,790,439 A | 2/1974 | Zosel et al. |
| 3,912,567 A | 10/1975 | Schwartz |
| 4,016,329 A | 4/1977 | Matsuyama et al. |
| 4,041,203 A | 8/1977 | Brock et al. |
| 4,059,114 A | 11/1977 | Richards |
| 4,070,217 A | 1/1978 | Smith et al. |
| 4,100,319 A | 7/1978 | Schwartz |
| 4,107,364 A | 8/1978 | Sisson |
| 4,144,371 A | 3/1979 | Okie et al. |
| 4,168,606 A | 9/1979 | Callander |
| 4,197,345 A | 4/1980 | Worrall |
| 4,205,397 A | 6/1980 | Bechis |
| 4,228,641 A | 10/1980 | O'Neil |
| 4,265,954 A | 5/1981 | Romanek |
| 4,265,972 A | 5/1981 | Rudner |
| 4,310,373 A | 1/1982 | Schuhmacher et al. |
| 4,355,489 A | 10/1982 | Heyer et al. |
| 4,410,385 A | 10/1983 | Murphy et al. |
| 4,445,951 A | 5/1984 | Lind et al. |
| 4,486,200 A | 12/1984 | Heyer et al. |
| 4,497,099 A | 2/1985 | Scott |
| 4,511,615 A | 4/1985 | Ohta |
| 4,561,128 A | 12/1985 | Zimmerman |
| 4,576,852 A | 3/1986 | Burgess et al. |
| 4,588,630 A | 5/1986 | Shimalla |
| 4,615,188 A | 10/1986 | Hursh et al. |
| 4,621,013 A | 11/1986 | Holtrop et al. |
| 4,647,492 A | 3/1987 | Grant et al. |
| 4,695,501 A | 9/1987 | Robinson |
| 4,741,941 A | 5/1988 | Englebert et al. |
| 4,747,901 A | 5/1988 | Becker et al. |
| 4,769,927 A | 9/1988 | Liggett et al. |
| 4,777,080 A | 10/1988 | Harris, Jr. et al. |
| 4,781,296 A | 11/1988 | Morris et al. |
| 4,803,109 A | 2/1989 | Saniscalchi |
| 4,938,817 A | 7/1990 | Langley |
| 4,980,927 A | 1/1991 | Wawiluk et al. |
| 5,003,902 A | 4/1991 | Benstock et al. |
| 5,102,724 A | 4/1992 | Okawahara et al. |
| 5,106,678 A | 4/1992 | Abu-Isa |
| 5,118,550 A | 6/1992 | Baravian et al. |
| 5,130,178 A | 7/1992 | Zerfass et al. |
| 5,132,160 A | 7/1992 | Bird |
| 5,150,787 A | 9/1992 | Bird et al. |
| 5,203,939 A | 4/1993 | Sperling et al. |
| 5,230,701 A | 7/1993 | Meyer et al. |
| 5,238,733 A | 8/1993 | Joseph et al. |
| 5,255,833 A | 10/1993 | McAllister |
| 5,282,900 A | 2/1994 | McDonell et al. |
| 5,306,275 A | 4/1994 | Bryan |
| 5,316,838 A | 5/1994 | Crandall et al. |
| 5,324,277 A | 6/1994 | Daugan et al. |
| 5,328,758 A | 7/1994 | Markell et al. |

(56) References Cited

U.S. PATENT DOCUMENTS

| | | |
|---|---|---|
| 5,380,580 A | 1/1995 | Rogers et al. |
| 5,415,779 A | 5/1995 | Markell et al. |
| 5,420,794 A | 5/1995 | James |
| 5,423,783 A | 6/1995 | Battles et al. |
| 5,445,693 A | 8/1995 | Vane |
| 5,458,962 A | 10/1995 | Birch |
| 5,470,605 A | 11/1995 | Lundeen |
| 5,478,628 A | 12/1995 | Billingsley et al. |
| 5,482,756 A | 1/1996 | Berger et al. |
| 5,496,507 A | 3/1996 | Angadjivand et al. |
| 5,501,794 A | 3/1996 | Van De Graaf et al. |
| 5,507,968 A | 4/1996 | Palaikis |
| 5,539,042 A | 7/1996 | Birch |
| 5,568,779 A | 10/1996 | Wong |
| 5,573,619 A | 11/1996 | Benedict et al. |
| 5,586,563 A | 12/1996 | Newman |
| 5,595,649 A | 1/1997 | Markell et al. |
| 5,603,747 A | 2/1997 | Matuda et al. |
| 5,604,271 A | 2/1997 | Lundeen |
| 5,609,706 A | 3/1997 | Benedict et al. |
| 5,624,726 A | 4/1997 | Sanocki et al. |
| 5,629,079 A | 5/1997 | Battles et al. |
| 5,639,287 A | 6/1997 | Van De Graaf et al. |
| 5,641,563 A | 6/1997 | Truong et al. |
| 5,642,575 A * | 7/1997 | Norton ................ A43B 13/181 36/27 |
| 5,651,853 A | 7/1997 | Wrigley et al. |
| 5,655,833 A | 8/1997 | Raczynski |
| 5,682,618 A | 11/1997 | Johnson et al. |
| 5,695,853 A | 12/1997 | Billingsley et al. |
| 5,714,229 A | 2/1998 | Ogden |
| 5,743,273 A | 4/1998 | Newman |
| 5,744,207 A | 4/1998 | Bartusiak et al. |
| 5,759,659 A | 6/1998 | Sanocki et al. |
| 5,783,290 A | 7/1998 | Isaac et al. |
| 5,803,086 A | 9/1998 | Scholz et al. |
| 5,858,140 A | 1/1999 | Berger et al. |
| 5,858,515 A | 1/1999 | Stokes et al. |
| 5,879,493 A | 3/1999 | Johnson et al. |
| 5,883,019 A | 3/1999 | Troung et al. |
| 5,888,157 A | 3/1999 | Guenther et al. |
| 5,928,070 A | 7/1999 | Lux |
| 5,939,339 A | 8/1999 | Delmore et al. |
| 5,950,554 A | 9/1999 | Wong |
| RE36,323 E | 10/1999 | Thompson et al. |
| 5,981,033 A | 11/1999 | Haunschild et al. |
| 6,004,642 A | 12/1999 | Langford |
| 6,007,911 A | 12/1999 | Bowen, Jr. |
| 6,013,587 A | 1/2000 | Truong et al. |
| 6,017,831 A | 1/2000 | Beardsley et al. |
| 6,054,078 A | 4/2000 | Lauer et al. |
| 6,069,097 A | 5/2000 | Suzuki et al. |
| 6,086,911 A | 7/2000 | Godbey |
| 6,090,234 A | 7/2000 | Barone et al. |
| 6,110,572 A | 8/2000 | Groh et al. |
| 6,119,691 A | 9/2000 | Angadjivand et al. |
| 6,123,752 A | 9/2000 | Wu et al. |
| 6,174,964 B1 | 1/2001 | Jariwala et al. |
| 6,225,243 B1 | 5/2001 | Austin |
| 6,251,154 B1 | 6/2001 | Van Rossen |
| 6,261,679 B1 | 7/2001 | Chen et al. |
| 6,284,843 B1 | 9/2001 | Jariwala et al. |
| 6,288,157 B1 | 9/2001 | Jariwala et al. |
| 6,315,130 B1 | 11/2001 | Olsen |
| 6,332,465 B1 | 12/2001 | Xue et al. |
| 6,391,200 B2 | 5/2002 | Pulek et al. |
| 6,391,807 B1 | 5/2002 | Jariwala et al. |
| 6,395,211 B1 | 5/2002 | Dettmer et al. |
| 6,406,576 B1 | 6/2002 | Benedict et al. |
| 6,406,577 B1 | 6/2002 | Benedict et al. |
| 6,429,159 B1 | 8/2002 | Watanabe et al. |
| 6,430,844 B1 | 8/2002 | Otis et al. |
| 6,492,183 B1 | 12/2002 | Perman et al. |
| 6,503,855 B1 | 1/2003 | Menzies et al. |
| 6,537,930 B1 | 3/2003 | Middlesworth et al. |
| 6,537,935 B1 | 3/2003 | Seth et al. |
| 6,541,403 B2 | 4/2003 | Billarant et al. |
| 6,548,166 B2 | 4/2003 | Figuly et al. |
| 6,558,784 B1 | 5/2003 | Norton et al. |
| 6,588,237 B2 | 7/2003 | Cole et al. |
| 6,610,390 B1 | 8/2003 | Kauschke et al. |
| 6,645,611 B2 | 11/2003 | Seth |
| 6,715,188 B1 | 4/2004 | Jackson et al. |
| 6,719,744 B2 | 4/2004 | Kinnear et al. |
| 6,769,202 B1 | 8/2004 | Luthi et al. |
| 6,773,718 B2 | 8/2004 | Seth et al. |
| 6,783,574 B1 | 8/2004 | Angadjivand et al. |
| 6,784,125 B1 | 8/2004 | Yamakawa et al. |
| 6,784,127 B1 | 8/2004 | Yamakawa et al. |
| 6,835,256 B2 | 12/2004 | Menzies et al. |
| 6,875,710 B2 | 4/2005 | Eaton et al. |
| 6,880,211 B2 | 4/2005 | Jackson et al. |
| 6,896,843 B2 | 5/2005 | Topolkaraev et al. |
| 6,910,288 B2 | 6/2005 | Dua |
| 6,911,502 B2 | 6/2005 | Vedula |
| 6,931,762 B1 | 8/2005 | Dua |
| 6,942,683 B2 | 9/2005 | Dunshee |
| 6,942,894 B2 | 9/2005 | Alberg et al. |
| 6,967,178 B2 | 11/2005 | Zhou et al. |
| 7,066,182 B1 | 6/2006 | Dunshee |
| 7,081,221 B2 | 7/2006 | Paratore et al. |
| 7,147,734 B2 | 12/2006 | Ogle et al. |
| 7,147,904 B1 | 12/2006 | Crawford |
| 7,150,774 B2 | 12/2006 | Kubokawa et al. |
| 7,169,202 B2 | 1/2007 | Kubokawa |
| 7,195,729 B2 | 3/2007 | Jackson et al. |
| 7,230,043 B2 | 6/2007 | Klun et al. |
| 7,238,314 B2 | 7/2007 | Jackson et al. |
| 7,267,681 B2 | 9/2007 | Dunshee |
| 7,291,236 B2 | 11/2007 | Guilhem et al. |
| 7,293,371 B2 | 11/2007 | Aveni |
| 7,303,805 B2 | 12/2007 | Seth et al. |
| 7,311,880 B2 | 12/2007 | Perman et al. |
| 7,320,719 B2 | 1/2008 | Van De Graaf et al. |
| 7,357,889 B2 | 4/2008 | Vedula et al. |
| 7,390,451 B2 | 6/2008 | Jackson et al. |
| 7,393,371 B2 | 7/2008 | O'Gary et al. |
| 7,462,573 B2 | 12/2008 | Tsujiyama et al. |
| 7,547,650 B2 | 6/2009 | Keep |
| 7,709,075 B2 | 5/2010 | Suzuki |
| 7,718,259 B2 | 5/2010 | Pollet et al. |
| 7,785,509 B2 | 8/2010 | Perera et al. |
| 7,955,549 B2 | 6/2011 | Noda et al. |
| 8,034,873 B2 | 10/2011 | Siddhamalli |
| 8,148,475 B2 | 4/2012 | Vedula et al. |
| 8,209,883 B2 * | 7/2012 | Lyden .................. A43B 3/0078 |
| 8,266,827 B2 * | 9/2012 | Dojan .................. A43B 23/025 36/50.1 |
| 8,641,944 B2 | 2/2014 | Wang et al. |
| 8,800,172 B2 | 8/2014 | Dua et al. |
| 8,850,719 B2 | 10/2014 | Hawkinson et al. |
| 8,865,052 B2 | 10/2014 | Makal et al. |
| 8,906,275 B2 | 12/2014 | Davis et al. |
| 9,060,562 B2 | 6/2015 | Meir et al. |
| 9,320,312 B2 | 4/2016 | Lyttle et al. |
| 9,545,773 B2 | 1/2017 | Hansen |
| 9,688,805 B2 | 6/2017 | Vedula et al. |
| 9,723,890 B2 | 8/2017 | Long et al. |
| 9,856,599 B2 | 1/2018 | Park |
| 9,915,026 B2 | 3/2018 | Park |
| 9,963,806 B2 | 5/2018 | Vedula et al. |
| 10,138,575 B2 | 11/2018 | Van Der Gaag et al. |
| 10,455,885 B2 | 10/2019 | Tamm |
| 10,590,569 B2 | 3/2020 | Hansen et al. |
| 10,590,571 B2 | 3/2020 | Hansen et al. |
| 2001/0008683 A1 | 7/2001 | Takai et al. |
| 2001/0035598 A1 | 11/2001 | Ampulski et al. |
| 2002/0070471 A1 | 6/2002 | Lee et al. |
| 2002/0090875 A1 | 7/2002 | Lasko et al. |
| 2002/0132121 A1 | 9/2002 | Palacio et al. |
| 2002/0137418 A1 | 9/2002 | Seth |
| 2002/0150610 A1 | 10/2002 | Kono et al. |
| 2002/0172792 A1 | 11/2002 | Jarvis et al. |
| 2002/0175433 A1 | 11/2002 | Day |

(56) References Cited

U.S. PATENT DOCUMENTS

| | | |
|---|---|---|
| 2003/0060858 A1 | 3/2003 | Kieval et al. |
| 2003/0091617 A1 | 5/2003 | Mrozinski et al. |
| 2003/0119411 A1 | 6/2003 | Yamakawa et al. |
| 2003/0124310 A1 | 7/2003 | Ellis et al. |
| 2003/0137221 A1 | 7/2003 | Radziemski et al. |
| 2003/0162458 A1 | 8/2003 | Tsujiyama et al. |
| 2003/0171051 A1 | 9/2003 | Bergsten et al. |
| 2004/0050506 A1 | 3/2004 | Haiber et al. |
| 2004/0060858 A1 | 4/2004 | Lucas et al. |
| 2004/0118018 A1* | 6/2004 | Dua .................. A43D 8/24 36/3 A |
| 2004/0186482 A1 | 9/2004 | Kolb et al. |
| 2004/0216329 A1 | 11/2004 | Evans |
| 2004/0224596 A1 | 11/2004 | Mathis et al. |
| 2004/0241399 A1 | 12/2004 | Marmon et al. |
| 2005/0003139 A1 | 1/2005 | Keller |
| 2005/0084647 A1 | 4/2005 | Menzies et al. |
| 2005/0106326 A1 | 5/2005 | Audenaert et al. |
| 2005/0132607 A1* | 6/2005 | Dojan .................. A43B 21/28 36/28 |
| 2005/0160629 A1 | 7/2005 | Jungkind |
| 2005/0188907 A1 | 9/2005 | D'Henin |
| 2005/0193592 A1 | 9/2005 | Dua et al. |
| 2005/0217226 A1 | 10/2005 | Sundet et al. |
| 2006/0009106 A1 | 1/2006 | Nishimura et al. |
| 2006/0036230 A1 | 2/2006 | Mills et al. |
| 2006/0081329 A1 | 4/2006 | Kikuchi |
| 2006/0121812 A1 | 6/2006 | Suzuki et al. |
| 2006/0141881 A1 | 6/2006 | Bergsten et al. |
| 2006/0143947 A1 | 7/2006 | Ellis et al. |
| 2006/0165939 A1 | 7/2006 | Hottner |
| 2006/0169387 A1 | 8/2006 | Nayar et al. |
| 2006/0180067 A1 | 8/2006 | Yamazaki et al. |
| 2006/0204558 A1 | 9/2006 | Kantner et al. |
| 2006/0223403 A1 | 10/2006 | Mahboob |
| 2006/0246260 A1 | 11/2006 | Sundet et al. |
| 2006/0276095 A1 | 12/2006 | Dua et al. |
| 2007/0049148 A1 | 3/2007 | Chien et al. |
| 2007/0049153 A1 | 3/2007 | Dunbar et al. |
| 2007/0049646 A1 | 3/2007 | Moore et al. |
| 2007/0082165 A1 | 4/2007 | Barrett |
| 2007/0129524 A1 | 6/2007 | Sunkara |
| 2007/0135008 A1 | 6/2007 | Hall et al. |
| 2007/0141335 A1 | 6/2007 | Perera et al. |
| 2007/0169379 A1 | 7/2007 | Hazenberg et al. |
| 2007/0176325 A1 | 8/2007 | Jackson et al. |
| 2007/0186482 A1 | 8/2007 | Sudo |
| 2007/0199210 A1 | 8/2007 | Vattes et al. |
| 2007/0212963 A1 | 9/2007 | Keep |
| 2007/0298671 A1 | 12/2007 | Noda et al. |
| 2007/0298697 A1 | 12/2007 | Charmoille et al. |
| 2008/0001431 A1 | 1/2008 | Thompson et al. |
| 2008/0022554 A1 | 1/2008 | Meschter et al. |
| 2008/0022642 A1 | 1/2008 | Fox et al. |
| 2008/0022643 A1 | 1/2008 | Fox et al. |
| 2008/0026659 A1 | 1/2008 | Brandner et al. |
| 2008/0044622 A1 | 2/2008 | Noda et al. |
| 2008/0064279 A1 | 3/2008 | Browning et al. |
| 2008/0070464 A1 | 3/2008 | Alberg et al. |
| 2008/0081854 A1 | 4/2008 | Wang et al. |
| 2008/0114093 A1 | 5/2008 | Lagneaux et al. |
| 2008/0134543 A1 | 6/2008 | Klein |
| 2008/0139067 A1 | 6/2008 | Mukai et al. |
| 2008/0148946 A1 | 6/2008 | Lotgerink-Bruinenberg |
| 2008/0241476 A1 | 10/2008 | Olguin |
| 2008/0245720 A1 | 10/2008 | Hutchinson et al. |
| 2008/0245725 A1 | 10/2008 | Patel et al. |
| 2008/0246182 A1 | 10/2008 | Patel et al. |
| 2008/0254253 A1 | 10/2008 | Gallager |
| 2008/0276805 A1 | 11/2008 | Lotgerink-Bruinenberg |
| 2009/0068908 A1 | 3/2009 | Hinchcliff |
| 2009/0140470 A1 | 6/2009 | Dua et al. |
| 2009/0151397 A1 | 6/2009 | Sturman et al. |
| 2009/0277041 A1 | 11/2009 | Hubner |
| 2009/0313856 A1 | 12/2009 | Arizumi |
| 2010/0035963 A1 | 2/2010 | Chajut et al. |
| 2010/0037483 A1 | 2/2010 | Meschter et al. |
| 2010/0062231 A1 | 3/2010 | Abed et al. |
| 2010/0077634 A1 | 4/2010 | Bell |
| 2010/0095554 A1 | 4/2010 | Gillespie |
| 2010/0147444 A1 | 6/2010 | Hsu et al. |
| 2010/0154256 A1 | 6/2010 | Dua |
| 2010/0175276 A1 | 7/2010 | Dojan et al. |
| 2010/0186874 A1 | 7/2010 | Sussmann |
| 2010/0199406 A1* | 8/2010 | Dua .................. A43B 1/04 2/243.1 |
| 2010/0199520 A1 | 8/2010 | Dua et al. |
| 2010/0203328 A1 | 8/2010 | Hochstetter et al. |
| 2010/0251491 A1 | 10/2010 | Dojan et al. |
| 2010/0287679 A1 | 11/2010 | Fujita et al. |
| 2010/0287790 A1 | 11/2010 | Sokolowski et al. |
| 2010/0325916 A1 | 12/2010 | Dua et al. |
| 2011/0098147 A1 | 4/2011 | Crane |
| 2011/0232002 A1 | 9/2011 | Wiessner |
| 2012/0157904 A1 | 6/2012 | Stein |
| 2012/0227282 A1 | 9/2012 | Hawkinson et al. |
| 2012/0291314 A1 | 11/2012 | Sokolowski et al. |
| 2013/0059116 A1 | 3/2013 | Peikert et al. |
| 2013/0067639 A1 | 3/2013 | Dua et al. |
| 2013/0067768 A1 | 3/2013 | Dua et al. |
| 2013/0068378 A1 | 3/2013 | Dua et al. |
| 2013/0069266 A1 | 3/2013 | Dua et al. |
| 2013/0139294 A1 | 6/2013 | Zetune et al. |
| 2013/0192086 A1 | 8/2013 | Tawney et al. |
| 2013/0232815 A1 | 9/2013 | Meythaler et al. |
| 2013/0255103 A1 | 10/2013 | Dua et al. |
| 2013/0260104 A1 | 10/2013 | Dua et al. |
| 2013/0260629 A1 | 10/2013 | Dua et al. |
| 2013/0276333 A1 | 10/2013 | Wawrousek et al. |
| 2013/0285294 A1 | 10/2013 | Huang et al. |
| 2014/0245643 A1 | 9/2014 | Huffa et al. |
| 2015/0013188 A1 | 1/2015 | Seamarks et al. |
| 2015/0059209 A1 | 3/2015 | Dekovic et al. |
| 2015/0123305 A1 | 5/2015 | Davis et al. |
| 2015/0201707 A1 | 7/2015 | Bruce |
| 2016/0083540 A1 | 3/2016 | Makal et al. |
| 2016/0271904 A1 | 9/2016 | Maia et al. |
| 2016/0286898 A1 | 10/2016 | Manz et al. |
| 2016/0295971 A1 | 10/2016 | Arnese et al. |
| 2017/0029982 A1 | 2/2017 | Bryson, Jr. et al. |
| 2017/0042264 A1 | 2/2017 | Dua et al. |
| 2017/0129200 A1 | 5/2017 | Adami et al. |
| 2017/0245581 A1 | 8/2017 | Mcfarland, II et al. |
| 2017/0348935 A1 | 12/2017 | Leimer et al. |
| 2017/0362570 A1 | 12/2017 | Revel et al. |
| 2018/0125165 A1 | 5/2018 | Adami et al. |
| 2018/0255875 A1 | 9/2018 | Mcginnity et al. |
| 2018/0319925 A1 | 11/2018 | Lu et al. |
| 2019/0037967 A1 | 2/2019 | Mcfarland, II et al. |
| 2019/0069636 A1 | 3/2019 | Lang et al. |
| 2019/0082774 A1 | 3/2019 | Tamm et al. |
| 2019/0116927 A1 | 4/2019 | Constantinou et al. |

FOREIGN PATENT DOCUMENTS

| | | |
|---|---|---|
| CA | 2905879 C | 9/2014 |
| CN | 85106873 A | 3/1987 |
| CN | 1190931 A | 8/1998 |
| CN | 1201846 A | 12/1998 |
| CN | 2354400 Y | 12/1999 |
| CN | 1278424 A | 1/2001 |
| CN | 1451330 A | 10/2003 |
| CN | 1497086 A | 5/2004 |
| CN | 1571871 A | 1/2005 |
| CN | 1802104 A | 7/2006 |
| CN | 101001546 A | 7/2007 |
| CN | 101125044 A | 2/2008 |
| CN | 101326212 A | 12/2008 |
| CN | 101500794 A | 8/2009 |
| CN | 101542032 A | 9/2009 |
| CN | 102137600 A | 7/2011 |
| CN | 102162164 A | 8/2011 |
| CN | 102292487 A | 12/2011 |
| DE | 2109143 A1 | 10/1972 |

(56) References Cited

FOREIGN PATENT DOCUMENTS

| | | |
|---|---|---|
| DE | 19642253 A1 | 8/1997 |
| DE | 29911710 U1 | 12/1999 |
| DE | 102007004146 A1 | 7/2008 |
| DE | 102007035729 A1 | 2/2009 |
| EP | 0264132 A2 | 4/1988 |
| EP | 0304301 A2 | 2/1989 |
| EP | 0327402 A2 | 8/1989 |
| EP | 0559969 A1 | 9/1993 |
| EP | 0629721 A2 | 12/1994 |
| EP | 0370835 B1 | 12/1995 |
| EP | 1068889 A1 | 1/2001 |
| EP | 1167606 A1 | 1/2002 |
| EP | 1264561 A1 | 12/2002 |
| EP | 1340848 A1 | 9/2003 |
| EP | 1342825 A1 | 9/2003 |
| EP | 1418092 A1 | 5/2004 |
| EP | 1491105 A1 | 12/2004 |
| EP | 1571938 B3 | 9/2005 |
| EP | 1573107 B1 | 9/2005 |
| EP | 1589140 A1 | 10/2005 |
| EP | 1591572 A1 | 11/2005 |
| EP | 1884582 A1 | 2/2008 |
| EP | 2084981 A1 | 8/2009 |
| EP | 2397593 A2 | 12/2011 |
| EP | 2397594 A2 | 12/2011 |
| EP | 2407302 A2 | 1/2012 |
| EP | 2453048 A1 | 5/2012 |
| EP | 2488685 B1 | 8/2012 |
| EP | 2530195 A1 | 12/2012 |
| EP | 2393972 B1 | 1/2013 |
| EP | 2683866 A1 | 1/2014 |
| EP | 2978332 B1 | 2/2016 |
| EP | 3078290 A1 | 10/2016 |
| EP | 3107411 B1 | 12/2016 |
| EP | 3128865 B1 | 2/2017 |
| EP | 3594287 A1 | 1/2020 |
| GB | 1353183 A | 5/1974 |
| GB | 1384326 A | 2/1975 |
| GB | 1491602 A | 11/1977 |
| GB | 2115741 A | 9/1983 |
| GB | 2346624 A | 8/2000 |
| JP | S473280 U | 9/1972 |
| JP | S4732180 U | 12/1972 |
| JP | S6052237 B2 | 11/1985 |
| JP | S61655 A | 1/1986 |
| JP | S61111993 U | 7/1986 |
| JP | S62194030 U | 12/1987 |
| JP | S62203211 U | 12/1987 |
| JP | S62203212 U | 12/1987 |
| JP | H0257993 U | 4/1990 |
| JP | H02165942 A | 6/1990 |
| JP | H02130206 U | 10/1990 |
| JP | H02286225 A | 11/1990 |
| JP | H03200885 A | 9/1991 |
| JP | H03224421 A | 10/1991 |
| JP | H04108152 A | 4/1992 |
| JP | H054291 A | 1/1993 |
| JP | H0522792 A | 1/1993 |
| JP | H05200890 A | 8/1993 |
| JP | H05321119 A | 12/1993 |
| JP | H06126754 A | 5/1994 |
| JP | H06158501 A | 6/1994 |
| JP | H07157957 A | 6/1995 |
| JP | H07197355 A | 8/1995 |
| JP | 3016014 U | 9/1995 |
| JP | H07252762 A | 10/1995 |
| JP | H08301 A | 1/1996 |
| JP | H08104164 A | 4/1996 |
| JP | H08503745 A | 4/1996 |
| JP | H08296161 A | 11/1996 |
| JP | H08323903 A | 12/1996 |
| JP | H0913252 A | 1/1997 |
| JP | H0958200 A | 3/1997 |
| JP | H0965907 A | 3/1997 |
| JP | H09188951 A | 7/1997 |
| JP | H09267456 A | 10/1997 |
| JP | H09275293 A | 10/1997 |
| JP | H1077566 A | 3/1998 |
| JP | 10130991 A | 5/1998 |
| JP | H10130991 A | 5/1998 |
| JP | H10245760 A | 9/1998 |
| JP | H10273868 A | 10/1998 |
| JP | H10292271 A | 11/1998 |
| JP | H10323661 A | 12/1998 |
| JP | H1112912 A | 1/1999 |
| JP | H1161616 A | 3/1999 |
| JP | H1190836 A | 4/1999 |
| JP | H11217799 A | 8/1999 |
| JP | H11320736 A | 11/1999 |
| JP | H11320800 A | 11/1999 |
| JP | 2000503610 A | 3/2000 |
| JP | 2000248454 A | 9/2000 |
| JP | 2001058002 A | 3/2001 |
| JP | 2001179889 A | 7/2001 |
| JP | 2001181905 A | 7/2001 |
| JP | 2001523772 A | 11/2001 |
| JP | 2002234547 A | 8/2002 |
| JP | 2002317367 A | 10/2002 |
| JP | 2003117325 A | 4/2003 |
| JP | 3093555 U | 5/2003 |
| JP | 2003517950 A | 6/2003 |
| JP | 2003227060 A | 8/2003 |
| JP | 2003524534 A | 8/2003 |
| JP | 2003310331 A | 11/2003 |
| JP | 2004150008 A | 5/2004 |
| JP | 2004192182 A | 7/2004 |
| JP | 2004211258 A | 7/2004 |
| JP | 2004244791 A | 9/2004 |
| JP | 2004306149 A | 11/2004 |
| JP | 2005029907 A | 2/2005 |
| JP | 2005187954 A | 7/2005 |
| JP | 2005212055 A | 8/2005 |
| JP | 2006511306 A | 4/2006 |
| JP | 2006192723 A | 7/2006 |
| JP | 2006193881 A | 7/2006 |
| JP | 2006223403 A | 8/2006 |
| JP | 2006274453 A | 10/2006 |
| JP | 2006299425 A | 11/2006 |
| JP | 2007516046 A | 6/2007 |
| JP | 2007522908 A | 8/2007 |
| JP | 2007537372 A | 12/2007 |
| JP | 2008007930 A | 1/2008 |
| JP | 2008101285 A | 5/2008 |
| JP | 2008513626 A | 5/2008 |
| JP | 2008517183 A | 5/2008 |
| JP | 2008138908 A | 6/2008 |
| JP | 2008169506 A | 7/2008 |
| JP | 2009-534499 A2 | 9/2009 |
| JP | 2009538197 A | 11/2009 |
| JP | 2010534535 A | 11/2010 |
| JP | 2011081082 A | 4/2011 |
| JP | 4785700 B2 | 10/2011 |
| JP | 2012517535 A | 8/2012 |
| JP | 5226844 B2 | 7/2013 |
| JP | 5411906 B2 | 2/2014 |
| JP | 5615786 B2 | 10/2014 |
| JP | 2015522722 A | 8/2015 |
| JP | 6126754 B2 | 5/2017 |
| KR | 20050088367 A | 9/2005 |
| KR | 20090023339 A | 3/2009 |
| KR | 20180060539 A | 6/2018 |
| WO | WO-0051458 A1 | 9/2000 |
| WO | WO-0145927 A1 | 6/2001 |
| WO | WO-02054894 A1 | 7/2002 |
| WO | 2002064656 A2 | 8/2002 |
| WO | WO-02064656 A2 | 8/2002 |
| WO | WO-02068534 A1 | 9/2002 |
| WO | WO-03007864 A1 | 1/2003 |
| WO | WO-03021024 A1 | 3/2003 |
| WO | WO-2004060093 A1 | 7/2004 |
| WO | WO-2005000055 A1 | 1/2005 |
| WO | WO-2005052235 A1 | 6/2005 |
| WO | WO-2005063071 A2 | 7/2005 |
| WO | WO-2005082188 A1 | 9/2005 |

(56) References Cited

FOREIGN PATENT DOCUMENTS

| WO | WO-2005112677 A2 | 12/2005 |
|---|---|---|
| WO | WO-2007103244 A2 | 9/2007 |
| WO | WO-2007139567 A1 | 12/2007 |
| WO | WO-2007140054 A1 | 12/2007 |
| WO | WO-2008069280 A1 | 6/2008 |
| WO | WO-2008077785 A1 | 7/2008 |
| WO | WO-2008111294 A1 | 9/2008 |
| WO | WO-2009027701 A1 | 3/2009 |
| WO | WO-2010036557 A1 | 4/2010 |
| WO | 2010141319 A1 | 12/2010 |
| WO | WO-2011046762 A1 | 4/2011 |
| WO | 2011124228 A1 | 10/2011 |
| WO | 2011127259 | 10/2011 |
| WO | 2012073095 A1 | 6/2012 |
| WO | WO-2013181082 A1 | 12/2013 |
| WO | 2014085206 A1 | 6/2014 |
| WO | 2015183348 A1 | 12/2015 |
| WO | 2015190920 A1 | 12/2015 |
| WO | 2016014230 A1 | 1/2016 |
| WO | 2017115806 A1 | 7/2017 |
| WO | 2017151496 A1 | 9/2017 |
| WO | 2018124385 A1 | 7/2018 |

OTHER PUBLICATIONS

International Search Report and Written Opinion for PCT/US2020/044626 mailed Oct. 30, 2020.
Written Opinion for PCT/US2020/060236, mailed Nov. 23, 2021.
International Search Report and Written Opinion for PCT/US2020/060236, mailed Mar. 5, 2021.
International Preliminary Report on Patentability for PCT/US2020/060247, mailed Feb. 9, 2022.
International Preliminary Report on Patentability for PCT/US2020/044626, mailed Feb. 17, 2022.
International Search Report and Written Opinion for PCT/US2020/044628 mailed Oct. 30, 2020.
International Preliminary Report on Patentability for PCT/US2020/044629, mailed Feb. 17, 2022.
International Preliminary Report on Patentability for PCT/US2020/044624, mailed Feb. 17, 2022.
Estane® 58238 Technical Data Sheet, https://plastics.ulprospector.com/datasheel/e24205/estane-58238-tpu, 3 pp, accessed Jun. 29, 2020.
International Preliminary Report on Patentability for PCT/US2020/060236, mailed Apr. 7, 2022.
International Search Report and Written Opinion for PCT/US2020/044624 mailed Oct. 30, 2020.
International Search Report and Written Opinion for PCT/US2020/044629 mailed Nov. 5, 2020.
International Preliminary Report on Patentability for PCT/US2020/044628, mailed Feb. 17, 2022.
International Search Report and Written Opinion for PCT/US2020/060247, mailed Mar. 23, 2021.
Written Opinion for PCT/US2020/060247, mailed Oct. 28, 2021.
Estane® T470A Technical Data Sheet, http://www.matweb.com/search/datasheet_print.aspx?rnatguid=5539b9ce32af46358433a5a5e035570c, 1 pp, accessed Jun. 29, 2020.
International Preliminary Report on Patentability for PCT/US2020/060247, mailed Apr. 14, 2022.
Advisory Action dated Aug. 1, 2012 in U.S. Appl. No. 12/367,274, filed Feb. 6, 2009.
Chawla, Krishan Kumar, "Fibrous Materials," Cambridge University Press, p. 42 (1998).
Chinese Office Action dated Apr. 28, 2015 in Chinese Patent Application No. 201410041109.X.
Chinese Office Action dated Jan. 10, 2014 and corresponding Search Report dated Nov. 26, 2013 in Chinese Application No. 201080046286.7.
Chinese Office Action dated Jan. 27, 2016 in Chinese Patent Application No. 201380028031.1 (51-4114).

Chinese Office Action dated May 25, 2015, in Chinese Application No. 201080046286.7.
Chinese Office Action dated May 6, 2015 in Chinese Patent Application No. 201280012038.X.
Chinese Office Action dated Nov. 15, 2014, in Chinese Application No. 201080046286.7.
Communication under Rule 71(3) dated Jun. 20, 2018 EPC in European Application No. 13724648.4, 7 pages.
Communication under Rule 94(3) dated Mar. 17, 2017 EPC in European Application No. 13724648.4, 5 pages.
Decision of Refusal dated Jan. 24, 2014 in Japanese Patent Application No. 2011-225838.
Decision of Refusal dated Jan. 29, 2015, in Japanese Patent Application No. 2011-225846.
Decision of Refusal dated Mar. 26, 2015, in Japanese Patent Application No. 2011-225849.
Decision on Reexamination mailed Jan. 23, 2019 for Chinese Patent Application No. 201380029220.0, 27 pages.
Decision to Grant a Patent dated Aug. 14, 2014 in Japanese Patent Application No. 2011-225838.
Districo—Bonding Yarns—Grilon® Fusible bonding yarns (Jul. 16, 2016); http://districo.com/page_gb/bondingyarn.htm.
European Office Action dated Aug. 31, 2015 in European Patent Application No. 11174751.5.
European Office Action dated Jan. 22, 2014 in European Patent Application No. 11174751.5.
European Office Action dated Nov. 28, 2014, in European Patent Application No. 11174751.5.
European Search Report and Written Opinion dated Jun. 11, 2012 in European Patent Application No. 11174747.3.
European Search Report and Written Opinion dated Mar. 6, 2012 in European Patent Application No. 11174751.5.
European Search Report dated Apr. 17, 2012 in European Patent Application No. 11174753.1.
European Search Report dated Jan. 30, 2012 in European Patent Application No. 11174750.7.
European Search Report dated Jan. 30, 2012 in European Patent Application No. 11175063.4.
European Search Report dated Nov. 25, 2011 in European Patent Application No. 11174747.3.
Examination Report dated Oct. 31, 2014 in European Patent Application No. 11174747.3.
Extended European Search Report dated Jul. 17, 2014 in European Patent Application No. 14166582.8.
Extended European Search Report for Application No. 18207862.6 dated Mar. 8, 2019; 7 pages.
Extended European Search Report for European Patent Application No. 18207862.6 dated Mar. 8, 2019; 7 pages.
Final Office Action dated Aug. 9, 2018 in U.S. Appl. No. 13/438,554, 12 pages.
Final Office Action dated Dec. 24, 2014 in U.S. Appl. No. 13/426,349.
Final Office Action dated Dec. 4, 2014 in U.S. Appl. No. 12/367,274.
Final Office Action dated Feb. 23, 2015 in U.S. Appl. No. 12/579,838.
Final Office Action dated Feb. 23, 2015 in U.S. Appl. No. 13/426,290.
Final Office Action dated May 19, 2015, in U.S. Appl. No. 13/426,323.
Final Office Action dated May 21, 2015, in Japanese Patent Application No. 2013-164367.
Final Office Action dated May 9, 2012 in connection with U.S. Appl. No. 12/367,274, filed Feb. 6, 2009.
Final Office Action dated Nov. 28, 2012 in U.S. Appl. No. 12/579,838, filed Oct. 15, 2009.
Final Office Action dated Oct. 27, 2015, in U.S. Appl. No. 13/426,361.
Humphries, Mary. Fabric Reference. Prentice Hall, Upper Saddle River, NJ. 1996. pp. 84-85.
International Preliminary Report and Written Opinion dated Apr. 26, 2012 in PCT Application No. PCT/US2010/051149.
International Preliminary Report dated Aug. 18, 2011 in PCT Application No. PCT/US2010/022216.
International Preliminary Report dated Sep. 19, 2013 in connection with PCT Application No. PCT/US2012/027974.
International Preliminary Report on Patentability dated Dec. 11, 2014, for PCT Application No. PCT/US2013/042581.

(56) References Cited

OTHER PUBLICATIONS

International Preliminary Report on Patentability for Application No. PCT/US2013/034901, dated Oct. 16, 2014.
International Preliminary Report on Patentability for Application No. PCT/US2013/034916, dated Oct. 16, 2014.
International Preliminary Report on Patentability for PCT Application No. PCT/US2013/034931 dated Oct. 16, 2014.
International Search Report and Written Opinion dated Jan. 14, 2011 in connection with PCT Application No. PCT/US2010/034779.
International Search Report and Written Opinion dated Jul. 4, 2012 in PCT Application No. PCT/US2012/027974.
International Search Report and Written Opinion dated Sep. 30, 2013 in connection with PCT Application No. PCT/US2013/042581.
International Search Report and Written Opinion for Application No. PCT/US2013/034901, dated Dec. 2, 2013.
International Search Report and Written Opinion for Application No. PCT/US2013/034916, dated Sep. 19, 2013.
International Search Report and Written Opinion in PCT Application No. PCT/US2010/022216, dated Dec. 6, 2010.
International Search Report and Written Opinion in PCT Application No. PCT/US2010/051149, dated Mar. 18, 2011.
Invitation to Pay Additional Fees and, Where Applicable, Protest Fee (with Search Report) for Application No. PCT/US2013/034901, dated Mar. 18, 2011.
Japanese Office Action dated Jul. 9, 2015 in Japanese Patent Application No. 2011-549186 (51-2318).
Lord, Peter R., "Handbook of Yarn Technology," in Science, Technology and Economics, Boca Raton, Florida, Woodhead Publishing, pp. 56-61 (2003).
Non-Final Office Action dated Aug. 27, 2014 in U.S. Appl. No. 13/426,323.
Non-Final Office Action dated Aug. 4, 2014 in U.S. Appl. No. 13/426,349.
Non-Final Office Action dated Jan. 11, 2018 in U.S. Appl. No. 13/438,554, 15 pages.
Non-Final Office Action dated Jul. 21, 2014 in U.S. Appl. No. 12/367,274.
Non-Final Office Action dated May 12, 2015 in U.S. Appl. No. 13/426,349.
Non-Final Office Action dated Oct. 30, 2015, in U.S. Appl. No. 12/579,838.
Non-Final Office Action dated Sep. 2, 2015 in U.S. Appl. No. 12/367,274.
Non-Final Office Action dated Sep. 4, 2015 in U.S. Appl. No. 13/426,290.
Non-Final Office Action in U.S. Appl. No. 12/367,274, dated Nov. 29, 2016 (18 pages).
Notice of Allowance date Apr. 11, 2014 in U.S. Appl. No. 13/045,168.
Notice of Allowance dated Aug. 1, 2014 in U.S. Appl. No. 13/482,182.
Notice of Allowance dated Aug. 25, 2015 in Japanese Patent Application No. 2011-225849.
Notice of Allowance dated Feb. 1, 2013 in European Patent Application No. 11174750.7 filed Jul. 20, 2011.
Notice of Allowance dated Feb. 1, 2013 in European Patent Application No. 11174753.1 filed Jul. 20, 2011.
Notice of Allowance dated Feb. 1, 2013 in European Patent Application No. 11175063.4 filed Jul. 22, 2011.
Notice of Allowance dated Feb. 21, 2013 in connection with Japanese Patent Application No. 2011-225851, filed Oct. 13, 2011.
Notice of Allowance dated Feb. 21, 2013 in European Patent Application No. 2011225851 filed Oct. 13, 2011.
Notice of Allowance dated Jul. 24, 2012 in European Patent Application No. 10734588.6 filed Jun. 27, 2011.
Notice of Allowance dated May 22, 2013 in connection with European Patent Application No. 11174753.1, filed Jul. 20, 2011.
Notice of Allowance dated Nov. 13, 2013 in connection with Chinese Patent Application No. 201080005095.6 and the English translation thereof.
Notice of Allowance dated Oct. 10, 2013 in connection with Japanese Patent Application No. 2011-225827, filed Oct. 13, 2011 and the English translation thereof.
Notice of Allowance dated Sep. 15, 2015, for European Patent Application No. 13723278.1.
Notice of Allowance dated Sep. 23, 2015, in U.S. Appl. No. 13/426,349.
Notice of Allowance dated Sep. 3, 2015 in European Patent Application No. 12718759.9.
Notice to Terminate Reconsideration by Examiner before Appeal & Result of Reconsideration by Examiner dated Oct. 16, 2014 for Japanese Patent Application No. 2011-549186.
Notification of Reason(s) for Refusal dated Aug. 21, 2014 in Japanese Patent Application No. 2013-164367.
Notification of Reason(s) for Refusal dated May 1, 2014 in Japanese Patent Application No. 2011-225846.
Notification of Reason(s) for Refusal dated May 22, 2014 in Japanese Patent Application No. 2011-225849.
Notification of Reason(s) for Refusal dated May 29, 2014 in Japanese Patent Application No. 2012-534219.
Office Action dated Aug. 17, 2015, in U.S. Appl. No. 13/438,520.
Office Action dated Aug. 27, 2015 for Chinese Patent Application No. 201380029215.X) and the English translation thereof.
Office Action dated Dec. 1, 2011 in connection with U.S. Appl. No. 12/367,274, filed Feb. 6, 2009.
Office Action dated Feb. 14, 2013 in Japanese Patent Application No. 2011-225838, filed Oct. 13, 2011.
Office Action dated Feb. 21, 2013 in Japanese Patent Application No. 2011-225846, filed Oct. 13, 2011.
Office Action dated Feb. 7, 2013 in Japanese Patent Application No. 2011-225849, filed Oct. 13, 2011.
Office Action dated Feb. 7, 2013 in Japanese Patent Application No. 2011-549186, filed Aug. 1, 2011.
Office Action dated Jan. 22, 2013 in Chinese Application No. 20108005095.6, filed Dec. 12, 2012.
Office Action dated Jan. 24, 2013 in European Patent Application No. 11174751.5 filed Jul. 20, 2011.
Office Action dated Jan. 6, 2014 for U.S. Appl. No. 13/045,168.
Office Action dated Jul. 24, 2015, for Chinese Patent Application No. 201380029223.4 and the English translation thereof.
Office Action dated Jul. 31, 2015, for Chinese Patent Application No. 201380029220.0 and the English translation thereof.
Office Action dated Jun. 13, 2013 in connection with Japanese Patent Application No. 2011-534219, and the English translation thereof.
Office Action dated Jun. 14, 2012 in U.S. Appl. No. 12/579,838, filed Oct. 15, 2009.
Office Action, dated Mar. 16, 2016, with English translation, for Korean Application No. 10-2014-7031180, (11 pages).
Office Action dated Mar. 26, 2015 in U.S. Appl. No. 13/426,361.
Office Action dated May 9, 2013 in connection with Japanese Patent Application No. 2011-225827, filed Oct. 13, 2011 and the English translation thereof.
Office Action dated Nov. 11, 2013 for European Patent Application No. 10779359.8.
Office Action dated Oct. 1, 2014 in U.S. Appl. No. 13/426,290.
Office Action dated Sep. 24, 2015, in U.S. Appl. No. 13/426,323.
Office Action dated Sep. 30, 2014 in U.S. Appl. No. 12/579,838.
Office Action for U.S. Appl. No. 14/528,491, dated Dec. 5, 2016 (6 pages).
Partial European Search Report dated Nov. 28, 2011 in European Patent Application No. 11177097.0.
Partial European Search Report dated Nov. 4, 2011 in connection with European Patent Application No. 11175063.4.
Partial European Search Report dated Nov. 4, 2011 in European Patent Application No. 11174750.7.
Partial European Search Report dated Nov. 7, 2011 in European Patent Application No. 11174751.5.
Response to European Office Action filed May 16, 2014 in European Patent Application No. 11174751.5.

(56) References Cited

OTHER PUBLICATIONS

Response to European Search Report and Written Opinion filed Sep. 21, 2012 in European Patent Application No. 11174751.5.
Response to European Search Report dated Jan. 11, 2013 in European Patent Application No. 11174747.3.
Response to European Search Report filed Aug. 15, 2012 in European Patent Application No. 11175063.4.
Response to European Search Report filed Aug. 16, 2012 in European Patent Application No. 11174750.7.
Response to European Search Report filed Dec. 21, 2011 in European Patent Application No. 11174747.3.
Response to Final Office Action dated Jul. 25, 2012 for U.S. Appl. No. 12/368,274, filed Feb. 6, 2009.
Response to Final Office Action filed Jul. 25, 2012 in connection with U.S. Appl. No. 12/367,274, filed Feb. 6, 2009.
Response to Final Office Action filed Mar. 13, 2013 in U.S. Appl. No. 12/579,838, filed Oct. 15, 2009.
Response to Office Action dated Mar. 1, 2012 for U.S. Appl. No. 12/368,274, filed Feb. 6, 2009.
Response to Office Action filed Aug. 2, 2013 in connection with European Patent Application No. 11174751.5.
Response to Office Action filed Aug. 29, 2013 in connection with Japanese Patent Application No. 2011-225827, filed Oct. 13, 2011 and the English translation thereof.
Response to Office Action filed Aug. 6, 2013 in connection with Chinese Patent Application No. 201080005095.6 filed Jul. 21, 2011 and the English translation thereof.
Response to Office Action filed Aug. 6, 2013 in connection with Japanese Patent Application No. 2011-225849, filed Oct. 13, 2011 and the English translation thereof.
Response to Office Action filed Aug. 7, 2013 in connection with Japanese Patent Application No. 2011-549186, filed Aug. 1, 2011 and the English translation thereof.
Response to Office Action filed Jul. 10, 2013 in connection with Japanese Patent Application No. 2011-225846, filed Oct. 13, 2011 and the English translation thereof.
Response to Office Action filed Jun. 10, 2013 in connection with Japanese Patent Application No. 2011-225838, filed Oct. 13, 2011 and the English translation thereof.
Response to Office Action filed Mar. 1, 2012 in connection with U.S. Appl. No. 12/367,274, filed Feb. 6, 2009.
Response to Office Action filed Sep. 10, 2013 in connection with Japanese Patent Application No. 2011-534219, filed Apr. 11, 2012 and the English translation thereof.
Response to Office Action filed Sep. 14, 2012 in U.S. Appl. No. 12/579,838, filed Oct. 15, 2009.
Response to Result of Reconsideration filed Dec. 19, 2014, in Japanese Patent Application No. 2011-549186 (51/2318).
Third Chinese Office Action (English translation of relevant portions only) for Chinese Patent Application No. 2013800292200, dated approximately Jan. 3, 2017 (10 pages).
Voluntary Amendment filed Apr. 12, 2012 in Chinese Patent Application No. 20108005095.6 filed Jul. 21, 2011.
Voluntary Amendment filed Apr. 12, 2012 in connection with Chinese Patent Application No. 20108005095.6, filed Jul. 21, 2011.
Voluntary Amendment filed Jan. 10, 2013 filed connection with Chinese Patent Application No. 201080046286.7, filed Apr. 13, 2012.
Voluntary Amendment filed May 15, 2012 in Japanese Patent Application No. 2012-534219 filed Apr. 11, 2012.
Voluntary Amendment filed Oct. 25, 2011 in Japanese Patent Application No. 2011-549186 filed Aug. 1, 2011.

\* cited by examiner

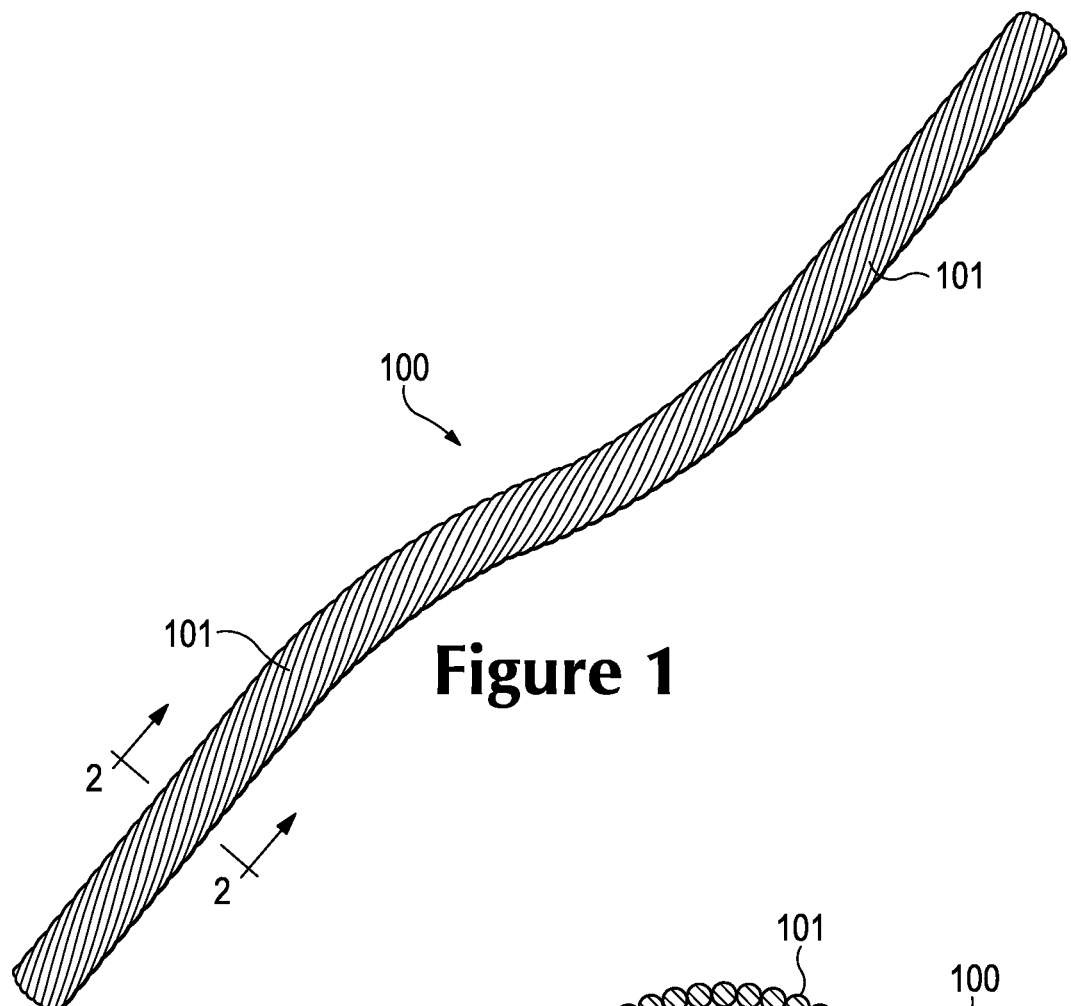
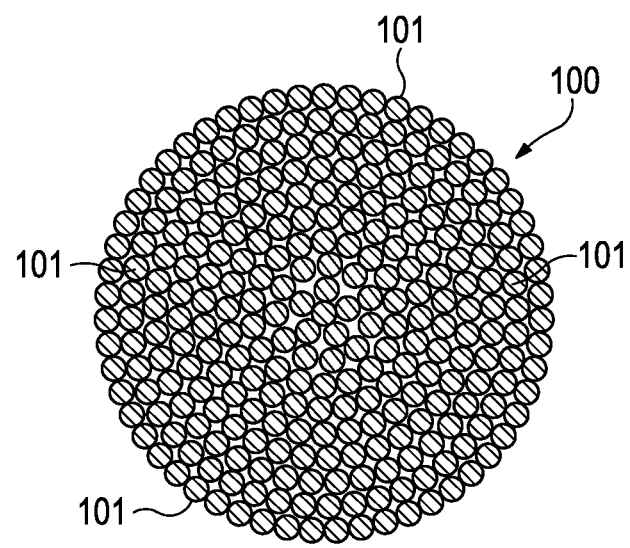

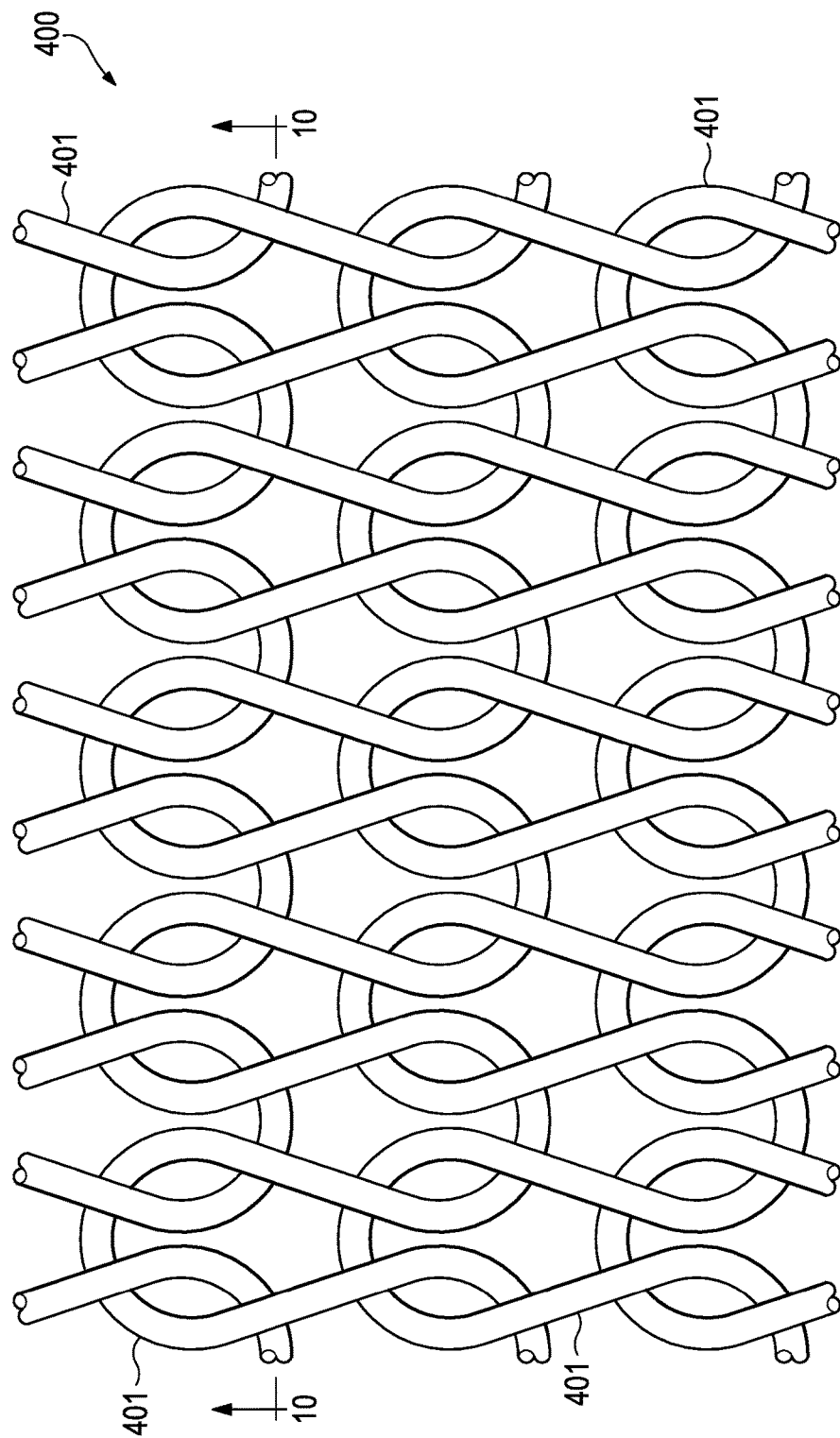
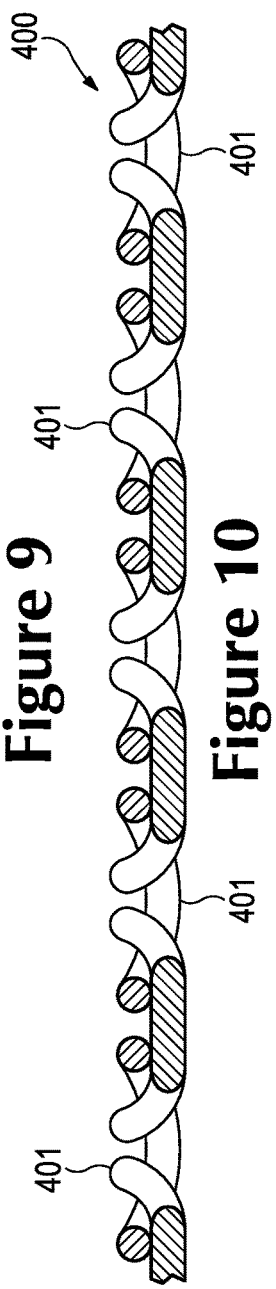
Figure 9
Figure 10

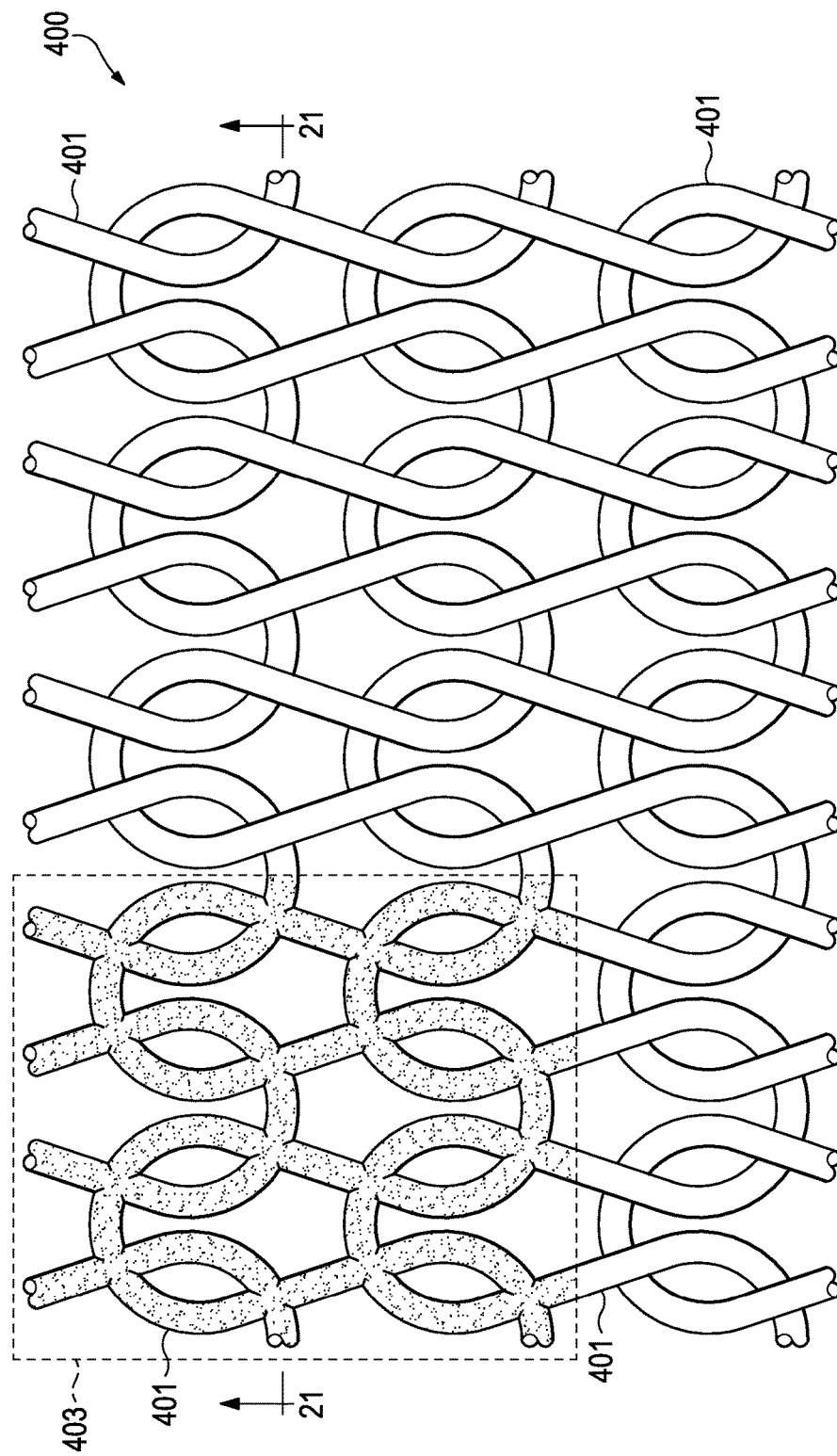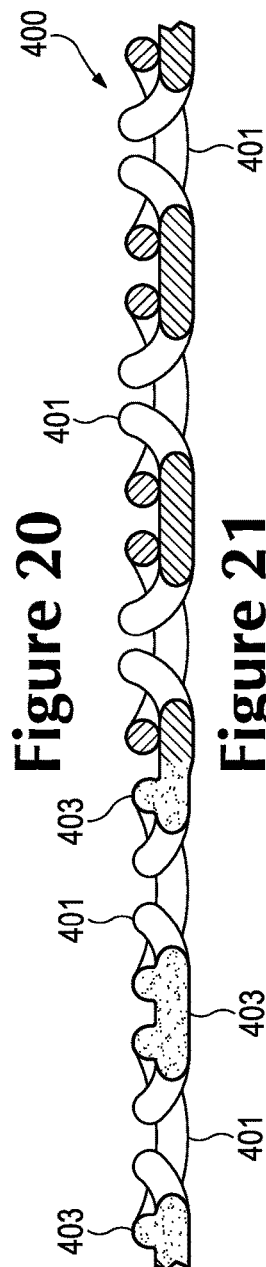
Figure 20
Figure 21

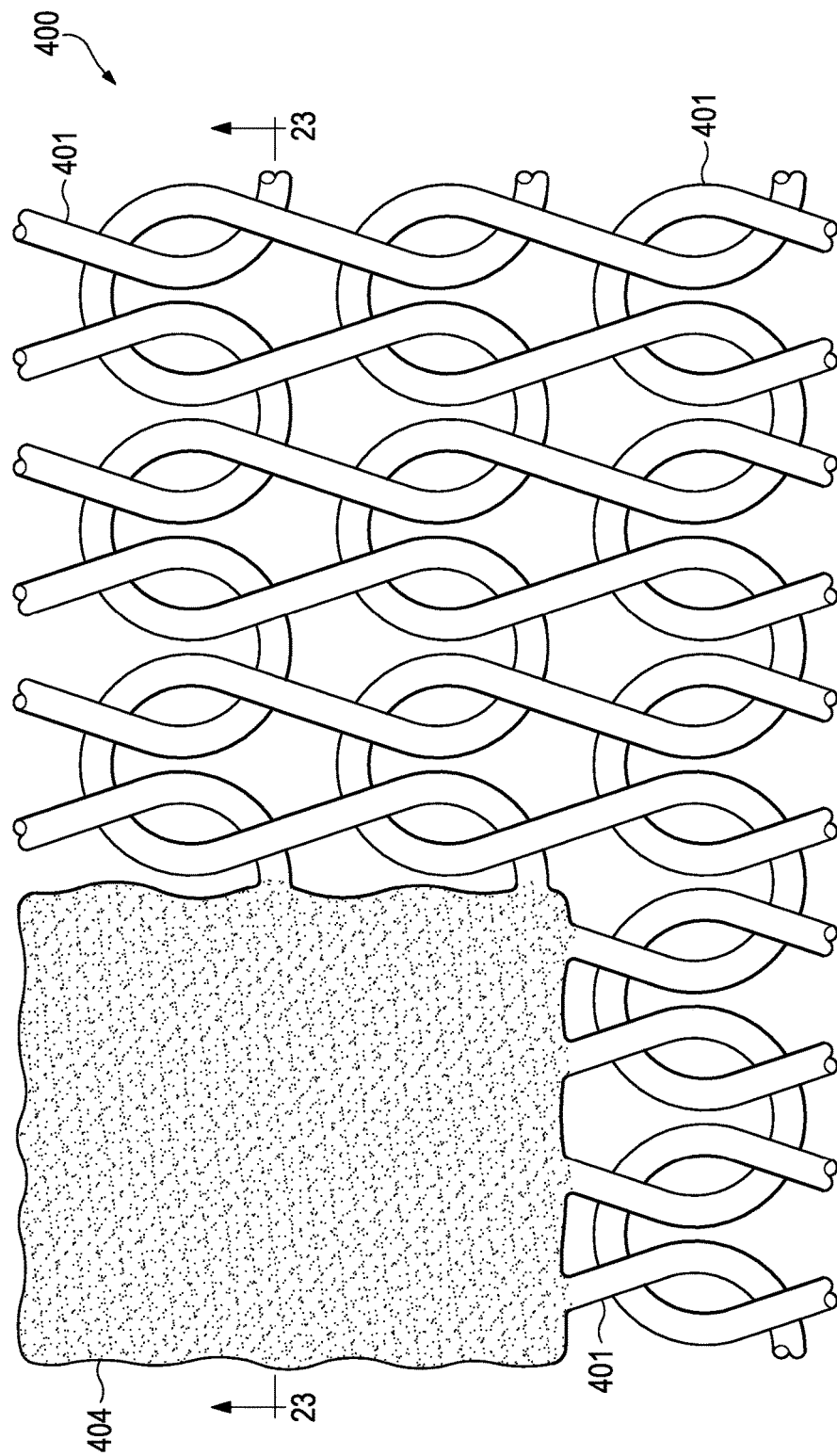
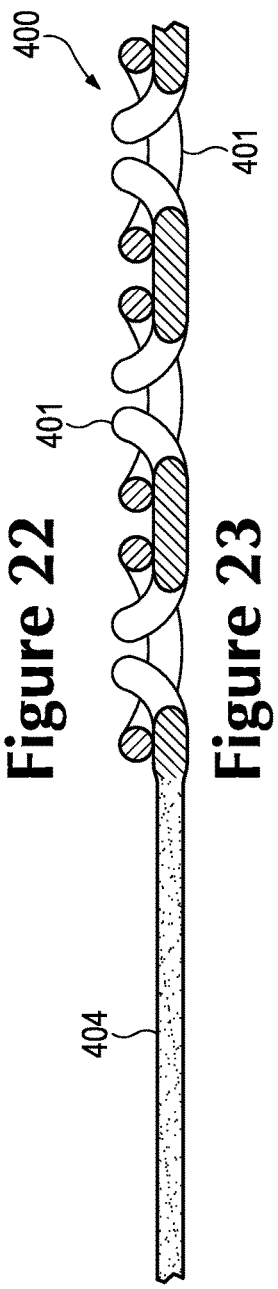
Figure 22
Figure 23

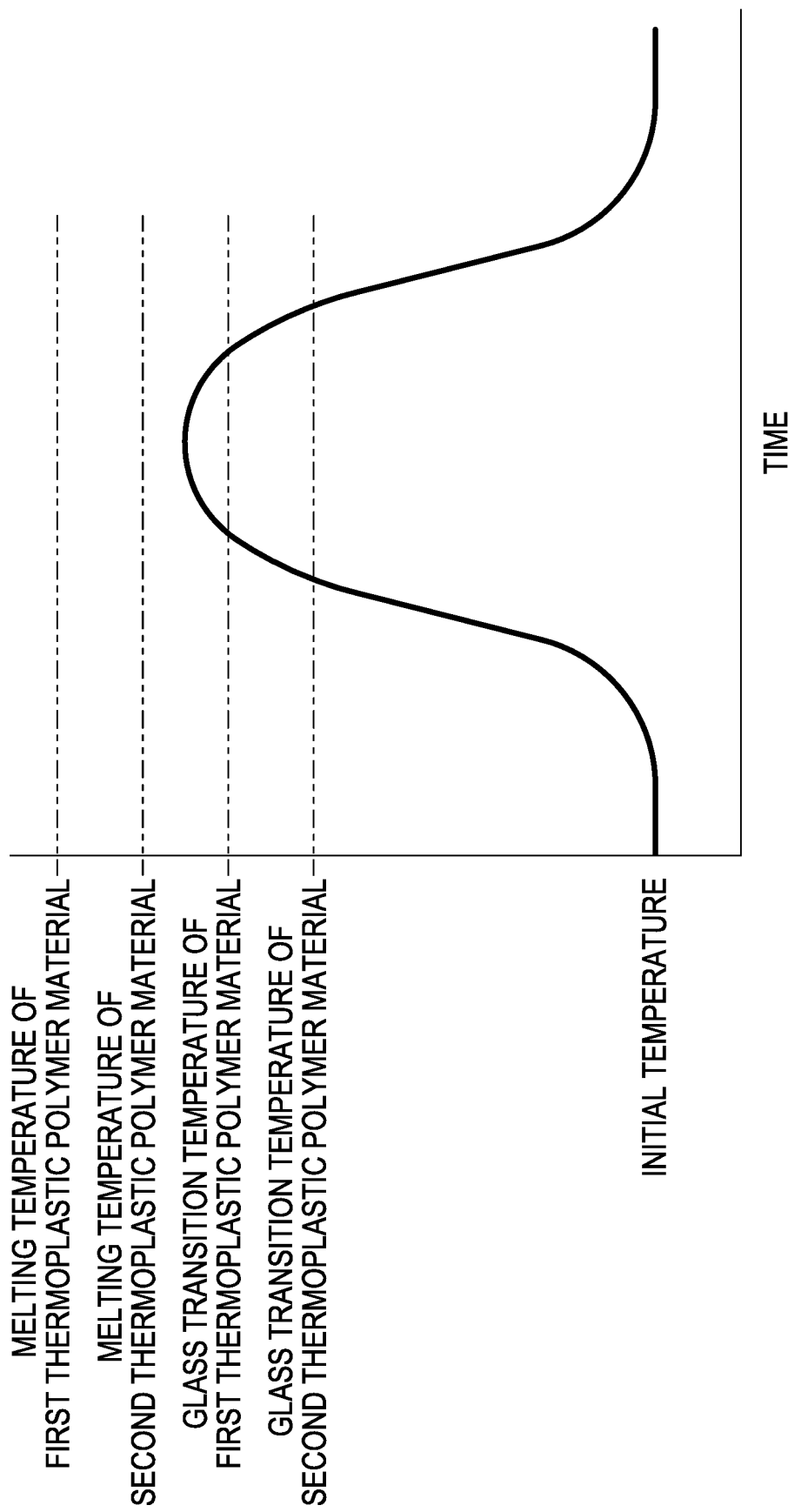

APPAREL AND OTHER PRODUCTS INCORPORATING A THERMOPLASTIC POLYMER MATERIAL

CROSS REFERENCE TO RELATED APPLICATIONS

This application is a continuation of U.S. patent application Ser. No. 15/339,485, filed Oct. 31, 2016, entitled "APPAREL AND OTHER PRODUCTS INCORPORATING A THERMOPLASTIC POLYMER MATERIAL," now issued as U.S. Pat. No. 11,779,071 which is a continuation of U.S. patent application Ser. No. 13/438,554, filed Apr. 3, 2012, entitled "APPAREL AND OTHER PRODUCTS INCORPORATING A THERMOPLASTIC POLYMER MATERIAL," now abandoned, the disclosures of which are incorporated herein by reference in their entireties.

BACKGROUND

A variety of articles are at least partially formed from textiles. As examples, apparel (e.g., shirts, pants, socks, footwear, jackets and other outerwear, briefs and other undergarments, hats and other headwear), containers (e.g., backpacks, bags), and upholstery for furniture (e.g., chairs, couches, car seats) are often formed from various textile elements that are joined through stitching or adhesive bonding. Textiles may also be utilized in bed coverings (e.g., sheets, blankets), table coverings, towels, flags, tents, sails, and parachutes. Textiles utilized for industrial purposes are commonly referred to as technical textiles and may include structures for automotive and aerospace applications, filter materials, medical textiles (e.g. bandages, swabs, implants), geotextiles for reinforcing embankments, agrotextiles for crop protection, and industrial apparel that protects or insulates against heat and radiation. Accordingly, textiles may be incorporated into a variety of articles for both personal and industrial purposes.

Textiles may be defined as any manufacture from fibers, filaments, or yarns having a generally two-dimensional structure (i.e., a length and a width that are substantially greater than a thickness). In general, textiles may be classified as non-woven textiles or mechanically-manipulated textiles. Non-woven textiles are webs or mats of filaments that are bonded, fused, interlocked, or otherwise joined. As an example, a non-woven textile may be formed by randomly depositing a plurality of polymer filaments upon a surface, such as a moving conveyor. Mechanically-manipulated textiles are often formed by weaving or interlooping (e.g., knitting) a yarn or a plurality of yarns, usually through a mechanical process involving looms or knitting machines. Whereas woven textiles include yarns that cross each other at right angles (i.e., warp and weft yarns), knitted textiles include one or more yarns that form a plurality of intermeshed loops arranged in courses and wales.

Although some products are formed from one type of textile, many products are formed from two or more types of textiles in order to impart different properties to different areas. As an example, shoulder and elbow areas of a shirt may be formed from a textile that imparts durability (e.g., abrasion-resistance) and stretch-resistance, whereas other areas may be formed from a textile that imparts breathability, comfort, stretch, and moisture-absorption. As another example, an upper for an article of footwear may have a structure that includes numerous layers formed from various types of textiles and other materials (e.g., polymer foam, leather, synthetic leather), and some of the layers may also have areas formed from different types of textiles to impart different properties. As yet another example, straps of a backpack may be formed from non-stretch textile elements, lower areas of a backpack may be formed from durable and water-resistant textile elements, and a remainder of the backpack may be formed from lightweight and compliant textile elements. Accordingly, many products may incorporate various types of textiles in order to impart different properties to different portions of the products.

In order to impart the different properties to different areas of a product, textile elements formed from the materials must be cut to desired shapes and then joined together, usually with stitching or adhesive bonding. As the number and types of textile elements incorporated into a product increases, the time and expense associated with transporting, stocking, cutting, and joining the textile elements may also increase. Waste material from cutting and stitching processes also accumulates to a greater degree as the number and types of textile elements incorporated into a product increases. Moreover, products with a greater number of textile elements and other materials may be more difficult to recycle than products formed from few elements and materials. By decreasing the number of elements and materials utilized in a product, therefore, waste may be decreased while increasing the manufacturing efficiency and recyclability.

SUMMARY

A yarn may include a plurality of substantially aligned filaments, with at least ninety-five percent of a material of the filaments being a thermoplastic polymer material.

A thread may include a first yarn and a second yarn. The first yarn includes a plurality of substantially aligned filaments, with at least ninety-five percent of a material of the filaments being a thermoplastic polymer material. The second yarn is twisted with the first yarn.

A woven textile may include a warp strand and a weft strand. The warp strand extends in a first direction and includes a plurality of substantially aligned filaments, with at least ninety-five percent of a material of the filaments being a thermoplastic polymer material. The weft strand extends in a second direction that is substantially perpendicular to the first direction.

A knitted textile may include at least one strand that forms a plurality of interlocked loops arranged in courses and wales. The strand includes a plurality of substantially aligned filaments, with at least ninety-five percent of a material of the filaments being a thermoplastic polymer material.

An article may include a first material element, a second material element, and a seam. The first material element is at least partially formed from a first thermoplastic polymer material, and the first material element is one of a woven textile and a knitted textile. At the seam, a strand extends through each of the first material element and the second material element, the strand being at least partially formed from a second thermoplastic polymer material. The first material element is thermal bonded to the second material element with the first thermoplastic polymer material at the seam. Additionally, the strand is thermal bonded to the first material element and the second material element with the second thermoplastic polymer material at the seam.

A method of joining includes stitching a pair of textile elements together with a strand to form a seam. The textile elements and the strand are heated and compressed at the seam to (a) form a thermal bond between the textile elements and (b) melt the strand.

An article of apparel includes a plurality of textile elements joined to each other at seams to form a structure for receiving a part of a wearer. The textile elements include strands that have a plurality of substantially aligned filaments formed from a thermoplastic polymer material.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIG. 1 is a plan view of a portion of a yarn.

FIG. 2 is a cross-sectional view of the yarn, as defined in FIG. 1.

FIG. 9 is a plan view of a knitted textile.

FIG. 10 is a cross-sectional view of the knitted textile, as defined in FIG. 9.

FIG. 20 is a plan view of the knitted textile with a fused region.

FIG. 21 is a cross-sectional view of the knitted textile, as defined in FIG. 20.

FIG. 22 is another plan view of the knitted textile with a fused region.

FIG. 23 is a cross-sectional view of the knitted textile, as defined in FIG. 22.

FIGS. 39A and 39B are graphs depicting temperature in the manufacturing process for the first configuration of the seam element with a stitching strand.

DETAILED DESCRIPTION

Figure 3:
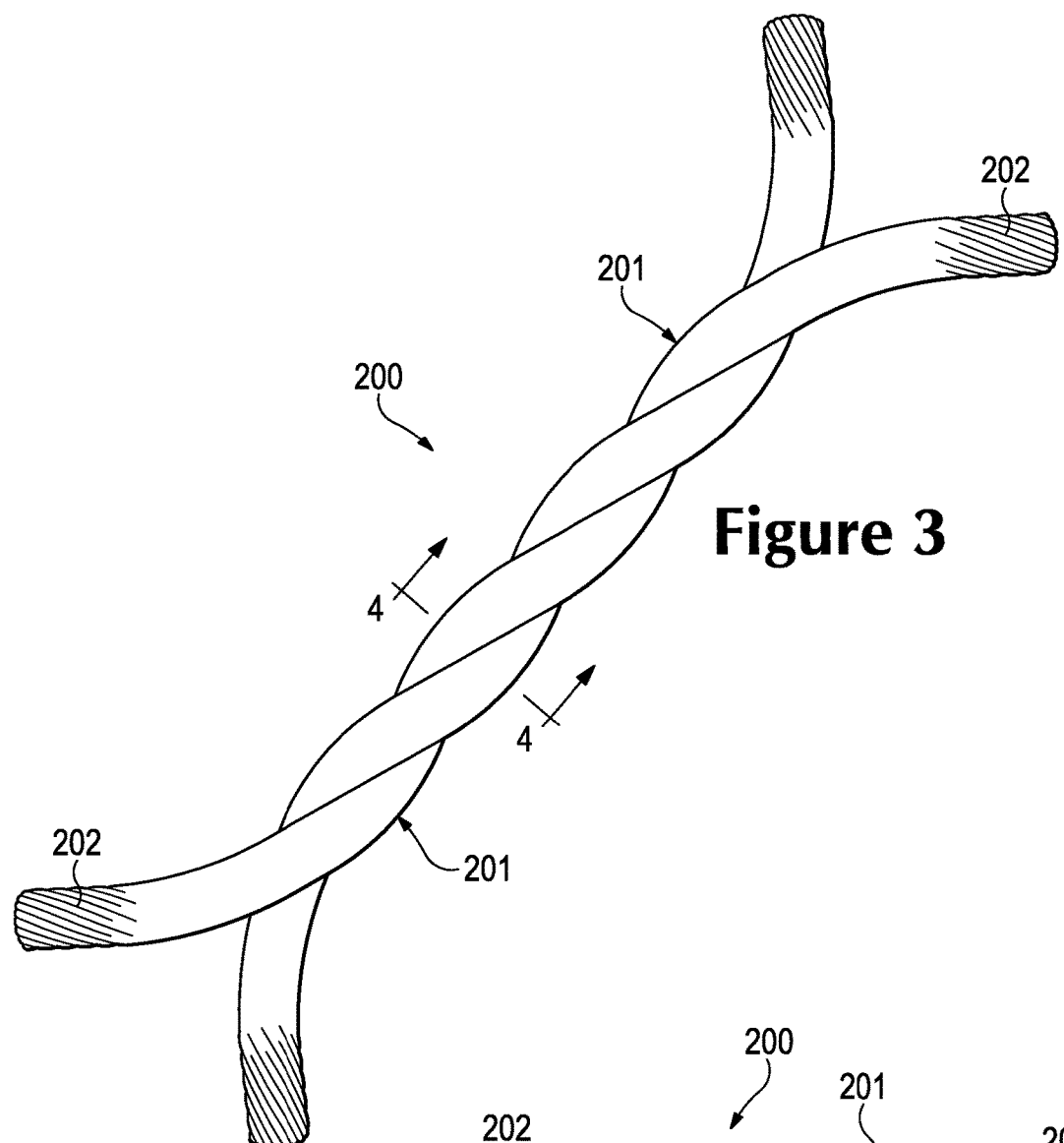
FIG. 3 is a plan view of a portion of a thread.

The following discussion and accompanying figures disclose various yarns, threads, and textiles formed from thermoplastic polymer materials. Although the yarns, threads, and textiles are disclosed below as being incorporated into various articles of apparel (e.g., shirts and footwear) for purposes of example, the yarns, threads, and textiles may also be incorporated into a variety of other articles. For example, the yarns, threads, and textiles may be utilized in other types of apparel, containers, and upholstery for furniture. The yarns, threads, and textiles may also be utilized in bed coverings, table coverings, towels, flags, tents, sails, and parachutes. Various configurations of the yarns, threads, and textiles may also be utilized for industrial purposes, as in automotive and aerospace applications, filter materials, medical textiles, geotextiles, agrotextiles, and industrial apparel. Accordingly, the yarns, threads, and textiles may be utilized in a variety of articles for both personal and industrial purposes.

A. YARN CONFIGURATION

A section of a yarn 100 is depicted in FIG. 1 as having a configuration that may be utilized for a variety of purposes, including sewing, stitching, and embroidering. Yarn 100 may also be utilized for making a thread, cable, cord, or rope. Various textiles may also be produced from yarn 100 through weaving and knitting, for example. Although a relatively short length of yarn 100 is shown, yarn 100 may have a significantly greater length. More particularly, the length of yarn 100 may significantly exceed one-thousand or even ten-thousand meters. Depending upon the manner in which yarn 100 is formed, yarn 100 may be a spun yarn or an air textured yarn.

Yarn 100 includes a plurality of filaments 101 that are bundled or otherwise gathered to form a generally thin and elongate structure. The number of filaments 101 that are incorporated into yarn 100 may vary significantly and may range between two and three-hundred or more. Fibers are often defined, in textile terminology, as having a relatively short length that ranges from one millimeter to a few centimeters or more, whereas filaments are often defined as having a longer length than fibers or even an indeterminate length. As utilized within the present document, the term "filament" or variants thereof is intended to encompass lengths of both fibers and filaments from the textile terminology definitions. Accordingly, filaments 101 or other filaments referred to herein may generally have any length. As an example, therefore, filaments 101 may have a length that ranges from one millimeter to hundreds of meters or more. Individual filaments 101 may also have lengths that extend through an entire length of yarn 100.

Filaments 101 are substantially aligned in yarn 100. As utilized herein, the term "substantially aligned" is intended to convey that filaments 100 generally extend in a common direction, which corresponds with a longitudinal axis of yarn 100. When substantially aligned, some of filaments 101 or portions of filaments 101 may be parallel with each other, but other filaments 101 or other portions of filaments 101 may cross each other or may extend in directions that are offset by a few degrees (e.g., offset in a range of zero to seven degrees) when yarn 100 is tensioned, stretched, or otherwise arranged to have a linear or straight structure.

Although filaments 101 are substantially aligned, yarn 100 is depicted as exhibiting twist, thereby imparting a rotational aspect to various filaments 101. More particularly, filaments 101 may be twisted around each other such that some filaments 101 or sections of filaments 101 have a helical structure that repeatedly wraps around the longitudinal axis of yarn 100. Although sections of filaments 101 may be generally straight, other sections may have a spiral or helical configuration that imparts the twist. In some configurations, portions of filaments 100 located in a central area of yarn 100 may be generally straight, whereas portions of filaments 100 located closer to a periphery or exterior of yarn 100 may have the spiral or helical configuration. Either an S-twist or a Z-twist may be utilized in yarn 100. An advantage of the twist is that filaments 101 are bundled more closely than in non-twist yarns to effectively reduce the size of spaces between individual filaments 101. As such filaments 101 lay against and contact each other, as depicted in FIG. 2, to minimize the overall diameter of yarn 100. Moreover, the twist in yarn 100 imparts the advantage of reducing fraying that may occur if some of filaments 101 are severed, sheared, or otherwise broken. Although yarn 100 may exhibit twist, yarn 100 may also have a straight or untwisted configuration.

Filaments 101 are primarily formed from a thermoplastic polymer material. In general, a thermoplastic polymer material softens or melts when heated and returns to a solid state when cooled. More particularly, a thermoplastic polymer material transitions from a solid state to (a) a softened state when heated to a glass transition temperature of the thermoplastic polymer material and (b) a generally liquid state when heated to a melting temperature of the thermoplastic polymer material. Then, when sufficiently cooled, the thermoplastic polymer material transitions from the softened or liquid state to the solid state. As such, the thermoplastic polymer material may be softened or melted, molded, cooled, re-softened or re-melted, re-molded, and cooled again through multiple cycles. When heated to at least the glass transition temperature, thermoplastic polymer materials may also be welded, fused, or thermal bonded, as described in greater detail below, to join an element formed from the thermoplastic polymer material to another object, item, or element. In contrast with thermoplastic polymer materials, many thermoset polymer materials do not melt when heated, simply degrading or burning instead.

Although a wide range of thermoplastic polymer materials may be utilized for filaments 101, examples of suitable thermoplastic polymer materials include thermoplastic polyurethane, polyamide, polyester, polypropylene, and polyolefin. Although filaments 101 may be formed from any of the thermoplastic polymer materials mentioned above, utilizing thermoplastic polyurethane imparts various advantages. For example, various formulations of thermoplastic polyurethane are elastomeric and stretch over one-hundred percent, while exhibiting relatively high stability or tensile strength. In comparison with some other thermoplastic polymer materials, thermoplastic polyurethane readily forms thermal bonds with other elements, as discussed in greater detail below. Also, thermoplastic polyurethane may form foam materials and may be recycled to form a variety of products.

In many configurations of yarn 100, each of filaments 101 are entirely or substantially formed from one or more thermoplastic polymer materials. That is, at least ninety-five percent, ninety-nine percent, or one-hundred percent of a material of filaments 101 is a thermoplastic polymer material. Advantages of substantially forming filaments 101 from a thermoplastic polymer material are uniform properties, the ability to form thermal bonds, efficient manufacture, elastomeric stretch, and relatively high stability or tensile strength Although a single thermoplastic polymer material may be utilized, individual filaments 101 may be formed from multiple thermoplastic polymer materials. As an example, an individual filament 101 may have a sheath-core configuration, wherein an exterior sheath of the individual filament 101 is formed from a first thermoplastic polymer material, and an interior core of the individual filament 101 is formed from a second thermoplastic polymer material. As a similar example, an individual filament 101 may have a bi-component configuration, wherein one half of the individual filament 101 is formed from a first thermoplastic polymer material, and an opposite half of the individual filament 101 is formed from a second thermoplastic polymer material. Although each of filaments 101 may be formed from a common thermoplastic polymer material, different filaments 101 may also be formed from different materials. As an example, some of filaments 101 may be formed from a first type of thermoplastic polymer material, whereas other filaments 101 may be formed from a second type of thermoplastic polymer material.

The thermoplastic polymer material of filaments 101 may be selected to have various stretch properties, and the material may be considered elastomeric. Depending upon the specific properties desired for yarn 100, filaments 101 may stretch between ten percent to more than eight-hundred percent prior to tensile failure. As a related matter, the thermoplastic polymer material utilized for filaments 101 may be selected to have various recovery properties. That is, yarn 100 or filaments 101 may be formed to return to an original shape after being stretched. Many products that incorporate yarn 100, such as textiles and articles of apparel formed from the textiles, may benefit from properties that allow yarn 100 to return or otherwise recover to an original shape after being stretched by one-hundred percent or more. Although many thermoplastic polymer materials exhibit stretch and recovery properties, thermoplastic polyurethane exhibits suitable stretch and recovery properties for various textiles and articles of apparel.

The weight of yarn 100 may vary significantly depending upon the thicknesses of individual filaments 101, the number of filaments 101, and the specific material selected for filaments 101, for example. In general, weight is measured by the unit tex, which is the weight in grams of a kilometer of yarn. Yarn 100 may range from fifty to one-thousand denier or more.

A variety of conventional processes may be utilized to manufacture yarn 100. In general, a manufacturing process for yarn 100 includes (a) extruding or otherwise forming a plurality of filaments 101 from a thermoplastic polymer material and (b) collecting or bundling filaments 101. Once bundled, filaments 101 may be twisted. Depending upon the specific characteristics desired, yarn 100 may also be subjected to an air texturing operation or other post-processing operations. Fusing processes, as discussed below, may also be performed to form thermal bonds between adjacent filaments 101.

B. THREAD CONFIGURATION

Figure 4:
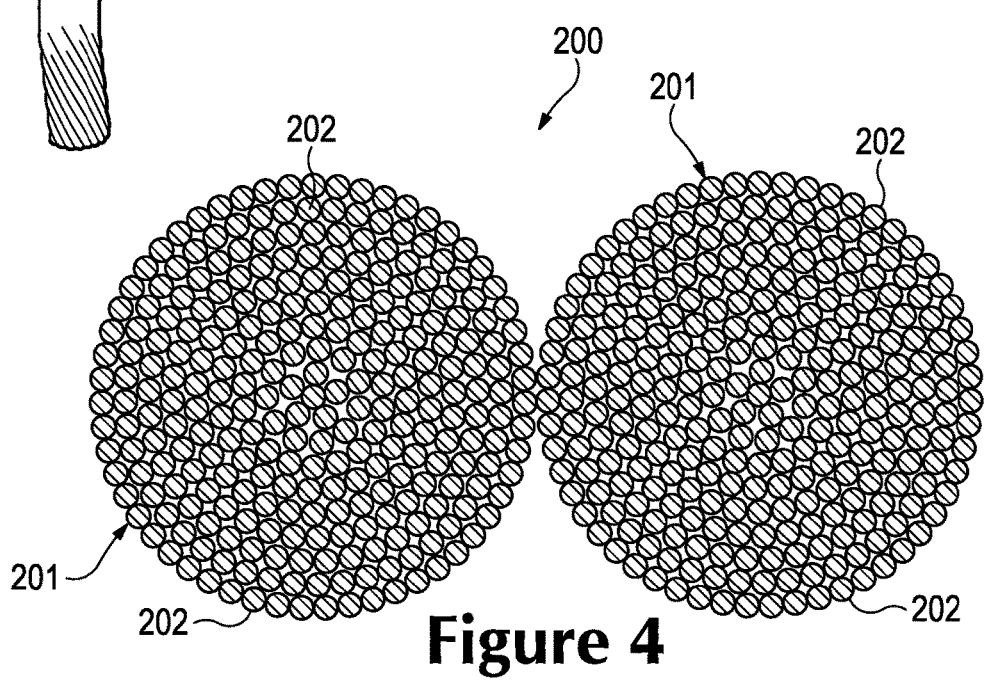
FIG. 4 is a cross-sectional view of the thread, as defined in FIG. 3.

A thread 200 is depicted in FIGS. 3 and 4 as including two yarns 201 that are twisted with each other. Although the configuration of yarns 201 may vary significantly, each of yarns 201 may exhibit the general configuration of yarn 100 discussed above. One or both of yarns 201 includes, therefore, a plurality of substantially aligned filaments 202 that are substantially formed from a thermoplastic polymer material. As such, at least ninety-five percent, ninety-nine percent, or one-hundred percent of a material of filaments 202 is a thermoplastic polymer material, such as thermoplastic polyurethane.

Figure 5:
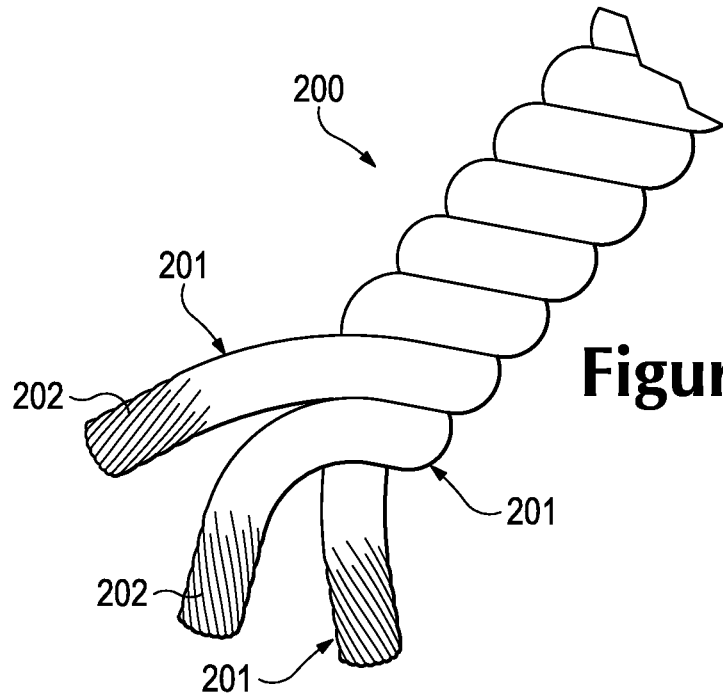
FIGS. 5 and 6 are plan views depicting further configurations of the thread.
Figure 6:
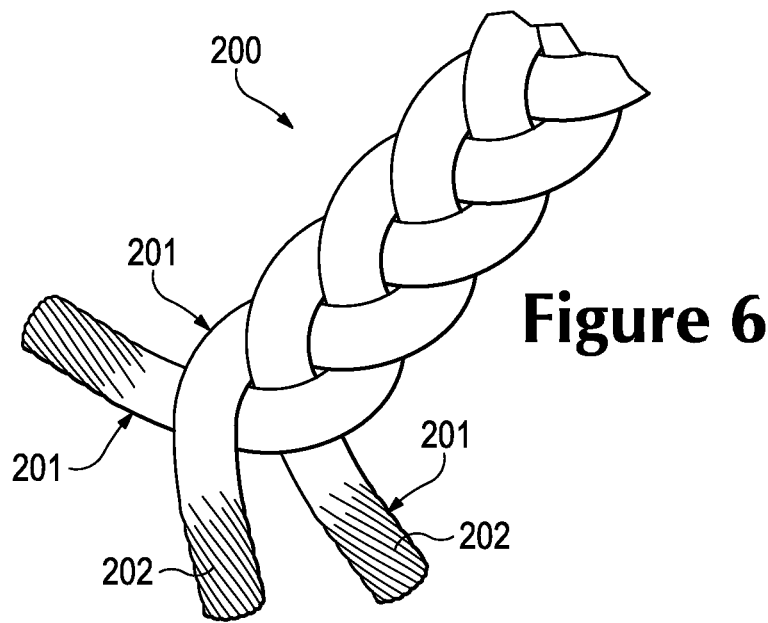

Given that two yarns 201 are twisted together, this configuration of thread 200 may be considered a two-ply thread. In other configurations, any number of yarns 201 or other yarns may be incorporated into thread 200. As an example of a three-ply threads, FIG. 5 depicts thread 200 as incorporating three yarns 201 that are twisted with each other. As another example, FIG. 6 depicts thread 200 as incorporating three yarns 201 that are twisted together through braiding. Accordingly, the number of yarns 201 and the manner in which yarns 201 are twisted with each other may vary significantly.

As with yarn 100, the weight of thread 200 may vary significantly depending upon the thicknesses of individual filaments 202, the number of filaments 202 in each yarn 201, the material selected for filaments 202, and the number of yarns 100, for example. In general, weight is measured by the unit denier, which is the weight in grams of nine-thousand meters of thread. As examples, each of yarns 201 within thread 200 may range from 50 denier to 400 denier or more.

C. TEXTILE CONFIGURATIONS

Various types of textiles may be formed from one or more strands, including either of yarn 100 and thread 200. For purposes of the following discussion, the term "strand" is defined as a generally elongate element having a length that is substantially greater than a width and thickness. Examples of various types of strands include filaments, yarns, threads, cables, cords, and ropes. As such, either of yarn 100 and thread 200 may be a strand that is incorporated into a textile.

Figure 7:
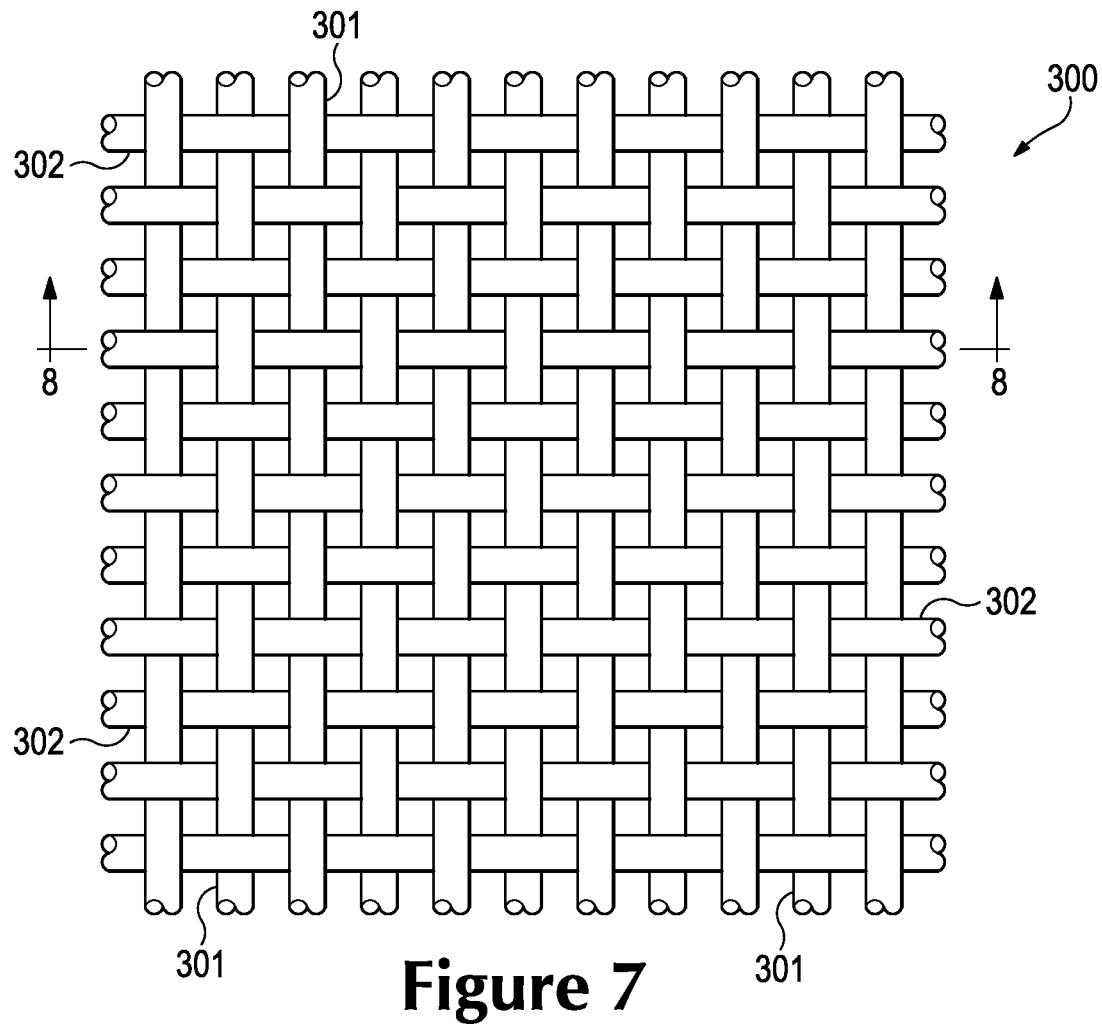
FIG. 7 is a plan view of a woven textile.
Figure 8:
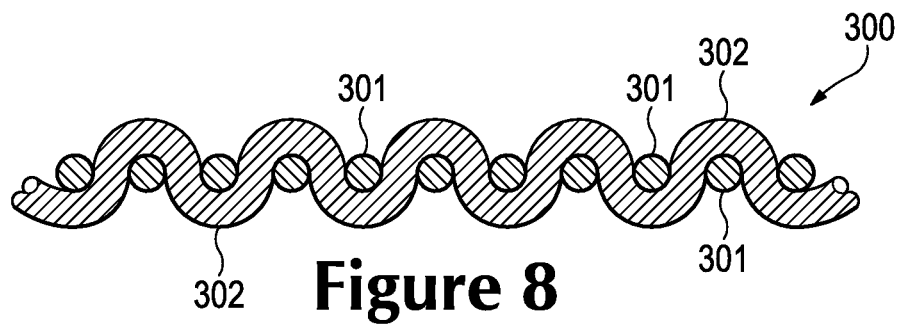
FIG. 8 is a cross-sectional view of the woven textile, as defined in FIG. 7.

As a first example of a textile, a woven textile 300 is depicted in FIG. 7 as including a plurality of warp strands 301 and weft strands 302. Whereas warp strands 301 extend in a first direction, weft strands 302 extend in a second direction that is substantially perpendicular to the first direction. Moreover, strands 301 and 302 cross each other and weave over and below each other, as depicted in FIG. 8. In manufacturing woven textile 300, strands 301 and 302 are manipulated through a weaving process, which may involve a weaving machine or loom, to cross and weave among each other at the substantially right angles. In addition to a plain weave, various configurations of woven textile may have a twill weave, satin weave, jacquard weave, or dobby weave, for example.

Although woven textile 300 is depicted as being formed from strands 301 and 302, one or more additional strands may be incorporated into the structure of woven textile 300. For example, different warp strands, weft strands, or portions of these strands may be formed from various types of strands having diverse materials, colors, or properties. Any of strands 301 and 302 may have the configuration of a filament, yarn, thread, cable, cord, or rope. Either or both of strands 301 and 302 may also exhibit the general configuration of yarn 100 or thread 200 discussed above. Strands 301 and 302 may include, therefore, a plurality of substantially aligned filaments that are substantially formed from a thermoplastic polymer material. As such, at least ninety-five percent, ninety-nine percent, or one-hundred percent of a material of the filaments or other material forming strands 301 and 302 may be a thermoplastic polymer material, such as thermoplastic polyurethane. When strands 301 and 302 are formed as a filament, cable, cord, or rope, such strands may also be substantially formed from a thermoplastic polymer material.

As a second example of a textile, a knitted textile 400 is depicted in FIGS. 9 and 10 as including at least one strand 401 that forms a plurality of intermeshed loops. More particularly, sections of strand 401 forms various loops that extend through and are intermeshed with other loops to define a variety of courses and wales. As depicted, the courses are horizontal rows of loops formed from strand 401, and the wales are vertical columns of loops formed from strand 401. In manufacturing knitted textile 400, strand 401 is manipulated through a knitting process, which may involve a knitting machine, to form and intermesh the loops, thereby defining the various of courses and wales. Although a relatively simple knit structure is depicted, numerous warp knit and weft knit structures may be formed through flat knitting, wide tube circular knitting, narrow tube circular knit jacquard, single knit circular knit jacquard, double knit circular knit jacquard, double needle bar raschel, warp knit jacquard, and tricot for example.

Although knitted textile 400 is depicted as being formed from strand 401, multiple strands may be incorporated into the structure of knitted textile 400. For example, different loops, different courses, different portions of a single course, different wales, and different portions of a single wale may be formed from strands having diverse materials, colors, and properties.

Strand 401 may have the configuration of a filament, yarn, thread, cable, cord, or rope. Strand 401 or other strands incorporated into knitted textile 400 may also exhibit the general configuration of yarn 100 or thread 200 discussed above. Strand 401 may include, therefore, a plurality of substantially aligned filaments that are substantially formed from a thermoplastic polymer material. As such, at least ninety-five percent, ninety-nine percent, or one-hundred percent of a material of the filaments or other material forming strand 401 may be a thermoplastic polymer material, such as thermoplastic polyurethane. When strand 401 is formed as a filament, cable, cord, or rope, such strands may also be substantially formed from a thermoplastic polymer material.

Figure 11:
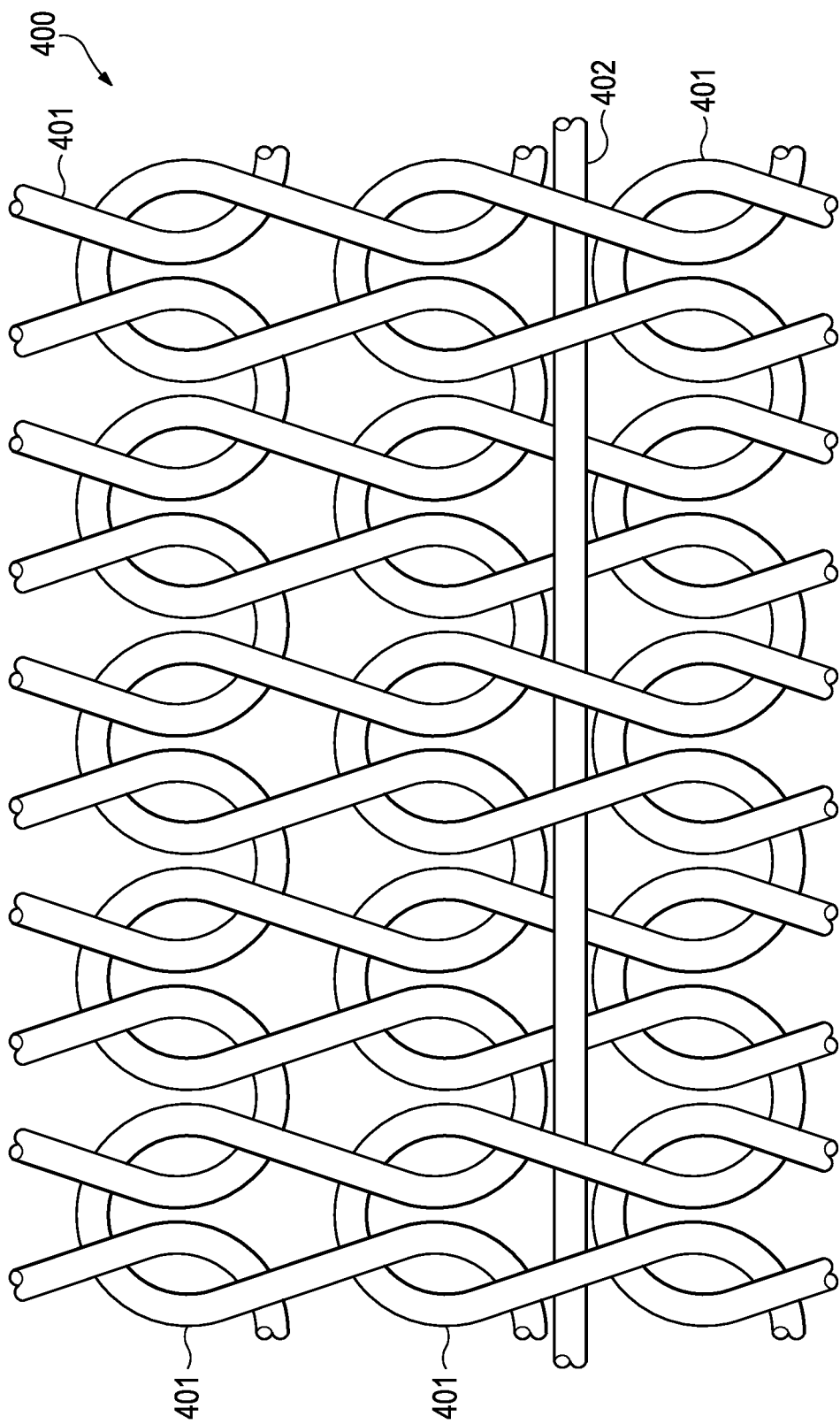
FIG. 11 is a plan view depicting a further configuration of the knitted textile.

As a variation, knitted textile 400 may also incorporate an inlaid strand 402, as depicted in FIG. 11. Inlaid strand 402 extends through the knit structure, thereby passing between the various loops within knitted textile 400. Although inlaid strand 402 is depicted as extending along a course, inlaid strand 402 may also extend along a wale. In addition to other types of strands, inlaid strand 402 may be similar to yarn 100 or thread 200, or inlaid strand 402 may have another configuration having a plurality of substantially aligned filaments that are substantially formed from a thermoplastic polymer material. Advantages of inlaid strand 402 include providing support, stability, and structure. For example, inlaid strand 402 may assist with limiting stretch or deformation in areas of knitted textile 400 and in specific directions. Additional details relating to inlaid strands and methods of incorporating inlaid strands into the structure of a knitted textile may be found with reference to U.S. patent application Ser. No. 13/048,540, which was filed in the U.S. Patent and Trademark Office on 15 Mar. 2011 and entitled Method Of Manufacturing A Knitted Component, such application being entirely incorporated herein by reference.

Woven textile 300 and knitted textile 400 provide examples of textile structures that may incorporate yarn 100, thread 200, or other strands formed from thermoplastic polymer materials. A variety of other types of textiles may also incorporate similar strands. For example, textiles formed through crocheting or intertwining and twisting may have strands with a plurality of substantially aligned filaments that are substantially formed from a thermoplastic polymer material. Similarly, mesh textiles, spacer mesh textiles, jersey textiles, fleece textiles, and terry loop textiles may have strands with a plurality of substantially aligned filaments that are substantially formed from a thermoplastic polymer material.

D. THERMAL BONDING OF YARNS, THREADS, AND TEXTILES

Thermal bonding is an advantage of thermoplastic polymer materials not generally present in yarns, threads, and textiles, for example, formed from natural materials (e.g., cotton, silk) and thermoset polymer materials. As discussed above, a thermoplastic polymer material softens or melts when heated and returns to a solid state when cooled. In addition to permitting molding or shaping, an element formed from a thermoplastic polymer material may also be welded, fused, or thermal bonded to another object, item, or element. That is, the thermoplastic polymer material may be used to join two elements together through thermal bonding. As utilized herein, the term "thermal bonding" or variants thereof is defined as a securing technique between two elements that involves a softening or melting of a thermoplastic polymer material within at least one of the elements such that the elements are secured to each other when cooled. Similarly, the term "thermal bond" or variants thereof is defined as the bond, link, or structure that joins two elements through a process that involves a softening or melting of a thermoplastic polymer material within at least one of the elements such that the elements are secured to each other when cooled.

Examples of thermal bonding include (a) the melting or softening of two elements incorporating thermoplastic polymer materials such that the thermoplastic polymer materials intermingle with each other (e.g., diffuse across a boundary layer between the thermoplastic polymer materials) and are secured together when cooled; (b) the melting or softening of an element incorporating a thermoplastic polymer material such that the thermoplastic polymer material extends into or infiltrates the structure of a strand (e.g., extends around or bonds with filaments in the strand) to secure the elements together when cooled; (c) the melting or softening of an element incorporating a thermoplastic polymer material such that the thermoplastic polymer material extends into or infiltrates the structure of a textile element (e.g., extends around or bonds with filaments or fibers in the textile element) to secure the elements together when cooled; and (d) the melting or softening of an element incorporating a thermoplastic polymer material such that the thermoplastic polymer material extends into or infiltrates crevices or cavities formed in another element (e.g., polymer foam or sheet, plate, structural device) to secure the elements together when cooled. Thermal bonding may occur when only one element includes a thermoplastic polymer material or when both elements include thermoplastic polymer materials. In general, therefore, thermal bonding involves directly bonding elements to each other with heat. In some situations, however, stitching or adhesives may be utilized to supplement the thermal bond or the joining of elements through thermal bonding.

One of the factors affecting the degree of fusing is temperature. As noted above, a thermoplastic polymer material transitions from a solid state to (a) a softened state when heated to a glass transition temperature of the thermoplastic polymer material and (b) a generally liquid state when heated to a melting temperature of the thermoplastic polymer material. Thermal bonding may occur when the thermoplastic polymer material is heated to the glass transition temperature. Greater degrees of thermal bonding, as discussed below, may occur at elevated temperatures approaching or exceeding the melting temperature.

Figure 12:
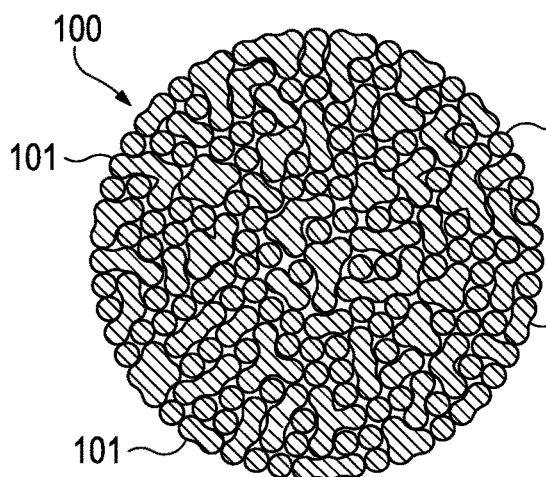
FIGS. 12 and 13 are cross-sectional views corresponding with FIG. 2 and depicting examples of fused configurations of the yarn.
Figure 13:
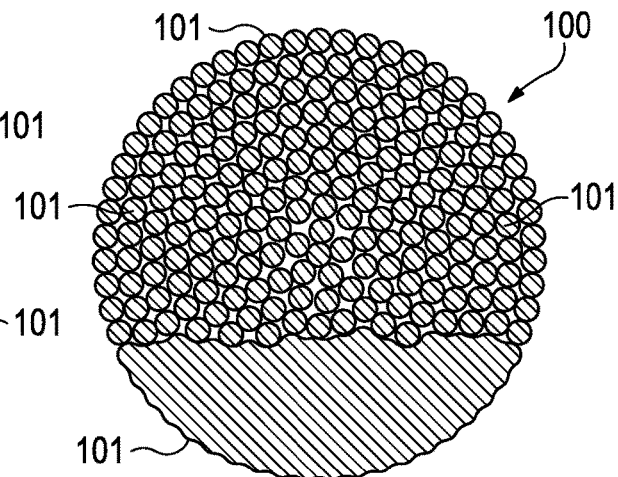

Given that yarn 100, thread 200, woven textile 300, and knitted textile 400 incorporate thermoplastic polymer materials, these elements may be subjected to thermal bonding processes. As an example, FIG. 12 depicts a configuration of yarn 100 with thermal bonds that fuse various filaments 101. When exposed to sufficient heat, and possibly pressure, the thermoplastic polymer material of the various filaments 101 in yarn 100 transitions from a solid state to either a softened state or a liquid state. Moreover, filaments 101 may fuse with each other through thermal bonding to effectively combine two or more filaments 101. Although some of filaments 101 remain separate from or unfused to other filaments 101, other filaments 101 are thermal bonded to each other in groups of two, three, four, or more. That is, some thermal bonds fuse only two filaments 101 to each other, whereas other thermal bonds fuse three or more filaments 101 to each other. FIG. 13 depicts another configuration wherein approximately half of filaments 101 remain separate from or unfused to other filaments 101, whereas the other half of filaments 101 are all thermal bonded to each other to form a single mass of thermoplastic polymer material within yarn 100.

Based upon comparisons between FIGS. 2, 12 and 13, filaments 101 may exhibit a range of thermal bonding extending from (a) a state where the various filaments 101 remain separate and identifiable within yarn 100 to (b) a state where the various filaments 101 combine to form a larger mass of thermoplastic polymer material within yarn 100. That is, (a) filaments 101 remain entirely separate from each other, (b) relatively small numbers of filaments 101 may be thermal bonded to each other, but remain in a generally filamentous configuration, or (c) numerous filaments 101 may be thermal bonded to each other to form a generally non-filamentous configuration. Although not depicted, all of filaments 101 in yarn 100 may be thermal bonded to each other to effectively combine the thermoplastic polymer material from each of filaments 101 into a single strand (e.g., similar to a monofilament). Accordingly, the degree of thermal bonding in yarn 100 may vary considerably.

Figure 14:
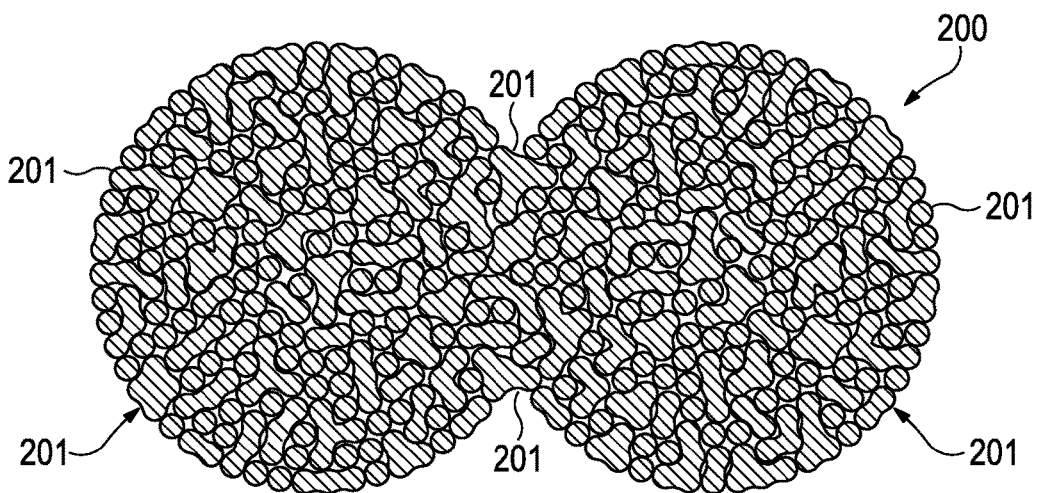
FIGS. 14 and 15 are cross-sectional views corresponding with FIG. 4 and depicting examples of fused configurations of the thread.
Figure 15:
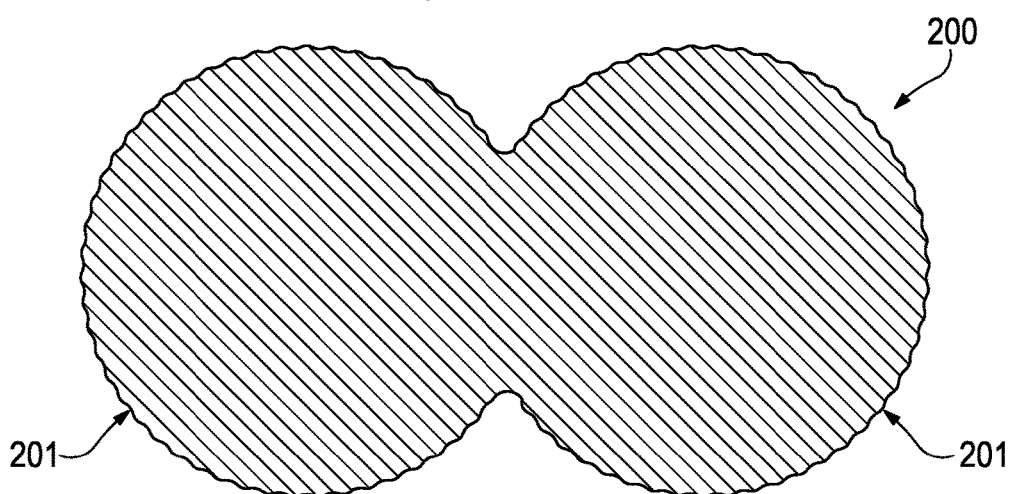

Another example of thermal bonding is depicted in FIG. 14, wherein thread 200 exhibits thermal bonding. More particularly, the various filaments 202 within yarns 201 of thread 200 are fused to a degree that is comparable with FIG. 12. Notably, some of filaments 202 from one yarn 201 are fused or thermal bonded with some of filaments 202 from the other yarn 201. That is, yarns 201 within thread 200 are thermal bonded to each other, thereby effectively joining the two yarns 201. As with the thermal bonding of yarn 100 discussed above, thread 200 may exhibit a range of thermal bonding extending from (a) a state where the various filaments 202 remain separate and identifiable to (b) a state where the various filaments 202 combine to form a larger mass of thermoplastic polymer material. Referring to FIG. 15, for example, each of filaments 202 of yarns 201 in thread 200 may be thermal bonded to each other to effectively combine the thermoplastic polymer material from each yarn 201 into joined strands (i.e., joined monofilaments). Accordingly, the degree of thermal bonding in thread 200 may vary considerably.

Figure 16:
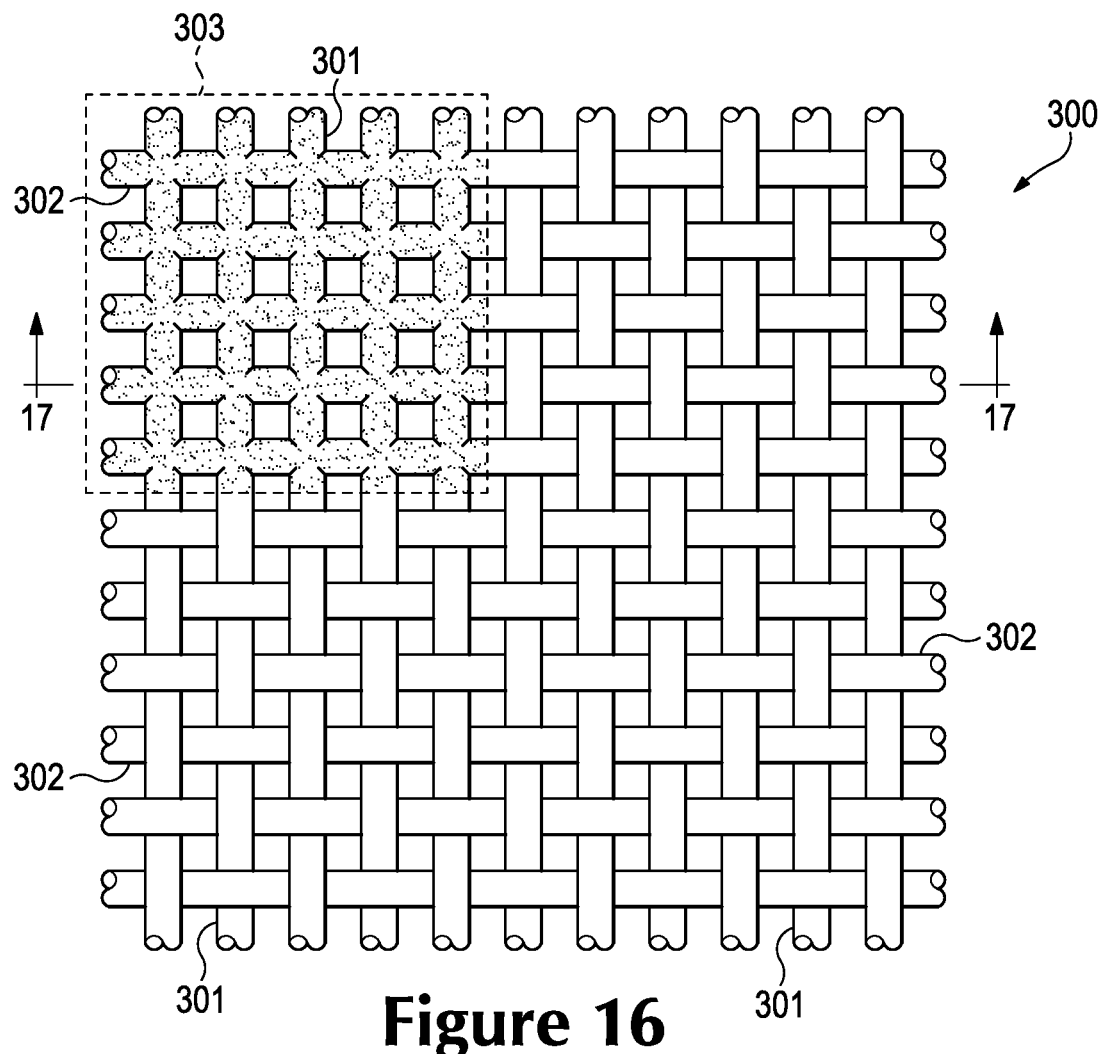
FIG. 16 is a plan view of the woven textile with a fused region.
Figure 17:
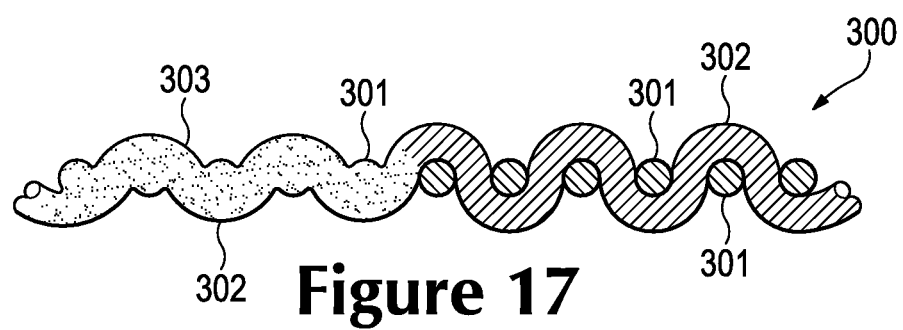
FIG. 17 is a cross-sectional view of the woven textile, as defined in FIG. 16.

A further example of thermal bonding is depicted in FIGS. 16 and 17, wherein woven textile 300 includes a fused region 303. In comparison with other regions of woven textile 300, in which strands 301 and 302 are unbonded or unfused to each other, strands 301 and 302 are fused or otherwise thermal bonded to each other in fused region 303. That is, a thermoplastic polymer material within one or both of strands 301 and 302 effectively forms a thermal bond to join strands 301 and 302 to each other in fused region 303. Given that strands 301 and 302 may have the general configuration of a filament, yarn, thread, cable, cord, or rope, as well as the configuration of yarn 100 or thread 200, the manner in which strands 301 and 302 are fused to each other may vary considerably. When, for example, strands 301 and 302 exhibit the configuration of yarn 100, areas where strands 301 and 302 cross or contact each other may be thermal bonded in a manner that is similar to FIGS. 14 and 15. Moreover, the filaments within strands 301 and 302 may exhibit a range of thermal bonding extending from (a) a state where the various filaments remain separate and identifiable to (b) a state where the various filaments combine to form a larger mass of thermoplastic polymer material. Similar concepts apply when strands 301 and 302 exhibit the configuration of thread 200 or another type of strand.

Woven textile 300 may also exhibit thermal bonding in fused region 303 when each of strands 301 and 302 have different configurations or are formed from different materials. When, for example, warp strand 301 is a filament formed from a thermoplastic polymer material and weft strand 302 is a thread formed from a thermoset polymer material, the thermoplastic polymer material in warp strand 301 may infiltrate the structure of the thread forming weft strand 302 by extending around filaments in the thread to secure strands 301 and 302 together when cooled. As another example, when warp strand 301 is a cord formed from a thermoplastic polymer material and weft strand 302 is a filament formed from a thermoset polymer material, the thermoplastic polymer material in warp strand 301 may infiltrates crevices or cavities in the filament forming weft strand 302 to secure strands 301 and 302 together when cooled.

Figure 18:
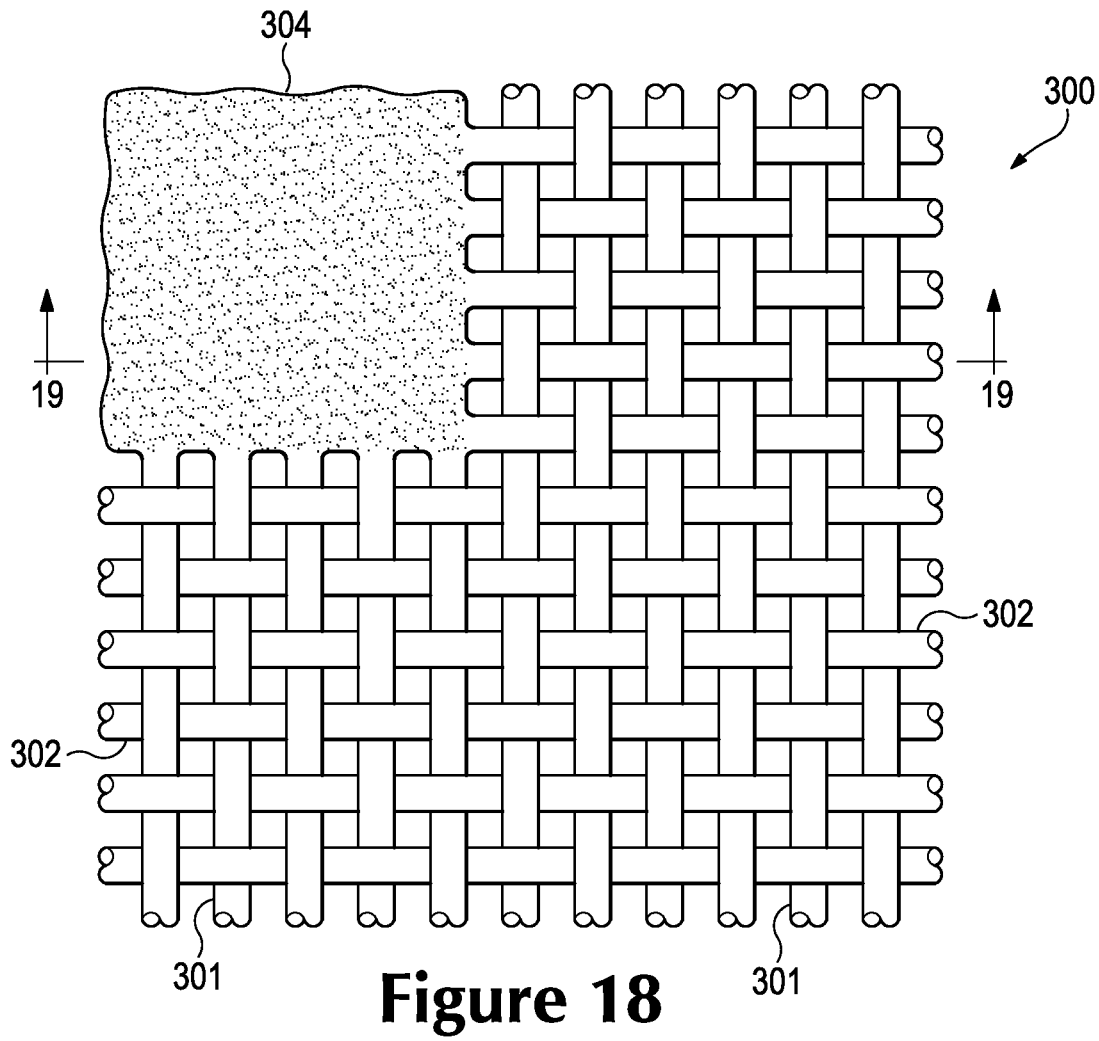
FIG. 18 is another plan view of the woven textile with a fused region.
Figure 19:
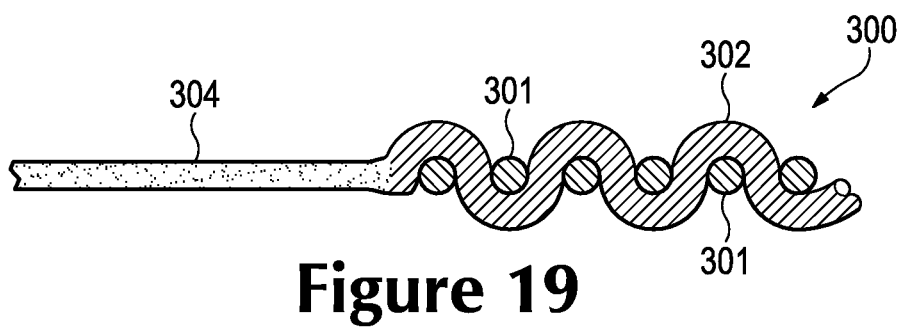
FIG. 19 is a cross-sectional view of the woven textile, as defined in FIG. 18.

The degree to which strands 301 and 302 melt or transition from a filamentous to a non-filamentous state when forming the thermal bonds may also vary. Referring again to FIGS. 16 and 17, strands 301 and 302 remain identifiable within the structure of fused region 303. Individual filaments may also remain identifiable similar to FIGS. 12 and 14. In FIGS. 18 and 19, however, the thermoplastic polymer material from strands 301 and 302 has melted into a non-filamentous state that effectively forms a solid polymer sheet in a fused region 304, with neither strands 301 and 302 nor individual filaments in strands 301 and 302 being identifiable. As such, thermal bonding in woven textile 300 may range from (a) a state where the various elements remain separate and identifiable, as in fused region 303, to (b) a state where the various elements combine to form a larger mass of thermoplastic polymer material, as in fused region 304.

A variety of factors relating to the configuration of woven textile 300 and the processes by which fused regions 303 and 304 are formed determine the degree to which strands 301 and 302 are thermal bonded. As examples, factors that determine the degree of fusing include (a) the particular thermoplastic polymer material forming strands 301 and 302, (b) the temperature (e.g., glass transition and melting temperatures) that fused regions 303 and 304 are exposed to, (c) the pressure that fused regions 303 and 304 are exposed to, and (d) the time at which fused regions 303 and 304 are exposed to the elevated temperature and/or pressure. By varying these factors, the degree of fusing or thermal bonding that results within fused regions 303 and 304 may also be varied. Similar factors also apply to the thermal bonding within yarn 100 and thread 200.

Another example of thermal bonding is depicted in FIGS. 20 and 21, wherein knitted textile 400 includes a fused region 403. In comparison with other regions of knitted textile 400, in which strand 401 is unbonded or unfused to itself, strand 401 is fused or otherwise thermal bonded to itself in fused region 403. That is, a thermoplastic polymer material within one portion of strand 401 effectively forms a thermal bond with another portion of strand 401 in fused region 403. Given that strand 401 may have the general configuration of a filament, yarn, thread, cable, cord, or rope, as well as the configuration of yarn 100 or thread 200, the manner in which portions of strand 401 are fused to each other may vary considerably. When, for example, strand 401 exhibits the configuration of yarn 100, the portions of strand 401 that cross or contact each other may be thermal bonded in a manner that is similar to FIGS. 14 and 15. Moreover, the filaments within strand 401 may exhibit a range of thermal bonding extending from (a) a state where the various filaments remain separate and identifiable to (b) a state where the various filaments combine to form a larger mass of thermoplastic polymer material. Similar concepts apply when strand 401 exhibits the configuration of thread 200 or another type of strand.

Knitted textile 400 may also exhibit thermal bonding in fused region 403 when strand 401 and one or more additional strands (e.g., inlaid strand 402) are incorporated into knitted textile 400. In this configuration, thermal bonding may be similar to the various examples provided above for different types of strands 301 and 302 in fused region 303 of woven textile 300. In effect, thermal bonding may join strands within fused region 403 that have different configurations or are formed from different materials.

The degree to which strand 401 melts or transitions from a filamentous to a non-filamentous state when forming the thermal bonds may also vary. Referring again to FIGS. 20 and 21, sections of strand 401 remain identifiable within the structure of fused region 403. Individual filaments may also remain identifiable similar to FIG. 14. In FIGS. 22 and 23, however, the thermoplastic polymer material from strand 401 has melted into a non-filamentous state that effectively forms a solid polymer sheet in a fused region 404, with neither strand 401 nor individual filaments in strand 401 being identifiable. As such, thermal bonding in knitted textile 400 may range from (a) a state where the various elements remain separate and identifiable, as in fused region 403, to (b) a state where the various elements combine to form a larger mass of thermoplastic polymer material, as in fused region 404.

As with woven textile 300, factors that determine the degree of fusing in knitted textile 400 include (a) the particular thermoplastic polymer material forming strand 401, (b) the temperature (e.g., glass transition and melting temperatures) that fused regions 403 and 404 are exposed to, (c) the pressure that fused regions 403 and 404 are exposed to, and (d) the time at which fused regions 403 and 404 are exposed to the elevated temperature and/or pressure. By varying these factors, the degree of fusing or thermal bonding that results within fused regions 403 and 404 may also be varied.

Based upon the above discussion, yarn 100, thread 200, other strands, textiles 300 and 400, and other textiles may exhibit fusing or may form thermal bonds due to the presence of a thermoplastic polymer material. As presented in the various examples, filaments 101 within yarn 100 may form thermal bonds with each other to various degrees, and filaments 202 or yarns 201 within thread 200 may form thermal bonds with each other to various degrees. Moreover, woven textile 300 may have a fused region 303 or 304 and a remaining unfused region, with warp strand 301 and weft strand 302 being thermal bonded to each other in fused regions 303 and 304 and being unbonded to each other in the unfused region. Similarly, knitted textile 400 may include a fused region 403 or 404 and a remaining unfused region, with a section of strand 401 being thermal bonded to a different section of strand 401 in fused regions 403 and 404. Although fused regions 303, 304, 403, and 404 are shown as being a relatively small part of textiles 300 and 400, a larger part or substantially all of textiles 300 and 400 may exhibit thermal bonding.

E. PROPERTIES OF FUSED REGIONS

Figure 24:
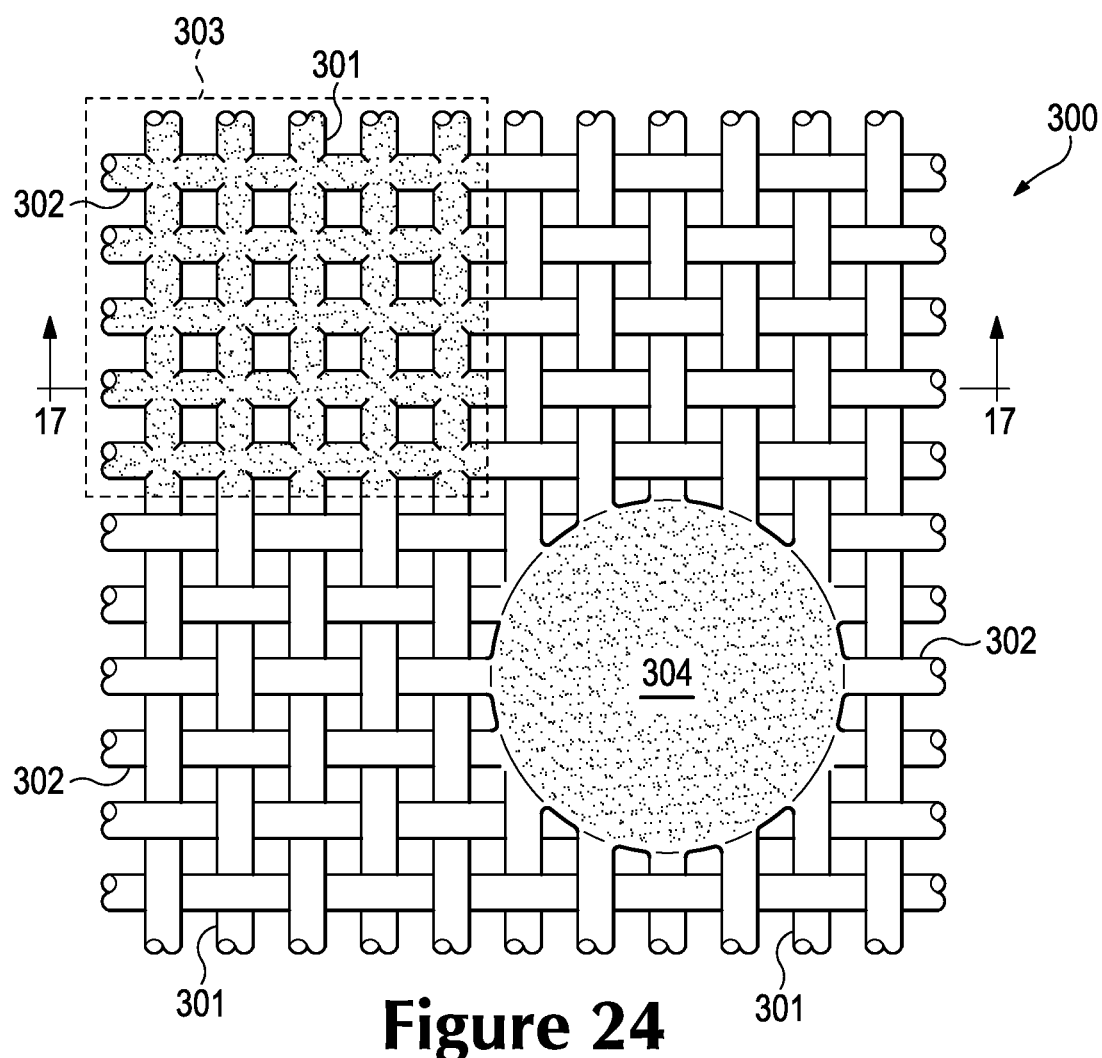
FIG. 24 is a plan view of the woven textile with multiple fused regions.

The properties of fused regions 303 and 304 may be different than the properties of unfused regions in woven textile 300. In configurations where woven textile 300 has multiple fused regions, the properties of one of the fused regions may be different than the properties of another of the fused regions. For example, FIG. 24 depicts a configuration of woven textile 300 having both fused regions 303 and 304. In comparison, the properties of fused region 303 may be different than the properties of fused region 304 to impart different properties to different areas of woven textile 300.

In manufacturing woven textile 300 and forming fused regions 303 and 304, specific properties may be applied to woven textile 300 in the areas of fused regions 303 and 304. More particularly, the shapes of fused regions 303 and 304, positions of fused regions 303 and 304, sizes of fused regions 303 and 304, degree to which strands 301 and 302 are fused within fused regions 303 and 304, and other aspects of woven textile 300 may be varied to impart specific properties to specific areas of woven textile 300. As an example, fused regions 303 and 304 have different shapes (e.g., square and circular) in FIG. 24. Accordingly, woven textile 300 may be engineered, designed, or otherwise structured to have particular properties in different areas.

Examples of properties that may be varied through the addition or the configuration of fused regions 303 and 304 include permeability, durability, and stretch-resistance. By forming one of fused regions 303 and 304 in a particular area of woven textile 400, the permeability of that area generally decreases, whereas both durability and stretch-resistance generally increases. As discussed in greater detail below, the degree to which strands 301 and 302 are fused to each other has a significant effect upon the change in permeability, durability, and stretch-resistance. Other factors that may affect permeability, durability, and stretch-resistance include the shapes, positions, and sizes of fused regions 303 and 304, as well as the specific thermoplastic polymer material forming strands 301 and 302.

Permeability generally relates to ability of air, water, and other fluids (whether gaseous or liquid) to pass through or otherwise permeate woven textile 300. Depending upon the degree to which strands 301 and 302 are fused to each other, the permeability may vary significantly. In general, the permeability is highest in areas of woven textile 300 where strands 301 and 302 are fused the least, and the permeability is lowest in areas of woven textile 300 where strands 301 and 302 are fused the most. As such, the permeability may vary along a spectrum depending upon the degree to which strands 301 and 302 are fused to each other. Areas of woven textile 300 that are separate from fused regions 303 and 304 (i.e., unfused areas of woven textile 300) generally exhibit a relatively high permeability. Due to the openings between strands 301 and 302, fused region 303 may also exhibit a relatively high permeability, but the permeability is generally less than in areas separate from fused regions 303 and 304. Due to the non-filamentous state that effectively forms a solid polymer sheet, fused region 304 exhibits a relatively low permeability.

Durability generally relates to the ability of woven textile 300 to remain intact, cohesive, or otherwise undamaged, and may include resistances to wear, abrasion, and degradation from chemicals and light. Depending upon the degree to which strands 301 and 302 are fused to each other, the durability may vary significantly. Although the durability of any portion of woven textile 300 may be considered high, the durability is lowest in areas of woven textile 300 where strands 301 and 302 are fused the least, and the durability is highest in areas of woven textile 300 where strands 301 and 302 are fused the most. As such, the durability may vary along a spectrum depending upon the degree to which strands 301 and 302 are fused to each other. Moreover, fused region 303 may have lesser durability than fused region 304. Other factors that may affect the general durability of fused regions 303 and 304 and other areas of woven textile 300 include the initial thickness and density of woven textile 300 and the type of thermoplastic polymer material forming strands 301 and 302.

Stretch-resistance generally relates to the ability of woven textile 300 to resist stretching when subjected to a textile force. As with permeability and durability, the stretch-resistance of woven textile 300 may vary significantly depending upon the degree to which strands 301 and 302 are fused to each other. Although the stretch-resistance of any portion of woven textile 300 may be considered high, the stretch-resistance is lowest in areas of woven textile 300 where strands 301 and 302 are fused the least, and the stretch-resistance is highest in areas of woven textile 300 where strands 301 and 302 are fused the most. The thermoplastic polymer material or other materials utilized for woven textile 300 may be considered elastomeric or may stretch at least one-hundred percent prior to tensile failure. Although the stretch-resistance of woven textile 300 may be greater in areas where strands 301 and 302 are fused the most, fused region 304 may still be elastomeric or may stretch at least one-hundred percent prior to tensile failure. Other factors that may affect the general stretch properties of fused regions 303 and 304 and other areas of woven textile 300 include the initial thickness and density of woven textile 300 and the type of thermoplastic polymer material forming strands 301 and 302.

As discussed in greater detail below, woven textile 300 may be incorporated into a variety of products, including various articles of apparel (e.g., shirts, footwear). Taking a shirt as an example, woven textile 300 may form a majority of the shirt, including a torso region and two arm regions. Given that moisture may accumulate within the shirt from perspiration, a majority of the shirt may be formed from portions of woven textile 300 that do not include fused regions 303 and 304 in order to provide a relatively high permeability. Given that elbow areas of the shirt may be subjected to relatively high abrasion as the shirt is worn, some of fused regions 303 and 304 may be located in the elbow areas to impart greater durability. Additionally, given that the neck opening may be stretched as the shirt is put on an individual and taken off the individual, one of fused regions 303 and 304 may be located around the neck opening to impart greater stretch-resistance. Accordingly, one material (i.e., woven textile 300) may be used throughout the shirt, but by fusing different areas to different degrees, the properties may be advantageously-varied in different areas of the shirt.

The above discussion focused primarily on the properties of permeability, durability, and stretch-resistance. A variety of other properties may also be varied through the addition or the configuration of fused regions 303 and 304. For example, the overall density of woven textile 300 may be increased as the degree of fusing increases. The transparency of woven textile 300 may also be increased as the degree of fusing increases. Depending upon various factors, the saturation of a color of woven textile 300 may also increase as the degree of fusing increases. Fused regions 303 and 304 may also contrast visually with other areas. The overall thickness of woven textile 300 may decrease as the degree of fusing increases. The degree to which woven textile 300 recovers after being stretched, the overall flexibility of woven textile 300, and resistance to various modes of failure may also vary depending upon the degree of fusing. Accordingly, a variety of properties may be varied by forming fused regions similar to fused regions 303 and 304.

Although the above discussion focused upon woven textile 300, similar concepts apply to knitted textile 400. As such, the properties of fused regions 403 and 404 may be different than the properties of unfused regions in knitted textile 400. In configurations where knitted textile 400 has multiple fused regions 403 and 404, the properties of fused region 403 may be different than the properties of one of fused region 404. Moreover, the properties of one of fused regions 403 may be different than the properties of another of fused regions 403. In addition to varying the degree of fusing, the shapes of multiple fused regions 403 and 404 and other aspects of knitted textile 400 may be varied to impart specific properties to specific areas. Accordingly, knitted textile 400 may be engineered, designed, or otherwise structured to have particular properties in different areas, including the properties of permeability, durability, and stretch-resistance.

F. COMPOSITE ELEMENTS

Figure 25:
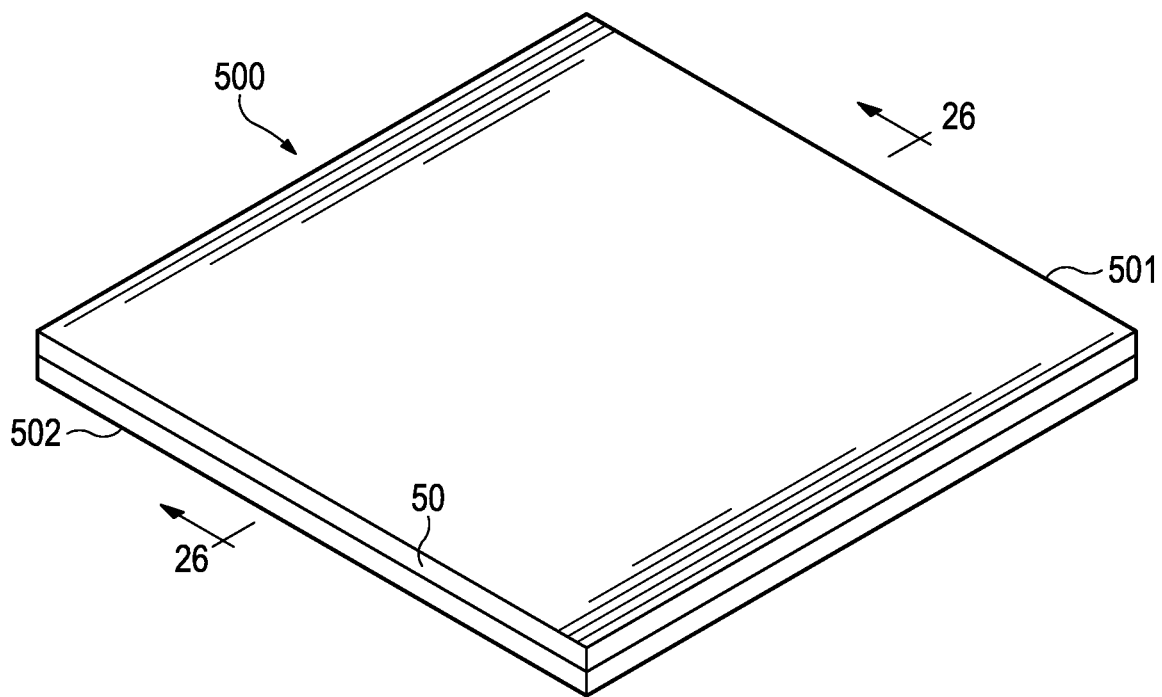
FIG. 25 is a perspective view of a composite element.
Figure 26:
FIG. 26 is a cross-sectional view of the composite element, as defined in FIG. 25.

A composite element 500 is depicted in FIGS. 25 and 26 as including a first component 501 and a second component 502 that lay adjacent to each other and are thermal bonded to each other. Although component 501 and 502 are depicted as having similar dimensions, first component 501 may have a lesser or greater length, a lesser or greater width, or a lesser or greater thickness than second component 502. That is, the relative dimensions of components 501 and 502 may vary considerably depending upon the product in which composite element 500 is intended to be incorporated.

In order to facilitate thermal bonding, at least one of components 501 and 502 includes a thermoplastic polymer material. Either or both of components 501 and 502 may be woven textile 300, knitted textile 400, other textiles that incorporate yarn 100 or thread 200, or other textiles that incorporate a thermoplastic polymer material. Moreover, one of components 501 and 502 may be another textile (e.g., knitted, woven, non-woven), an element of polymer foam, a polymer sheet, or a plate. As examples, (a) each of components 501 and 502 may be woven textile 300, (b) each of components 501 and 502 may be knitted textile 400, (c) first component 501 may be woven textile 300 and second component 502 may be knitted textile 400, (d) first component 501 may be woven textile 300 and second component 502 may be another textile formed from cotton, silk, thermoset polymer filaments, or other materials that do not include a thermoplastic polymer material, (e) first component 501 may be knitted textile 400 and second component 502 may be an element of polymer foam formed from either thermoplastic or thermoset polymer material, (f) first component 501 may be woven textile 300 and second component 502 may be a polymer sheet formed from either thermoplastic or thermoset polymer material, or (g) first component 501 may be knitted textile 400 and second component 502 may be a plate formed from metal, wood, or a rigid polymer formed from either thermoplastic or thermoset polymer material.

As a further example, first component 501 may be woven textile 300. If second component 502 is another textile that absorbs or wicks water, then the combination of woven textile 300 and second component 502 may be suitable for articles of apparel utilized during athletic activities where an individual wearing the apparel is likely to perspire. If second component 502 is a compressible material, such as an element of polymer foam, then the combination of woven textile 300 and second component 502 may be suitable for articles of apparel where cushioning (i.e., attenuation of impact forces) is advantageous, such as padding for athletic activities that may involve contact or impact with other athletes, equipment, or the ground. If second component 502 is a polymer sheet or plate, then the combination of woven textile 300 and second component 502 may be suitable for articles of apparel that impart protection from acute impacts. Similar combinations may be formed where first component 501 is knitted textile 400. Accordingly, a variety of materials or other components may be joined through thermal bonding to either of textiles 300 and 400 form composite elements with additional properties.

Figure 27A:
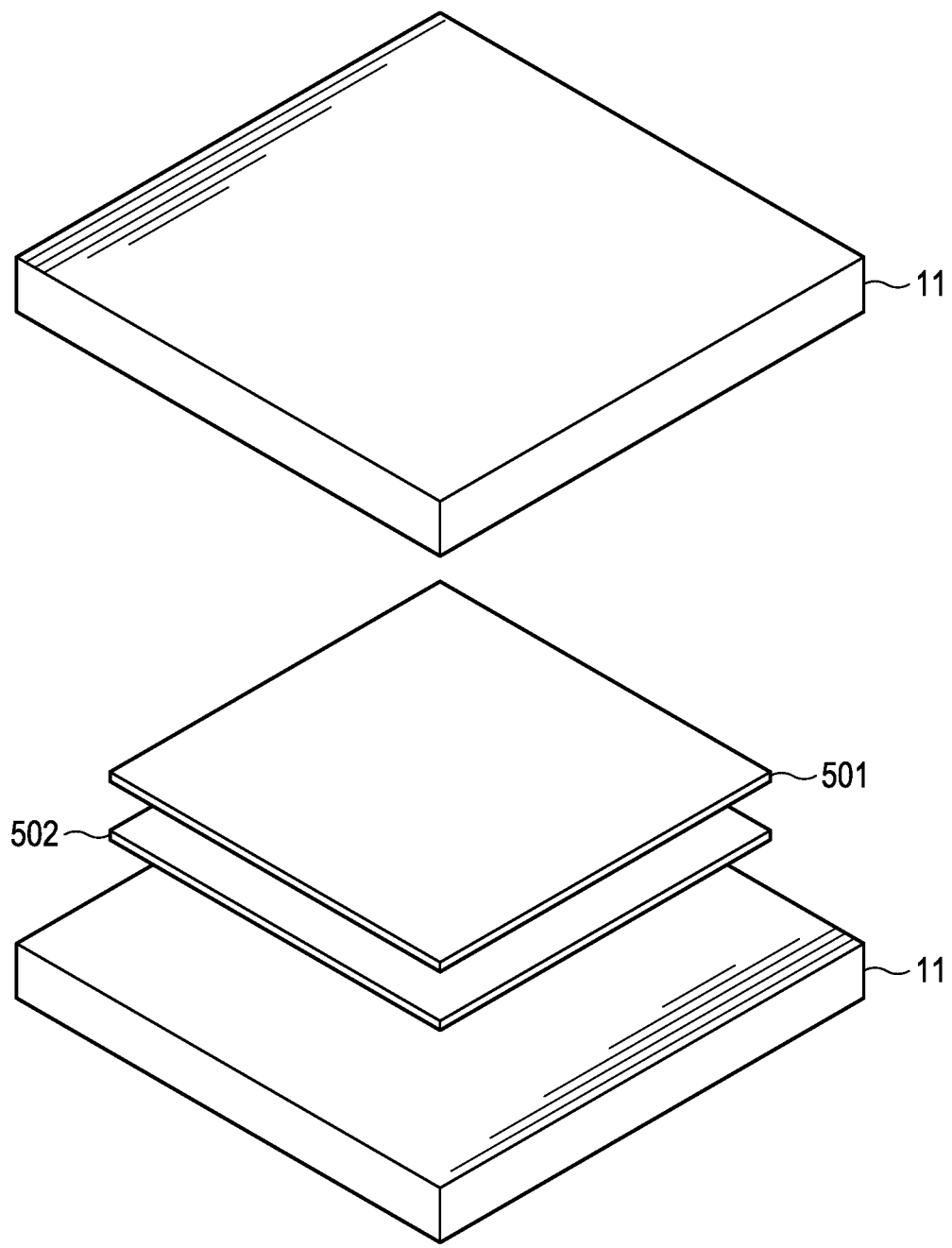
FIGS. 27A-27C are schematic perspective views of a manufacturing process for the composite element.
Figure 27B:
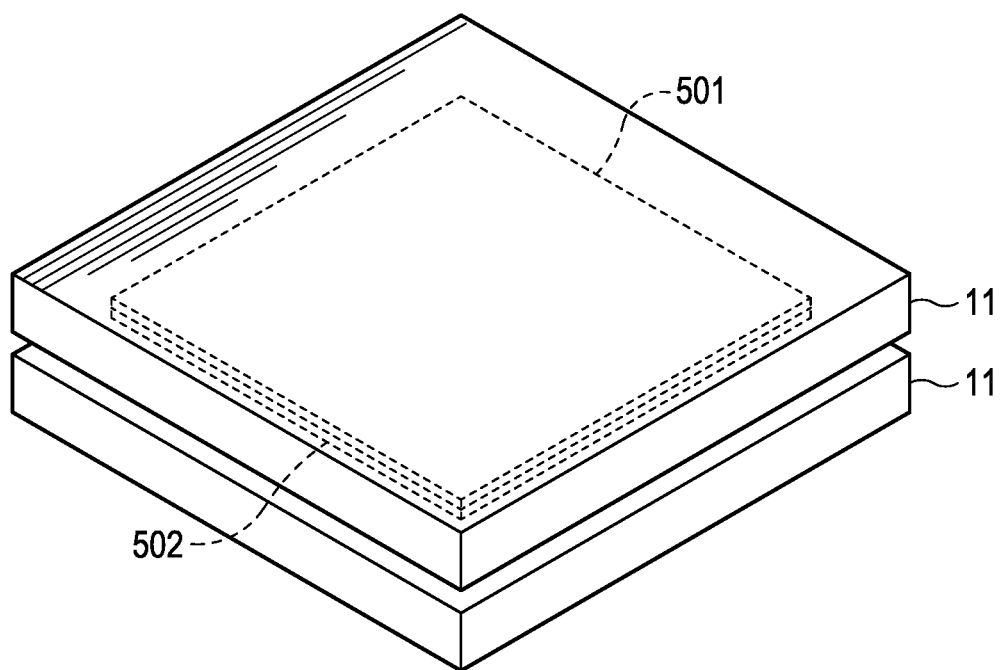
Figure 27C:
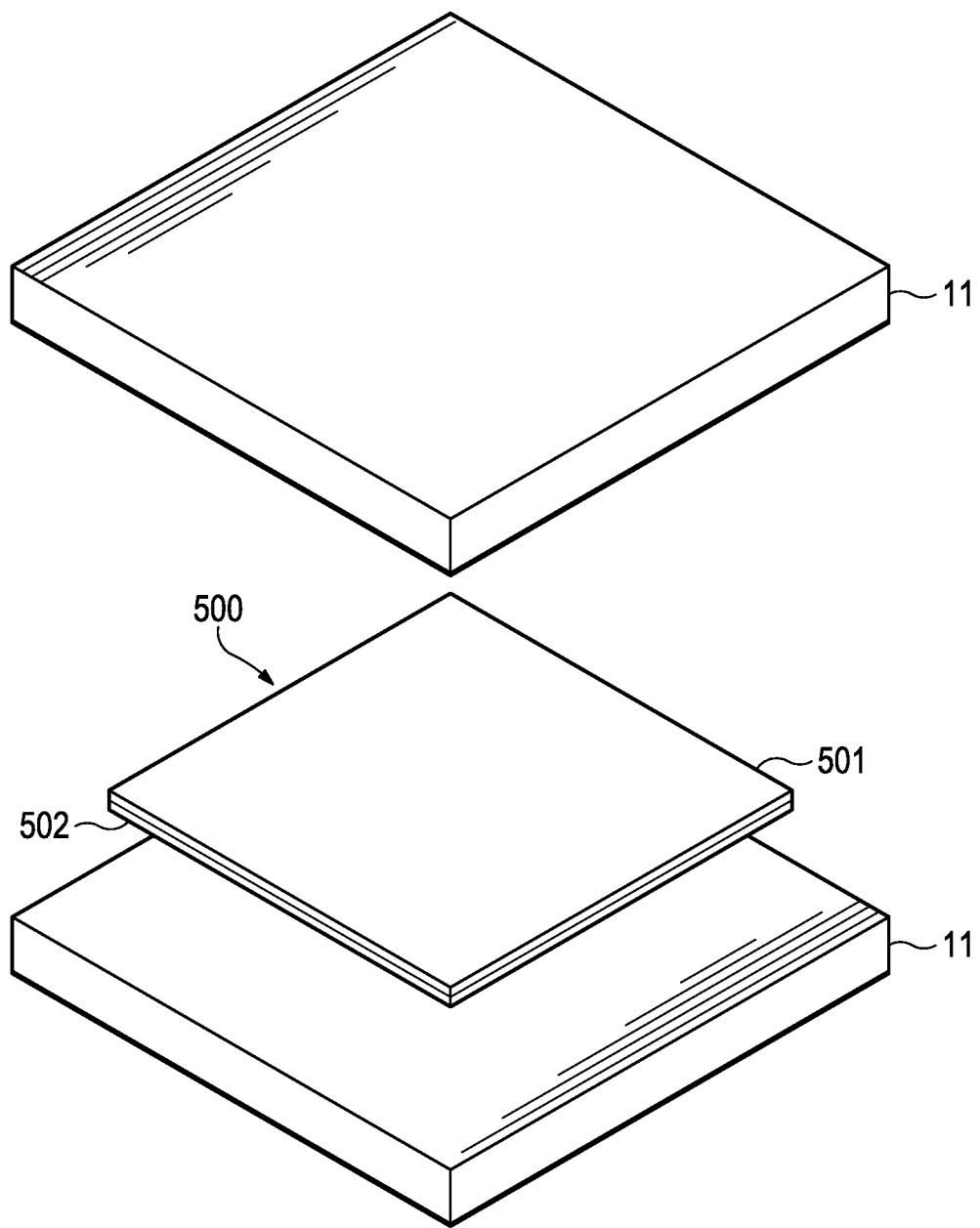

A general manufacturing process for forming composite element 500 will now be discussed with reference to FIGS. 27A-27C. Initially, components 501 and 502 are located between a heat press having a pair of platens 11, as depicted in FIG. 27A. Platens 11 then translate or otherwise move toward each other in order to compress or induce contact between components 501 and 502, as depicted in FIG. 27B. While compressed, heat is applied to form the thermal bond that joins components 501 and 502. That is, the temperatures of components 501 and 502 are elevated to at least a glass transition temperature of a thermoplastic polymer material in one or both of components 501 and 502, thereby causing softening or melting of the thermoplastic polymer material at the interface between components 501 and 502. Depending upon the materials of both components 501 and 502, as well as the overall configuration of components 501 and 502, only one of platens 11 or both of platens 11 may be heated to elevate the temperatures of components 501 and 502 through conduction. Upon separating platens 11, as depicted in FIG. 27C, the thermal bonded composite element 500 may be removed and permitted to cool.

Although the general process discussed above may be utilized to form composite element 500, other methods may also be utilized. Rather than components 501 and 502 through conduction, other methods that include radio frequency heating, ultrasonic heating, radiant heating, laser heating, or chemical heating may be utilized. In some processes, radiant heating may utilize to raise the temperature of at least one of components 501 and 502 prior to being compressed between platens 11. An advantage of utilizing radiant heating to elevate the temperature of only the surfaces forming the thermal bond is that the thermoplastic polymer material within other portions of components 501 and 502 may not heated significantly. In some processes, stitching or adhesives may also be utilized between components 501 and 502 to supplement the thermal bond.

Using the process discussed above, the thermoplastic polymer material in either of components 501 and 502 may be utilized to secure components 501 and 502 to each other. A thermoplastic polymer material melts when heated and returns to a solid state when cooled sufficiently. Based upon this property of thermoplastic polymer materials, thermal bonding processes may be utilized to form a thermal bond that joins components 501 and 502 to each other. The configuration of the thermal bond at least partially depends upon the materials and structure of components 501 and 502. As a first example, each of components 501 and 502 may be woven textile 300. Upon heating, the thermoplastic polymer material from each element of woven textile 300 may intermingle with each other to secure components 501 and 502 to each other when cooled. Similar processes may be utilized when each of components 501 and 502 are knitted textile 400 or when first component 501 is woven textile 300 and second component 502 is knitted textile 400. As a second example, first component 501 may be woven textile 300 and second component 502 may be another textile formed from cotton, silk, or thermoset polymer filaments. Upon heating, the thermoplastic polymer material of woven textile 300 may extend around or bond with filaments in the other textile to secure components 501 and 502 to each other when cooled. As a third example, first component 501 may be knitted textile 400 and second component 502 may be an element of polymer foam (or a polymer sheet or plate) formed from a thermoplastic polymer material. Upon heating, the thermoplastic polymer materials of knitted textile 400 and the polymer foam may intermingle with each other to secure components 501 and 502 to each other when cooled. If, however, the polymer foam has a glass transition temperature that is higher than the thermoplastic polymer material of knitted textile 400, then the thermoplastic polymer material of knitted textile 400 may extend into the structure, crevices, or cavities of the polymer foam to secure components 501 and 502 to each other when cooled. As a fourth example, first component 501 may be knitted textile 400 and second component 502 may be an element of polymer foam (or a polymer sheet or plate) formed from a thermoset polymer material. Upon heating, the thermoplastic polymer material of knitted textile 400 may extend into the structure, crevices, or cavities of the polymer foam to secure components 501 and 502 to each other when cooled. Accordingly, a thermal bond may be utilized to join components 501 and 502 even when components 501 and 502 have a variety of structures or are formed from a diverse range of materials.

Figure 28:
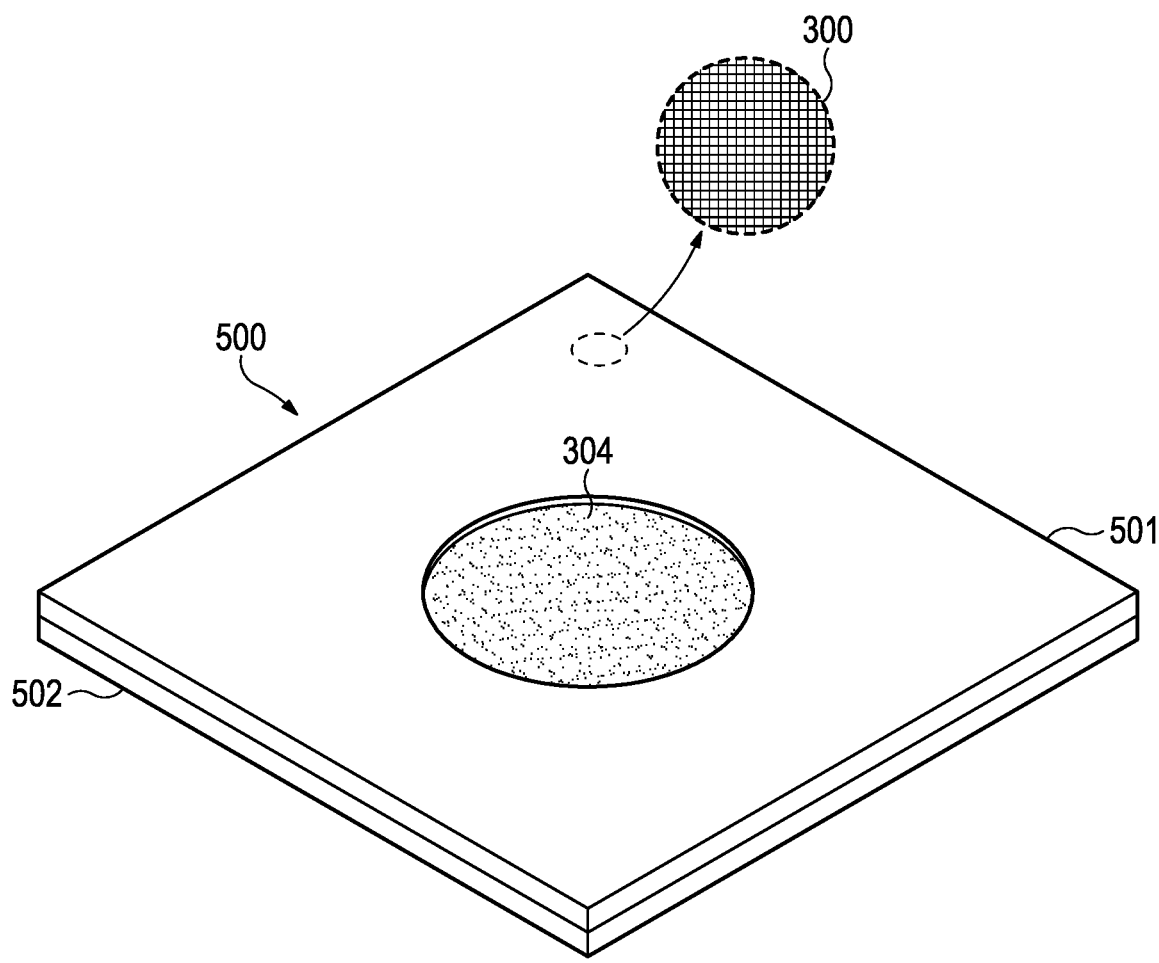
FIG. 28 is a perspective view of the composite element with a fused region.

In order to impart varying properties to composite element 500, either of components 501 and 502 may include various fused regions, similar to fused regions 303, 304, 403, and 404. Referring to FIG. 28, for example, composite element 500 is depicted as incorporating woven textile 300 as first component 501, and a fused region 304 is formed in woven textile 300. In some processes fused region 304 (or fused region 303) may be formed prior to joining woven textile 300 with second component 502. In other processes, however, fused region 304 (or fused region 303) may be formed during the thermal bonding process or following the thermal bonding process. Accordingly, fused regions 303 and 304 may be formed at any stage of the manufacturing process for composite elements. Although composite element 500 in this example incorporates woven textile 300, knitted textile 400 may also be utilized in a similar manner. That is, a composite element incorporating knitted textile 400 may also include various fused regions 403 and 404 to impart varying properties.

G. THERMAL BONDED SEAM CONFIGURATIONS

When incorporated into products, such as apparel, textile elements are often joined at various seams. Although stitching and adhesive bonding may be utilized to form a seam between the textile elements, the seam may also be formed through a thermal bonding process when at least one of the textile elements includes a thermoplastic polymer material. That is, a thermal bond may be utilized to form the seam in products that incorporate woven textile 300, knitted textile 400, or other textiles that incorporate a thermoplastic polymer material.

Figure 29:
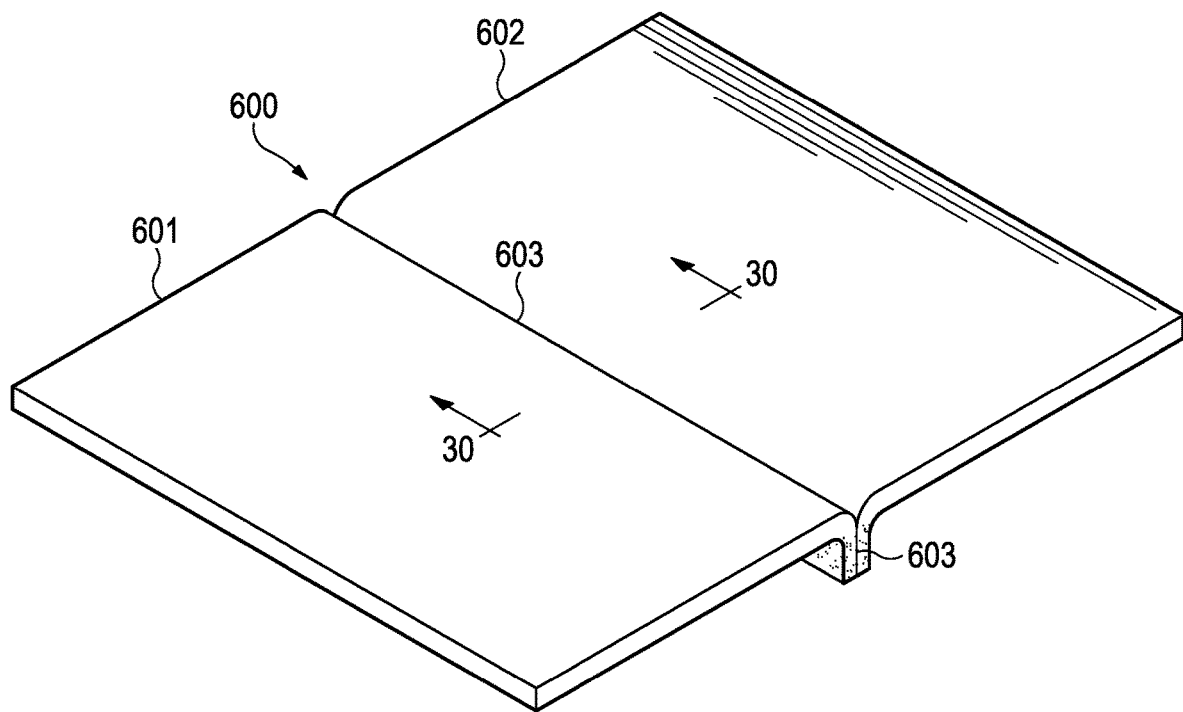
FIG. 29 is a perspective view of a first configuration of a seam element.
Figure 30:
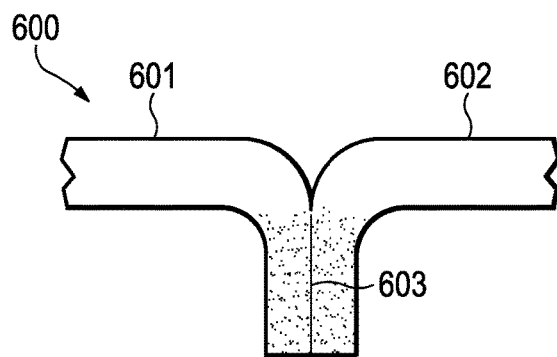
FIG. 30 is a cross-sectional view of the first configuration of the seam element, as defined in FIG. 29.

A seam element 600 is depicted in FIGS. 29 and 30 as including a first component 601 and a second component 602 with edge areas that are thermal bonded at a seam 603. Although component 601 and 602 are depicted as having similar dimensions, first component 601 may have a lesser or greater length, a lesser or greater width, or a lesser or greater thickness than second component 602. That is, the relative dimensions of components 601 and 602 may vary considerably depending upon the product in which seam 603 is intended to be incorporated.

In order to facilitate thermal bonding at seam 603, at least one of components 601 and 602 includes a thermoplastic polymer material. Either or both of components 601 and 602 may be woven textile 300, knitted textile 400, other textiles that incorporate yarn 100 or thread 200, or other textiles that incorporate a thermoplastic polymer material. Moreover, one of components 601 and 602 may be another textile (e.g., knitted, woven, non-woven), an element of polymer foam, or a polymer sheet, for example. As examples, (a) each of components 601 and 602 may be woven textile 300, (b) each of components 601 and 602 may be knitted textile 400, (c) first component 601 may be woven textile 300 and second component 602 may be knitted textile 400, (d) first component 601 may be woven textile 300 and second component 602 may be another textile formed from cotton, silk, thermoset polymer filaments, or other materials that do not include a thermoplastic polymer material, (e) first component 601 may be knitted textile 400 and second component 602 may be an element of polymer foam formed from either thermoplastic or thermoset polymer material, or (f) first component 601 may be woven textile 300 and second component 602 may be a polymer sheet formed from either thermoplastic or thermoset polymer material.

Figure 31A:
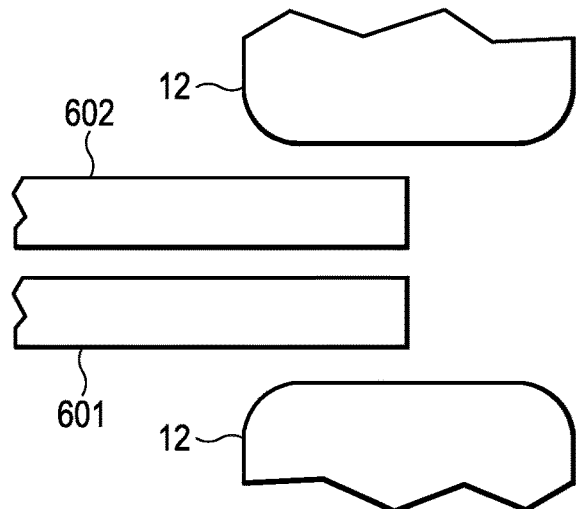
FIGS. 31A-31D are schematic side elevational views of a manufacturing process for the first configuration of the seam element.
Figure 31B:
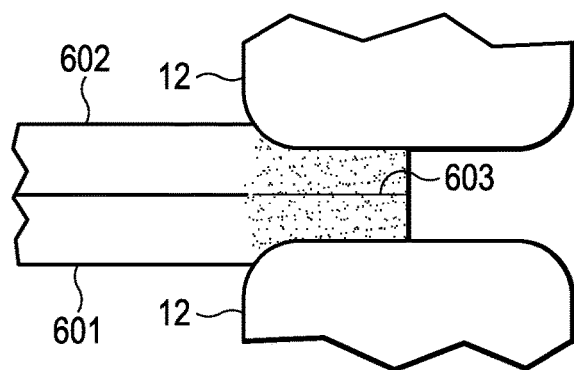
Figure 31C:
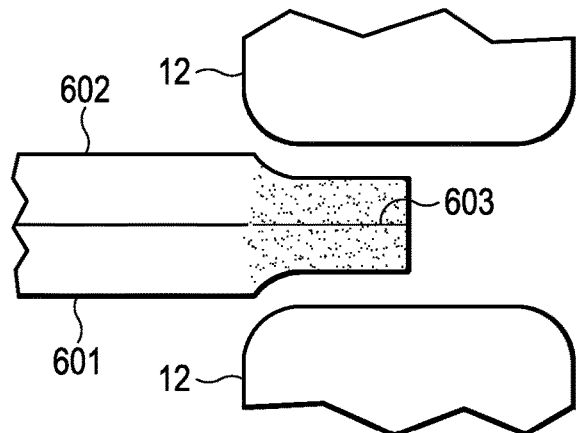
Figure 31D:
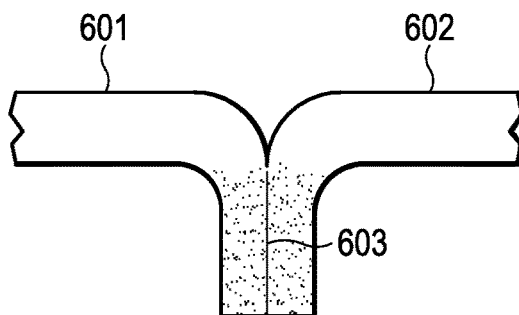

A general manufacturing process for forming seam 603 will now be discussed with reference to FIGS. 31A-31D. Initially, components 601 and 602 are located between a pair of seam-forming dies 12, as depicted in FIG. 31A. Seam-forming dies 12 then translate or otherwise move toward each other in order to compress or induce contact between edge areas components 601 and 602, as depicted in FIG. 31B. In order to form the thermal bond and join the edge areas of components 601 and 602, seam-forming dies 12 apply heat to the edge areas. That is, seam-forming dies 12 elevate the temperature of the edge areas of components 601 and 602 to cause softening or melting of the thermoplastic polymer material at the interface between the edge areas. Although the temperature of the edge areas is generally raised to at least the glass-transition temperature of the thermoplastic polymer material forming one or both of components 601 and 602, the temperature may also exceed the melting temperature. Upon separating seam-forming dies 12, as depicted in FIG. 31C, seam 603 is formed between the edge areas of components 601 and 602. After being permitted to cool, components 601 and 602 may be unfolded, as depicted in FIG. 31D. Seam 603 may also be trimmed to limit the degree to which the end areas protrude outward at seam 603. Rather than heating the edge areas of components 601 and 602 through conduction, other methods that include radio frequency heating, ultrasonic heating, radiant heating, laser heating, or chemical heating may be utilized.

As with the formation of fused regions 303, 304, 403, and 404, the formation of seam 603 involves softening or melting the thermoplastic polymer material in one or both of components 601 and 602. Depending upon the temperature and pressure applied to the edge areas of components 601 and 602, as well as the time that the edge areas are heated and compressed, for example, the degree to which the thermoplastic polymer material in components 601 and 602 softens or melts may vary significantly. As such, the thermal bond at seam 603 may range from (a) a state where filaments or strands in components 601 and 602 remain separate and identifiable, as in fused regions 303 and 403, to (b) a state where filaments or strands in components 601 and 602 form a larger mass of thermoplastic polymer material, as in fused regions 304 and 404.

Using the process discussed above, the thermoplastic polymer material in either of components 601 and 602 may be utilized to secure components 601 and 602 to each other at seam 603. The configuration of the thermal bond at seam 603 at least partially depends upon the materials and structure of components 601 and 602. As a first example, each of components 601 and 602 may be woven textile 300. Upon heating, the thermoplastic polymer material from each element of woven textile 300 may intermingle with each other to secure components 601 and 602 to each other when cooled. Similar processes may be utilized when each of components 601 and 602 are knitted textile 400 or when first component 601 is woven textile 300 and second component 602 is knitted textile 400. As a second example, first component 601 may be woven textile 300 and second component 602 may be another textile formed from cotton, silk, or thermoset polymer filaments. Upon heating, the thermoplastic polymer material of woven textile 300 may extend around or bond with filaments in the other textile to secure components 601 and 602 to each other when cooled. As a third example, first component 601 may be knitted textile 400 and second component 602 may be an element of polymer foam (or a polymer sheet) formed from a thermoplastic polymer material. Upon heating, the thermoplastic polymer materials of knitted textile 400 and the polymer foam may intermingle with each other to secure components 601 and 602 to each other when cooled. If, however, the polymer foam has a glass transition temperature that is higher than the thermoplastic polymer material of knitted textile 400, then the thermoplastic polymer material of knitted textile 400 may extend into the structure, crevices, or cavities of the polymer foam to secure components 601 and 602 to each other when cooled. As a fourth example, first component 601 may be knitted textile 400 and second component 602 may be an element of polymer foam (or a polymer sheet) formed from a thermoset polymer material. Upon heating, the thermoplastic polymer material of knitted textile 400 may extend into the structure, crevices, or cavities of the polymer foam to secure components 601 and 602 to each other when cooled. Accordingly, a thermal bond forming seam 603 may be utilized to join components 601 and 602 even when components 601 and 602 have a variety of structures or are formed from a diverse range of materials.

Figure 32:
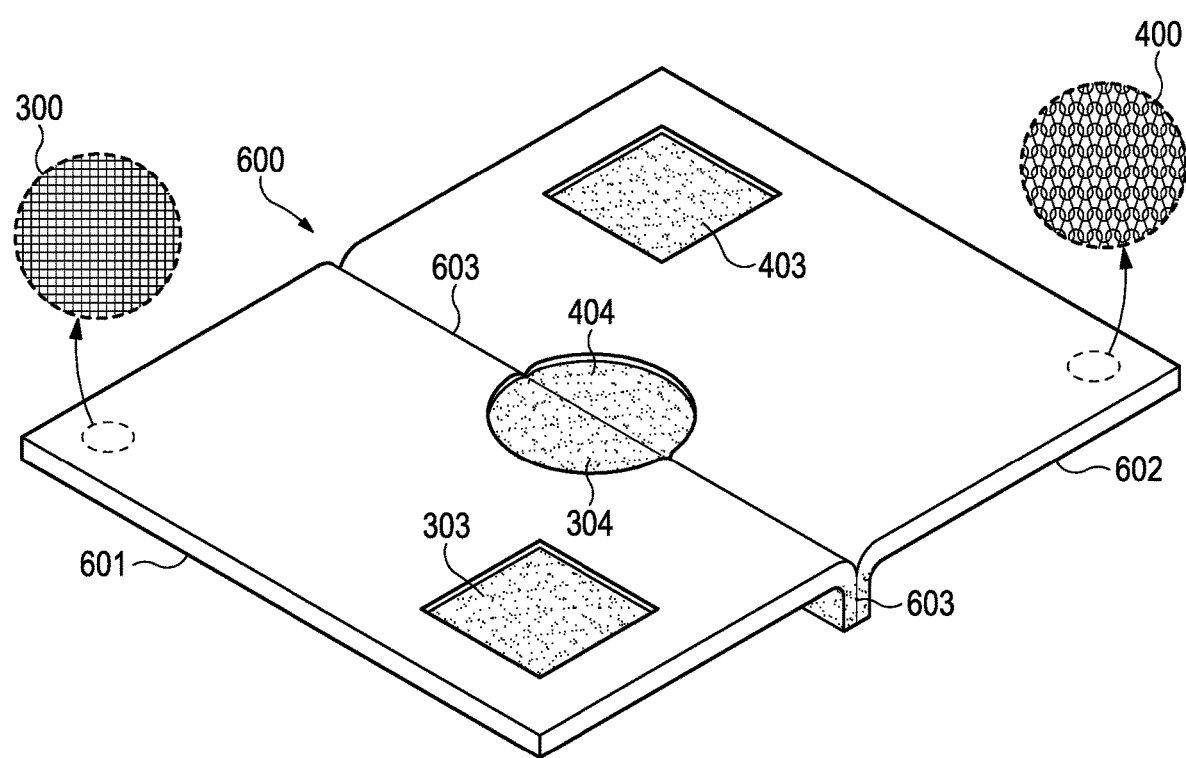
FIG. 32 is a perspective view of the first configuration of the the seam element with multiple fused regions.

In order to impart varying properties to seam element 600, either of components 601 and 602 may include various fused regions. Moreover, the fused regions may extend across seam 603 As an example of this, FIG. 32 depicts seam element 600 as incorporating woven textile 300 for first component 601 and knitted textile 400 as second component 602. Woven textile 300 includes a fused region 303 in an area spaced from seam 603, and knitted textile 400 includes a fused region 403 in an area spaced from seam 603. Seam element 600 also includes a larger fused region that extends across seam 603 and includes elements of both fused regions 304 and 404. In some processes, one or more of fused regions 303, 304, 403, and 404 may be formed prior to joining components 601 and 602 at seam 603. In other processes, however, one or more of fused regions 303, 304, 403, and 404 may be formed during the thermal bonding process or following the thermal bonding process that forms seam 603. Accordingly, fused regions 303, 304, 403, and 404 may be formed at any stage of the process for forming seam 603.

During the thermal bonding process discussed above, the edge areas of components 601 and 602 are heated and compressed. In addition to forming seam 603, the heating and compression may also cause the edge areas of components 601 and 602 to compress or reduce in thickness. More particularly, processes that form a thermal bond, as at seam 603, may effectively cause thinning in the area of the thermal bond. This effect may be seen in FIG. 30, as well as various other figures discussed below. Although not always depicted, similar effects may occur at any of fused regions 303, 304, 403, and 404 or at any other location where thermal bonding or fusing occurs.

Figure 33:
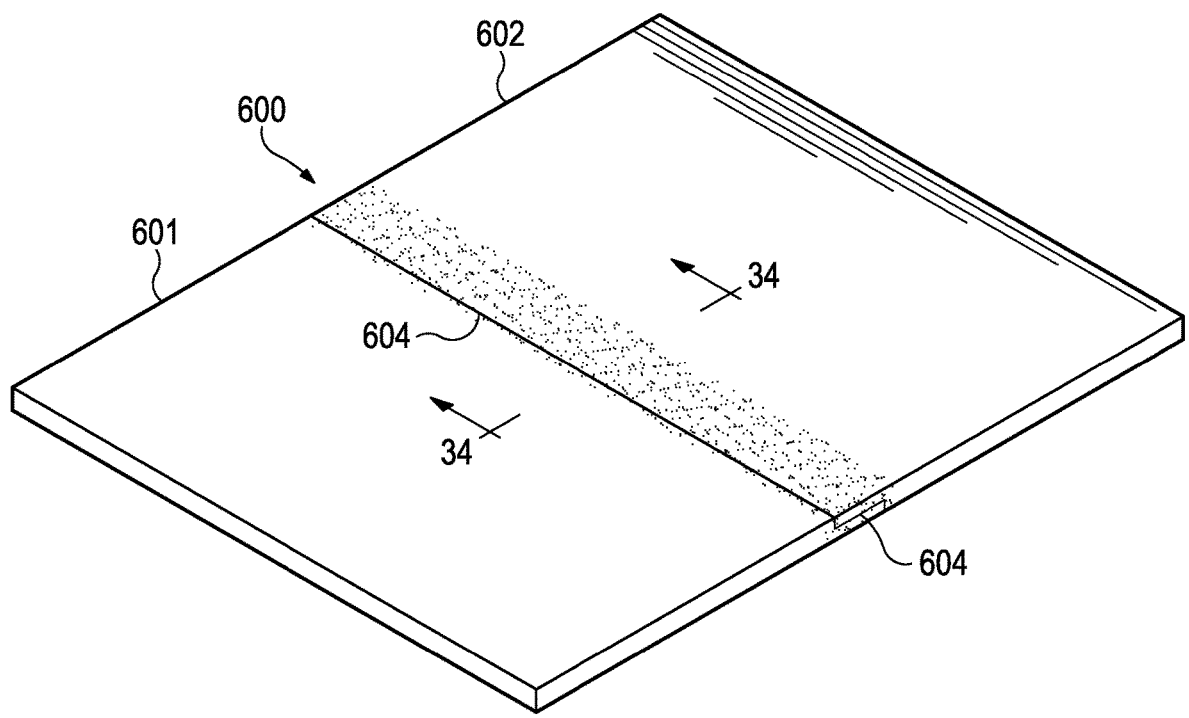
FIG. 33 is a perspective view of a second configuration of the seam element.
Figure 34:
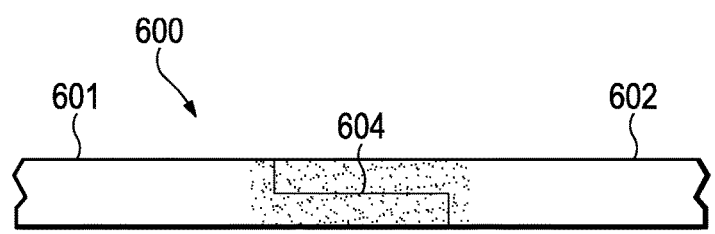
FIG. 34 is a cross-sectional view of the second configuration of the seam element, as defined in FIG. 33

Whereas components 601 and 602 curve at seam 603 and protrude outward, other seam configurations may have a more planar or flat configuration. Referring to FIGS. 33 and 34, for example, seam component 600 includes components 601 and 602, which are joined to form a seam 604. In this configuration, an edge area of first component 601 overlaps and is joined with an edge of second component 602 at seam 604. Although a thermal bond is utilized to join components 601 and 602 at seam 604, stitching or adhesive bonding may also be utilized to reinforce seam 604.

Figure 35A:
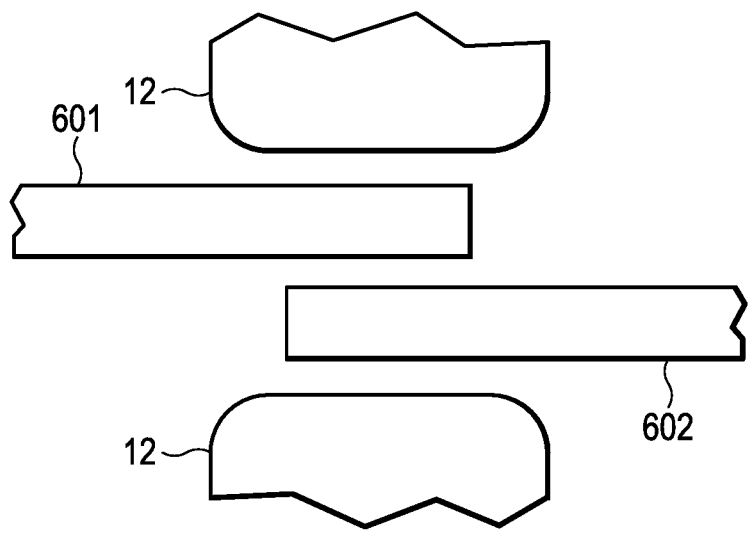
FIGS. 35A-35C are schematic side elevational views of a manufacturing process for the second configuration of the seam element.
Figure 35B:
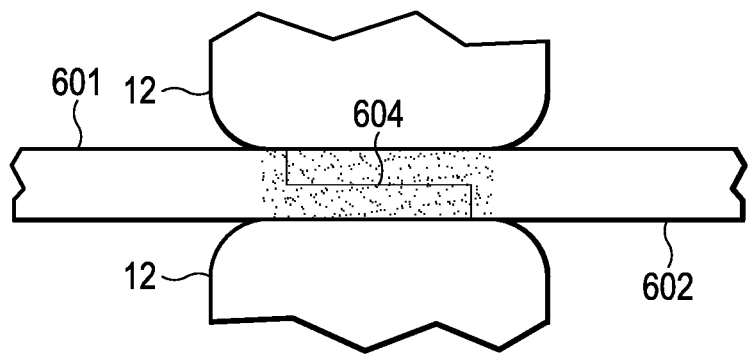
Figure 35C:
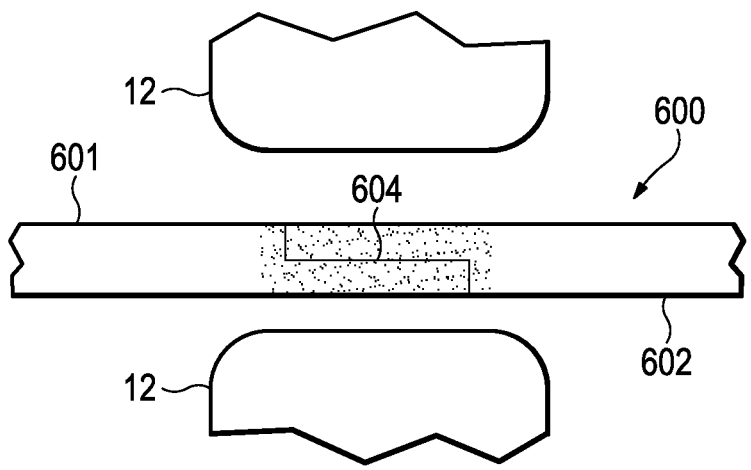

A general manufacturing process for forming seam 604 will now be discussed with reference to FIGS. 35A-35C. Initially, components 601 and 602 are positioned in an overlapping configuration between seam-forming dies 12, as depicted in FIG. 35A. Seam-forming dies 12 then translate or otherwise move toward each other in order to compress or induce contact between edge areas of components 601 and 602, as depicted in FIG. 35B. In order to form the thermal bond and join the edge areas of components 601 and 602, seam-forming dies 12 apply heat to the edge areas. That is, seam-forming dies 12 elevate the temperature of the edge areas of components 601 and 602 to cause softening or melting of the thermoplastic polymer material at the interface between the edge areas, thereby inducing thermal bonding and forming seam 604. Although the temperature of the edge areas is generally raised to at least the glass-transition temperature of the thermoplastic polymer material forming one or both of components 601 and 602, the temperature may also exceed the melting temperature. Upon separating seam-forming dies 12, as depicted in FIG. 35C, components 601 and 602 are permitted to cool and the manufacturing process for forming seam 604 is complete.

H. STITCHED AND THERMAL BONDED SEAM CONFIGURATIONS

Thermal bonding is utilized to join components 601 and 602 at the various seams 603 and 604 discussed above. Although thermal bonding alone is sufficient, stitching or adhesive bonding may also be utilized to reinforce seams 603 and 604. Moreover, stitching may be utilized to temporarily join or otherwise pre-join components 601 and 602 prior to thermal bonding. When the stitching (e.g., yarn, thread, monofilament) incorporates a thermoplastic polymer material, the stitching may also form a thermal bond with each of components 601 and 602. Depending upon the temperature at which thermal bonding occurs, the stitching may also melt into the structure of components 601 and 602.

Figure 36:
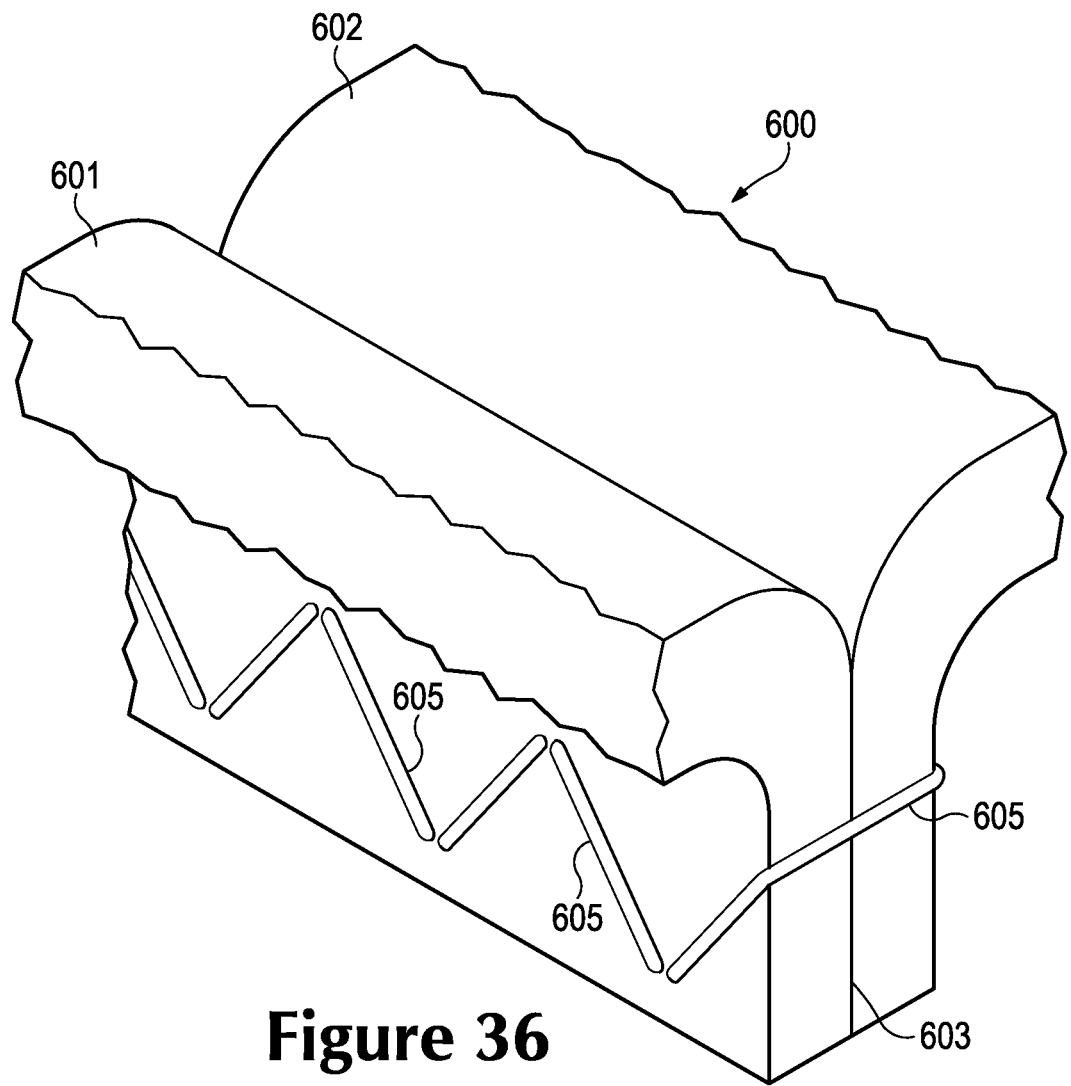
FIG. 36 is a perspective view of the first configuration of the seam element with a stitching strand.

Referring to FIG. 36, components 601 and 602 are joined to form seam 603. At least one of components 601 and 602 includes a thermoplastic polymer material, which we will refer to as a "first thermoplastic polymer material" for purposes of the present discussion. As such, components 601 and 602 are thermal bonded to each other with the first thermoplastic polymer material at seam 603. Additionally, a stitching strand 605 extends through components 601 and 602 at seam 603, thereby stitching components 601 and 602 together. Stitching strand 605 also includes a thermoplastic polymer material, which we will refer to as a "second thermoplastic polymer material" for purposes of the present discussion. Given that stitching strand 605 includes the second thermoplastic polymer material, stitching strand 605 may be thermal bonded to components 601 and 602 with the second thermoplastic polymer material at seam 603.

Stitching strand 605 may be a yarn, thread, or monofilament, for example. In some configurations, stitching strand 605 may have the general configuration of thread 200. As such, stitching strand 605 may include two or more yarns (e.g., yarns 201) that are twisted with each other. Moreover, the yarns may include a plurality of substantially aligned filaments (e.g., filaments 202) that are substantially formed from the second thermoplastic polymer material. As such, at least ninety-five percent, ninety-nine percent, or one-hundred percent of a material of the filaments in stitching strand 605 may be the second thermoplastic polymer material. Although stitching strand 605 is depicted as forming a zigzag stitch, other stitch configurations may be used for joining components 601 and 602 with stitching strand 605.

Based upon the discussion above, seam 603 effectively includes two thermal bonds. The first thermal bond is formed by the first thermoplastic polymer material from one or both of components 601 and 602. Although the first thermal bond primarily joins components 601 and 602 to each other, thereby forming seam 603, the first thermal bond may also join stitching strand 605 to components 601 and 602. The second thermal bond is formed by the second thermoplastic polymer material from stitching strand 605. Although the second thermal bond primarily joins stitching strand 605 to components 601 and 602, the second thermal bond may also join (a) sections of stitching strand 605 to each other or (b) components 601 and 602 to each other. An advantage of utilizing the first and second thermal bonds relates to strength. That is, seam 603 may exhibit greater strength than seams that are only utilize one of stitching or thermal bonding.

The first thermoplastic polymer material and the second thermoplastic polymer material may be the same thermoplastic polymer material. That is, the thermoplastic polymer materials of components 601 and 602 and stitching strand 605 may be the same thermoplastic polymer material (e.g., both being thermoplastic polyurethane) with common glass transition and melting temperatures. Similarly, the first thermoplastic polymer material and the second thermoplastic polymer material may be the same thermoplastic polymer material (e.g., both being thermoplastic polyurethane), but with different glass transition and melting temperatures. As an example, the first and second thermoplastic polymer materials may be thermoplastic polyurethane, with the first thermoplastic polymer material having higher glass transition and melting temperatures than the second thermoplastic polymer material. Additionally, the first thermoplastic polymer material and the second thermoplastic polymer material may be different thermoplastic polymer materials, such as thermoplastic polyurethane and thermoplastic polyolefin.

An advantage of incorporating the same thermoplastic polymer material into components 601 and 602 and stitching strand 605 relates to thermal bonding compatibility. Although different thermoplastic polymer materials may form thermal bonds with each other, thermal bonds may form more easily and with greater strength when components 601 and 602 and stitching strand 605 are formed from the same thermoplastic polymer material. A further advantage may be gained when components 601 and 602 and stitching strand 605 include the same thermoplastic polymer material, but with different glass transition and melting temperatures. More particularly, by configuring components 601 and 602 to have a different glass transition and melting temperature than stitching strand 605, the degree to which the first thermoplastic polymer material in components 601 and 602 softens or melts may be less than the degree to which the second thermoplastic polymer material in stitching strand 605 softens or melts when forming (a) the first thermal bond between components 601 and 602 and (b) the second thermal bond between stitching strand 605 and components 601 and 602.

Figure 37A:
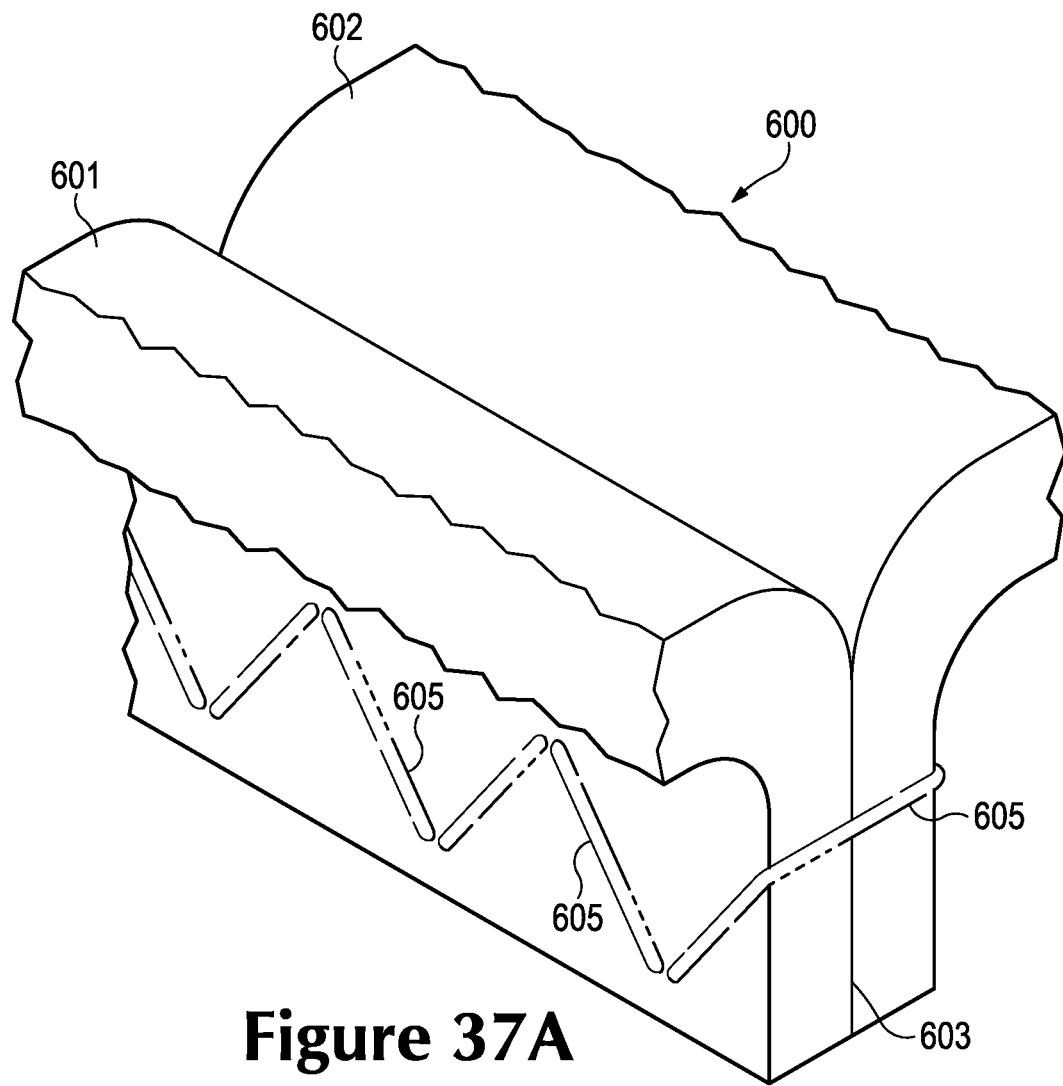
FIGS. 37A-37C are alternate perspective views of the first configuration of the seam element with a stitching strand.
Figure 37B:
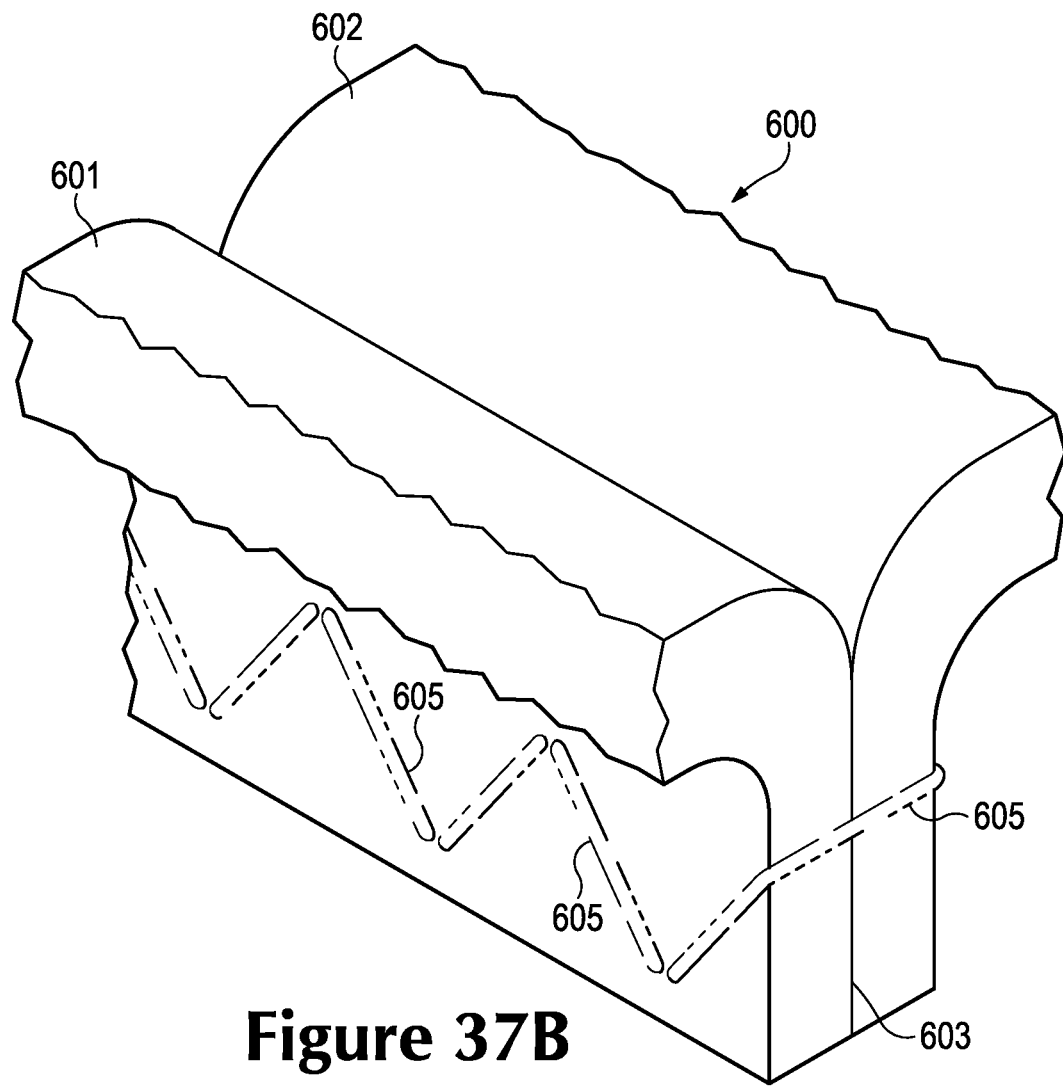
Figure 37C:
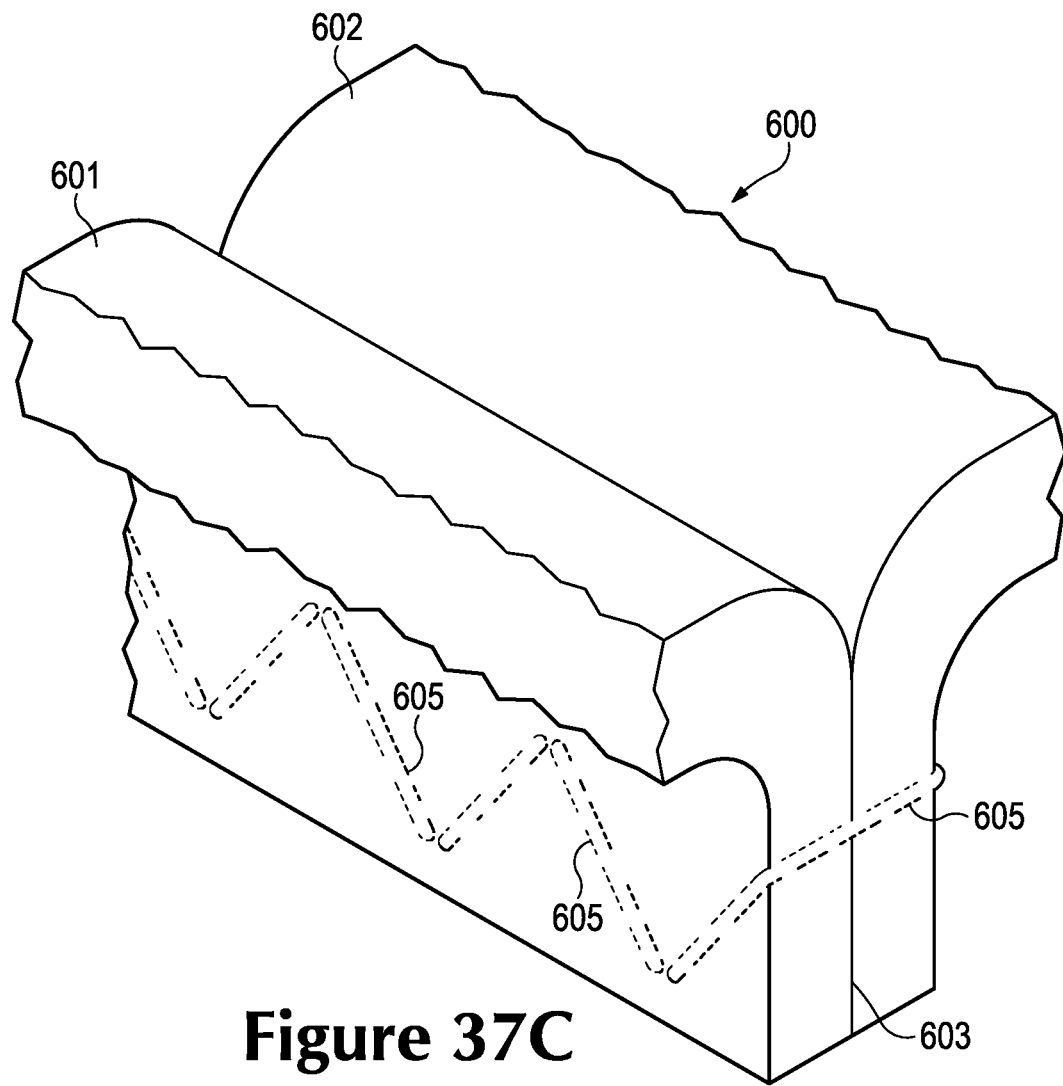

The degree to which individual yarns or filaments within stitching strand 605 soften or melt when heated to form the second thermal bond with components 601 and 602 may vary significantly. Referring again to FIG. 36, stitching strand 605 is clearly seen as stitching components 601 and 602 together. Although stitching strand 605 may be thermal bonded with components 601 and 602, stitching strand 605 remains coherent in this configuration, possibly with individual yarns or filaments within stitching strand 605 remaining identifiable. In this configuration, the second thermoplastic polymer material of stitching strand 605 may form thermal bonds at areas of contact with components 601 and 602, but may not melt to form thermal bonds in other areas. As another example, FIG. 37A depicts stitching strand 605 as having a less coherent structure, which indicates some degree of melting in stitching strand 605. That is, the second thermoplastic polymer material of stitching strand 605 may have melted so as to extend around yarns or filaments in components 601 and 602, and some of the second thermoplastic polymer material may have been wicked or otherwise drawn into the filamentous structure of components 601 and 602. Referring to FIG. 37B, stitching strand 605 has an even less coherent structure, which indicates a greater degree of melting in stitching strand 605. That is, the second thermoplastic polymer material of stitching strand 605 may have melted so as to extend around more distant yarns or filaments in components 601 and 602, and a greater amount of the second thermoplastic polymer material may have been wicked or otherwise drawn into the filamentous structure of components 601 and 602. Finally, FIG. 37C depicts a configuration wherein stitching strand 605 has significantly melted and is almost entirely wicked or otherwise drawn into the filamentous structure of components 601 and 602. Although the second thermoplastic polymer material remains within seam 305, stitching strand 605 is entirely non-coherent and is effectively absorbed or otherwise integrated into the structure of components 601 and 602. The degree to which individual yarns or filaments within stitching strand 605 soften or melt when heated to form the thermal bond may affect the strength of seam 305, as well as the aesthetic properties of articles of apparel or other products that incorporate seam 603.

Comparisons between FIGS. 36 and 37A-37C demonstrate variations in the degree to which stitching strand 605 softens or melts when forming the thermal bond with the elements of components 601 and 602. Although not depicted, the thermal bond formed by the first thermoplastic polymer material from the elements of components 601 and 602 may vary in a similar manner. In many configurations, however, the first thermoplastic polymer material of components 601 and 602 may melt or soften to a lesser degree than the second thermoplastic polymer material of stitching strand 605. An advantage of lesser melting or softening of the first thermoplastic polymer material is that a fibrous or filamentous structure of components 601 and 602, when formed from textiles (e.g., textile 200 or 300), remains intact or otherwise coherent. When utilized in articles of apparel, the lesser melting or softening of the first thermoplastic polymer material may ensure that seam 603 remain flexible and does not form hard areas of the apparel that may cause discomfort to the wearer. Additionally, the lesser melting or softening of the first thermoplastic polymer material in one or both of components 601 and 602 may enhance the aesthetic properties of the apparel.

In order to ensure that the first thermoplastic polymer material of components 601 and 602 melts or softens to a lesser degree than the second thermoplastic polymer material of stitching strand 605, different melting and glass transition temperatures may be selected for each of the first and second thermoplastic polymer materials. More particularly, the melting and glass transition temperatures of the first thermoplastic polymer material may be higher than the respective melting and glass transition temperatures of the second thermoplastic polymer material. That is, the melting temperature of the first thermoplastic polymer material is higher than the melting temperature of the second thermoplastic polymer material, and the glass transition temperature of the first thermoplastic polymer material is higher than the glass transition temperature of the second thermoplastic polymer material. Depending upon the desired degree of melting or softening of the second thermoplastic polymer material, as in FIGS. 36 and 37A-37C, the melting temperature of the second thermoplastic polymer material may be higher or lower than the glass transition temperature of the first thermoplastic polymer material. More particularly, for example, stitching strand 605 may melt more (e.g., FIGS. 37B and 37C) in configurations where the melting temperature of the second thermoplastic polymer material is lower than the glass transition temperature of the first thermoplastic polymer material, and stitching strand 605 may melt less (e.g., FIGS. 36 and 37A) in configurations where the melting temperature of the second thermoplastic polymer material is higher than the glass transition temperature of the first thermoplastic polymer material.

Although the temperatures may vary significantly, examples values for the melting and glass transition temperatures of the first and second thermoplastic polymer materials will now be discussed. As an example, the first thermoplastic polymer material of components 601 and 602 may be thermoplastic polyurethane with a glass transition temperature of 180 degrees Celsius and a melting temperature of 210 degrees Celsius, and the second thermoplastic polymer material of stitching strand 605 may be thermoplastic polyurethane with a glass transition temperature of 140 degrees Celsius and a melting temperature of 160 degrees Celsius. With these temperatures, the melting temperature of the second thermoplastic polymer material is lower than the glass transition temperature of the first thermoplastic polymer material. As another example, the first thermoplastic polymer material of components 601 and 602 may be thermoplastic polyurethane with a glass transition temperature of 170 degrees Celsius and a melting temperature of 210 degrees Celsius, and the second thermoplastic polymer material of stitching strand 605 may be thermoplastic polyurethane with a glass transition temperature of 150 degrees Celsius and a melting temperature of 190 degrees Celsius. With these temperatures, the melting temperature of the second thermoplastic polymer material is higher than the glass transition temperature of the first thermoplastic polymer material.

A general manufacturing process for forming seam 603 with stitching strand 605 will now be discussed with reference to FIGS. 38A-38E. Initially, components 601 and 602 are located within a stitching machine 13 that dispenses stitching strand 605 and extends stitching strand 605 through components 601 and 602, thereby stitching edge areas of components 601 and 602 together. In addition to stitching strand 605, stitching machine 13 may also dispense a bobbin strand (not depicted). Stitching machine 13 may be any conventional sewing machine, surger, or device that performs a stitching operation. Hand stitching may also be utilized. Although the relatively simple configuration of components 601 and 602 is depicted, many articles of apparel and other products may be formed from multiple components or other material elements. As such, joining components 601 and 602 with stitching strand 605 serves to temporarily join or otherwise pre-join components 601 and 602 prior to thermal bonding. In effect, stitching strand 605 temporarily joins the multiple components or other elements of an article of apparel or other product prior to thermal bonding.

Figure 38A:
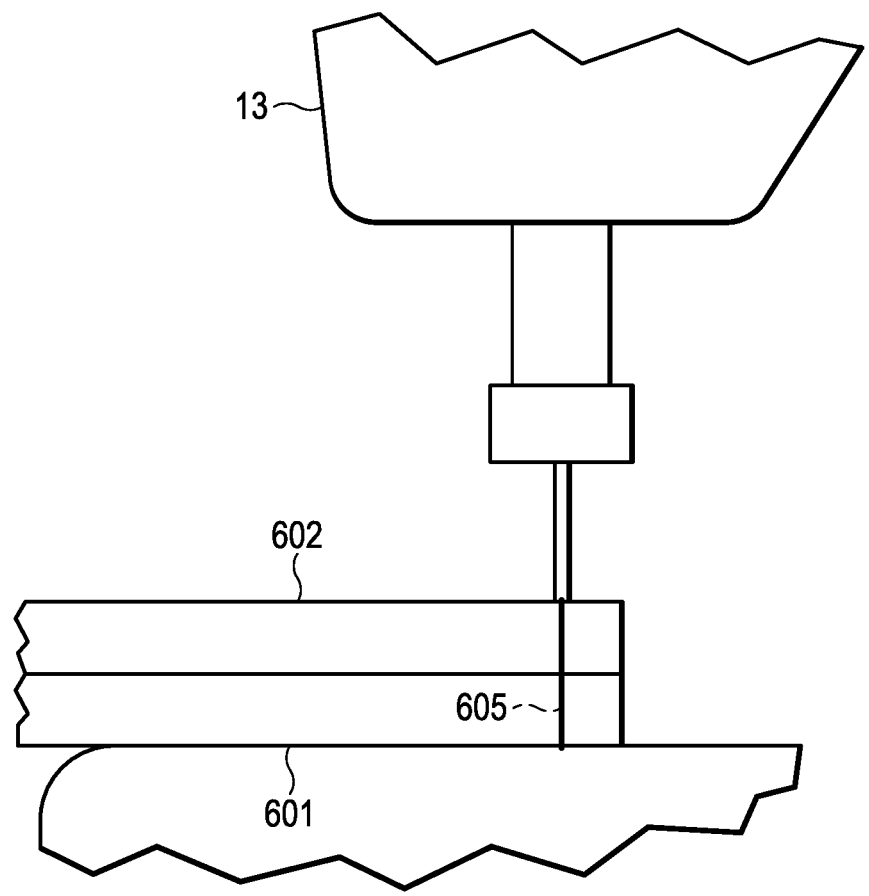
FIGS. 38A-38D are schematic side elevational views of a manufacturing process for the first configuration of the seam element with a stitching strand.
Figure 38B:
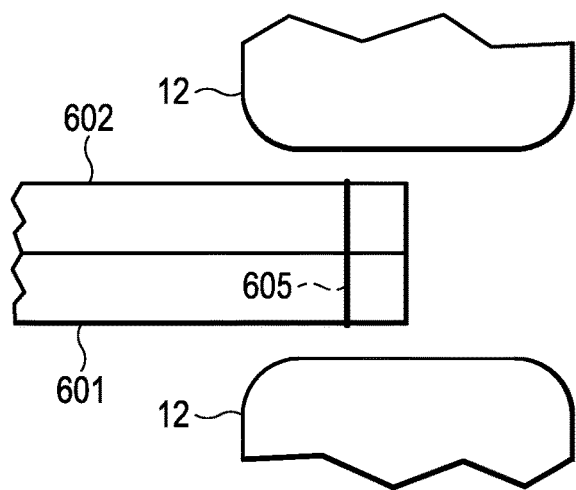
Figure 38C:
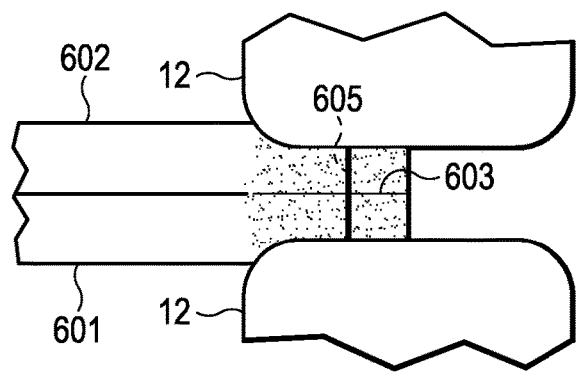

Once properly joined with stitching strand 605, the edge areas of components 601 and 602 that include stitching strand 605 are located between the pair of seam-forming dies 12, as depicted in FIG. 38B. Seam-forming dies 12 then translate or otherwise move toward each other in order to compress or induce contact between the edge areas of components 601 and 602, as depicted in FIG. 38C. Seam-forming dies 12 also apply heat to components 601 and 602 and stitching strand 605 to (a) form a first thermal bond with the first thermoplastic polymer material from components 601 and 602, thereby joining components 601 and 602 to each other at seam 603 and (b) form a second thermal bond with the second thermoplastic polymer material from stitching strand 605, thereby joining stitching strand 605 to components 601 and 602. Accordingly, heat from seam-forming dies 12 effectively forms two thermal bonds at seam 603.

Figure 38D:
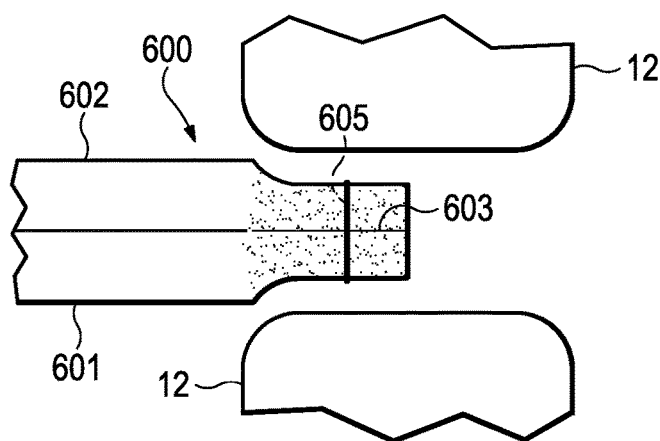
Figure 38E:
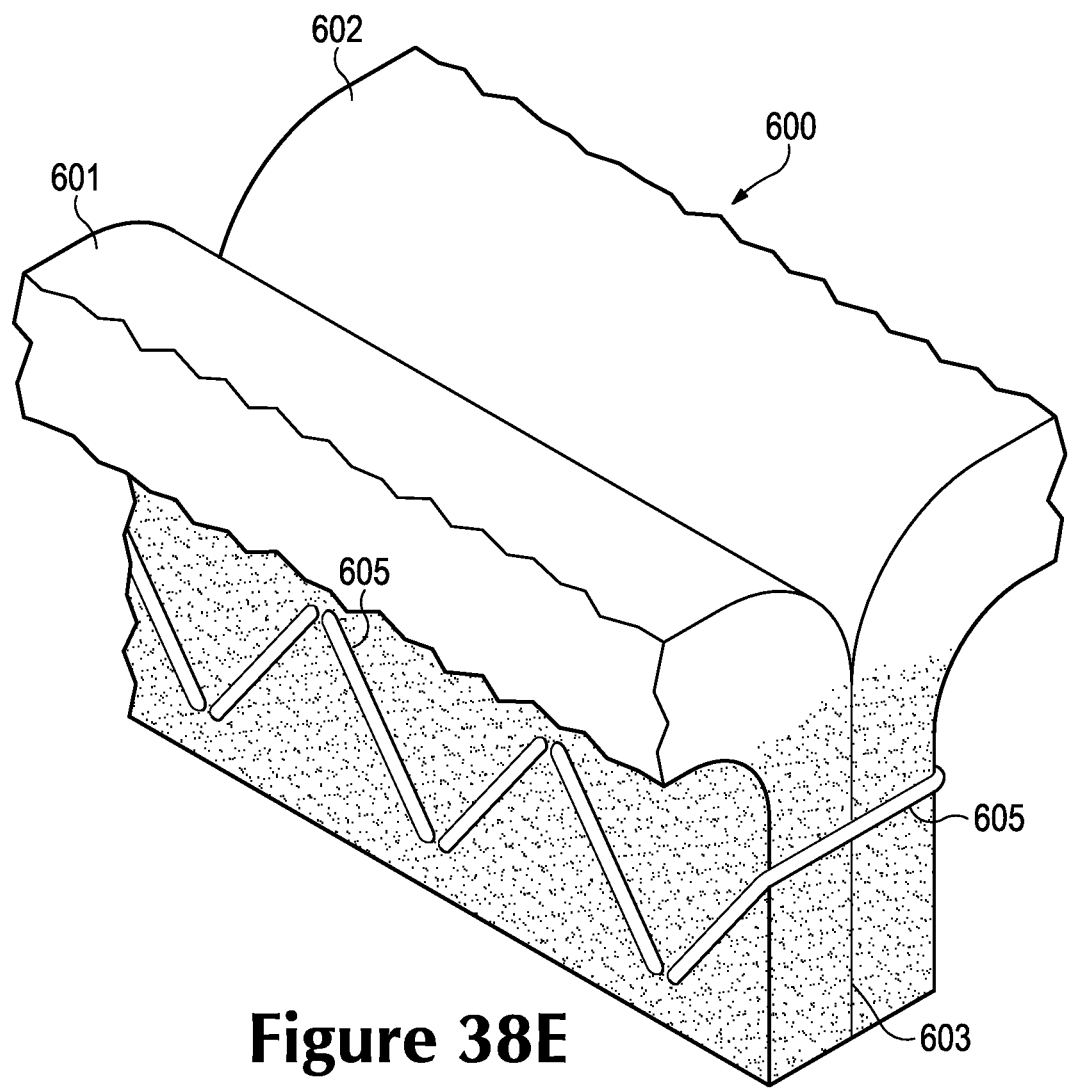
FIG. 38E is a perspective view of a portion of the manufacturing process for the first configuration of the seam element with a stitching strand.

Upon separating seam-forming dies 12, as depicted in FIG. 38D, seam 603 is formed permitted to cool. Components 601 and 602 may then be unfolded, as depicted in FIG. 38E. Seam 603 may also be trimmed to limit the degree to which the end areas protrude outward at seam 603. Rather than heating components 601 and 602 and stitching strand 605 through conduction, other methods that include radio frequency heating, ultrasonic heating, radiant heating, laser heating, or chemical heating may be utilized.

The degree of thermal bonding in seam 603 may vary significantly. In some configurations, as discussed above, advantages may be gained with a lesser degree of melting or softening of the first thermoplastic polymer material in components 601 and 602. In order to ensure that (a) the fibrous or filamentous structure of components 601 and 602 remains intact or otherwise coherent and (b) stitching strand 605 melts or softens to a greater degree, the melting and glass transition temperatures of the first thermoplastic polymer material are higher than the respective melting and glass transition temperatures of the second thermoplastic polymer material. That is, the melting temperature of the first thermoplastic polymer material is higher than the melting temperature of the second thermoplastic polymer material, and the glass transition temperature of the first thermoplastic polymer material is higher than the glass transition temperature of the second thermoplastic polymer material. Moreover, the melting temperature of the second thermoplastic polymer material may be higher or lower than the glass transition temperature of the first thermoplastic polymer material.

FIG. 39A depicts a graph of the manner in which the temperature of seam 603 changes between the steps discussed above for FIGS. 38B-38D. Moreover, this graph shows the situation where the melting temperature of the second thermoplastic polymer material is higher than the glass transition temperature of the first thermoplastic polymer material. Prior to being compressed by seam forming dies 12, the elements of seam 603 (i.e., components 601 and 602 and stitching strand 605) are at a constant initial temperature, which may room temperature of a factory. Once compressed by seam-forming dies 12, the temperature of the elements of seam 603 rises to exceed the glass transition temperatures of both the first and second thermoplastic polymer materials. When the temperature of the elements of seam 603 exceeds the two glass transition temperatures, thermal bonding may occur (a) between components 601 and 602 and (b) between stitching strand 605 and components 601 and 602. That is, both thermal bonds may be formed when the temperature of the components of seam 603 exceeds the two glass transition temperatures. Note that the melting temperature of the second thermoplastic polymer material is higher than the glass transition temperature of the first thermoplastic polymer material. As such, the second thermoplastic polymer material in stitching strand 605 does not reach the melting point in this example. As a result, stitching strand 605 may melt to a lesser degree, as in the configurations of FIGS. 36 and 37A. Once seam-forming dies 12 separate and the elements of seam 605 are removed, the temperature of the components may cool or otherwise decrease to the initial temperature.

Figure 39B:
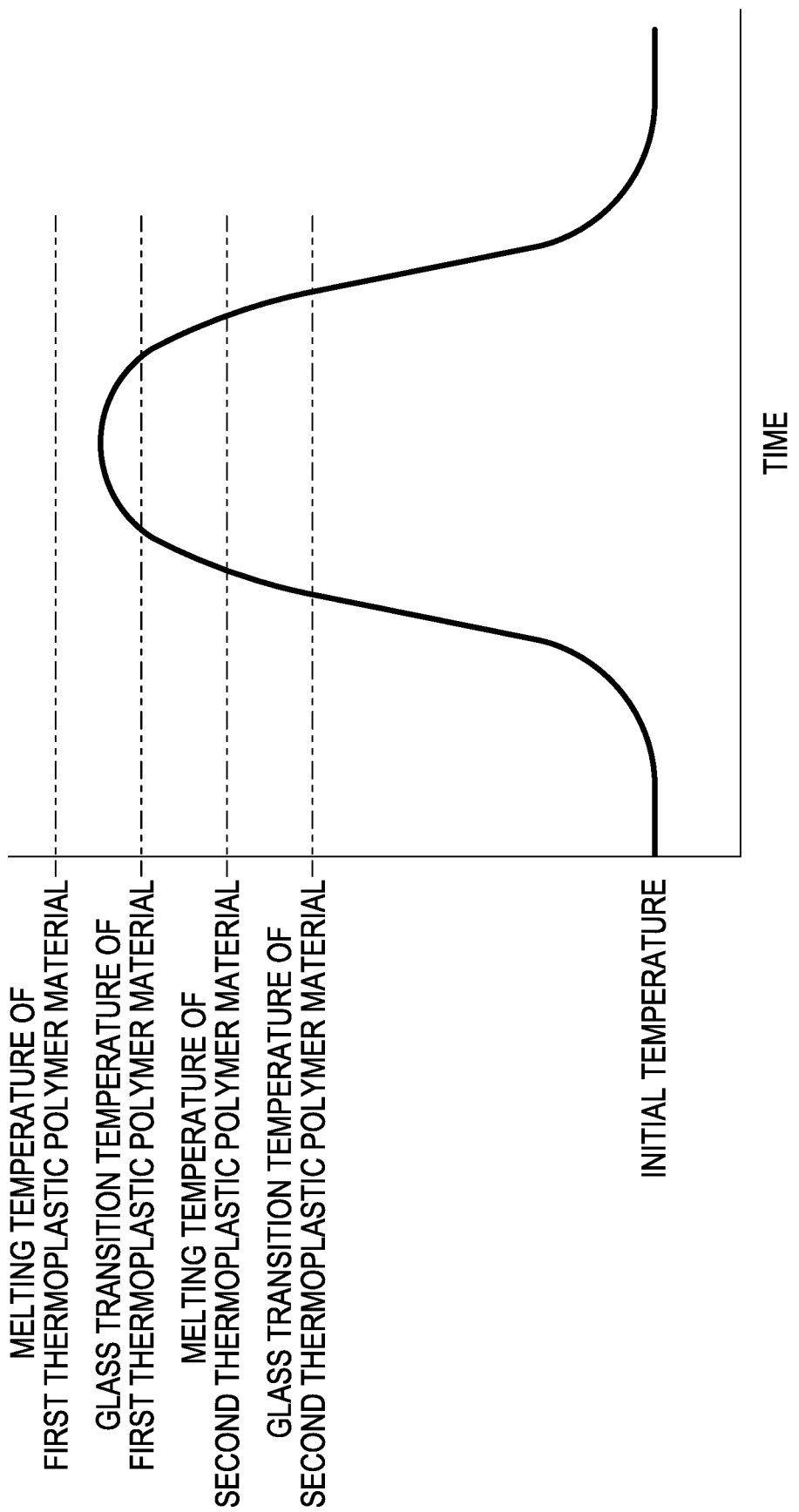

FIG. 39B also depicts a graph of the manner in which the temperature of seam 603 changes between the steps discussed above for FIGS. 38B-38D. Moreover, this graph shows the situation where the melting temperature of the second thermoplastic polymer material is lower than the glass transition temperature of the first thermoplastic polymer material. Prior to being compressed by seam forming dies 12, the elements of seam 603 (i.e., components 601 and 602 and stitching strand 605) are at a constant initial temperature, which may room temperature of a factory.

Once compressed by seam-forming dies 12, the temperature of the components of seam 603 rises to exceed the glass transition temperature of the first thermoplastic polymer material. When the temperature of the components of seam 603 exceeds the glass transition temperature of the first thermoplastic polymer material, thermal bonding may occur (a) between components 601 and 602 and (b) between stitching strand 605 and components 601 and 602. That is, both thermal bonds may be formed when the temperature of the components of seam 603 exceeds the glass transition temperature of the first thermoplastic polymer material. Note that the melting temperature of the second thermoplastic polymer material is lower than the glass transition temperature of the first thermoplastic polymer material. As such, the second thermoplastic polymer material in stitching strand 605 reaches the melting point in this example. As a result, stitching strand 605 may melt to a greater degree, as in the configurations of FIGS. 37B and 37C. Once seam-forming dies separate and the components of seam 603 are removed, the temperature of the components may cool or otherwise decrease to the initial temperature.

Although the glass transition temperatures and the melt temperatures of the first and second thermoplastic polymer materials may conform to the relationships discussed above, other relationships may also be utilized. For example, the melting temperature of the second thermoplastic polymer material may be higher than the melting temperature of the first thermoplastic polymer material, and the glass transition temperature of the second thermoplastic polymer material may be between the glass transition and melting temperatures of the first thermoplastic material. As another example, the glass transition and melting temperatures of the second thermoplastic polymer material may be higher than the melting temperature of the first thermoplastic polymer material.

Figure 40:
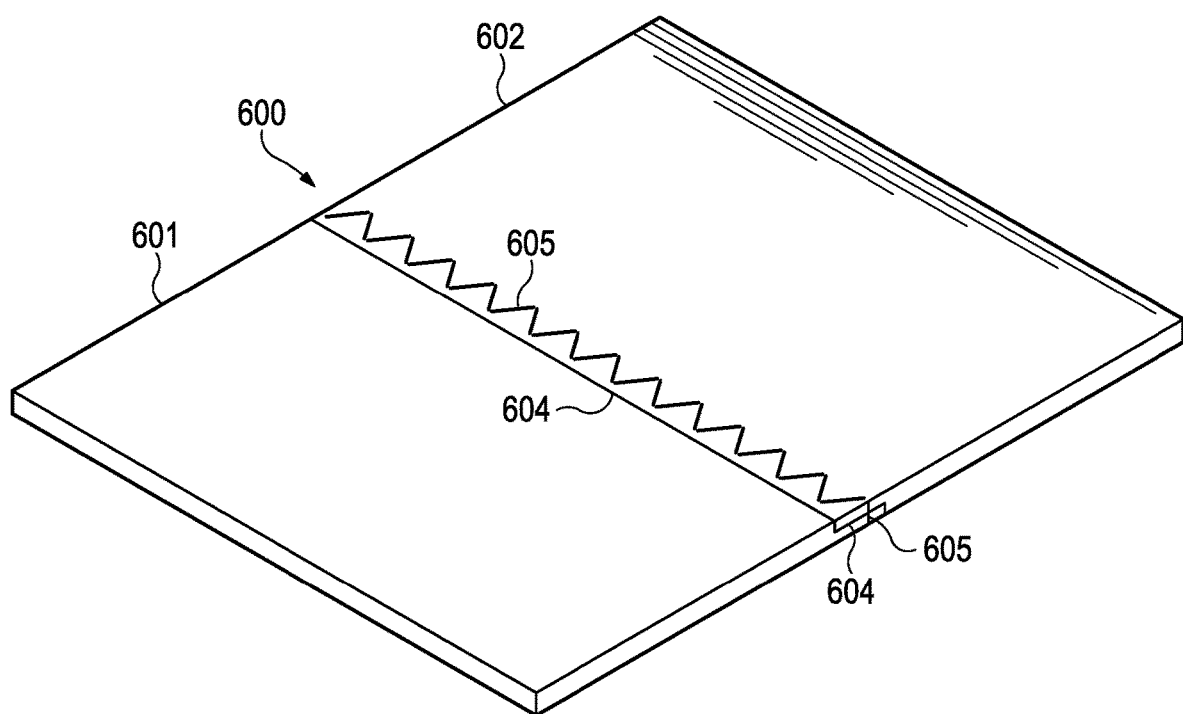
FIG. 40 is a perspective view of the second configuration of the seam element with a stitching strand.

The various concepts discussed above relating to the use of stitching strand 605 in seam 603 also applies to the configuration of seam 604. As an example, FIG. 40 depicts overlapping components 601 and 602 that are joined to form a seam 604 that includes stitching strand 605. That is, edge areas of components 601 and 602 overlap and lay against each other, where thermal bonding forms seam 604, and stitching strand 605 extends through the edge areas of components 601 and 602. Moreover, seam 604 effectively includes two thermal bonds. The first thermal bond is formed by the first thermoplastic polymer material from components 601 and 602. The second thermal bond is formed by the second thermoplastic polymer material from stitching strand 605.

I. GENERAL PRODUCT CONFIGURATIONS

The above discussion and associated FIGS. 1-40 disclose various elements that may be incorporated into a variety of products, including (a) yarn 100, thread 200, woven textile 300, and knitted textile 400; (b) fused regions 303, 304, 403, and 404; (c) composite element 500; (d) seams 603 and 604 from seam element 600, with or without stitching strand 605; and (e) thermal bonding to join or fuse. Any of these various elements may be utilized alone or in combination in articles of apparel, such as shirts, pants, socks, footwear, outerwear, undergarments, and headwear. Various aspects of the various elements may also be utilized in containers, upholstery for furniture, bed coverings, table coverings, towels, flags, tents, sails, and parachutes, as well as industrial purposes that include automotive and aerospace applications, filter materials, medical textiles, geotextiles, agrotextiles, and industrial apparel. Accordingly, the various elements may be utilized in a variety of products for both personal and industrial purposes.

Although the various elements may be utilized in a variety of products, the following discussion provides examples of articles of apparel. That is, the following discussion demonstrates numerous ways in which the various elements may be incorporated into a shirt 700 and footwear 800. More particularly, examples of various configurations of shirt 700 and footwear 800 are provided in order to demonstrate products utilizing yarns, threads, and textiles that incorporate thermoplastic polymer materials, as well as the manner in which thermal bonding may impart advantages to the products. Accordingly, while the concepts outlined below are specifically applied to various articles of apparel, the concepts may be applied to a variety of other products.

J. SHIRT CONFIGURATIONS

Figure 41:
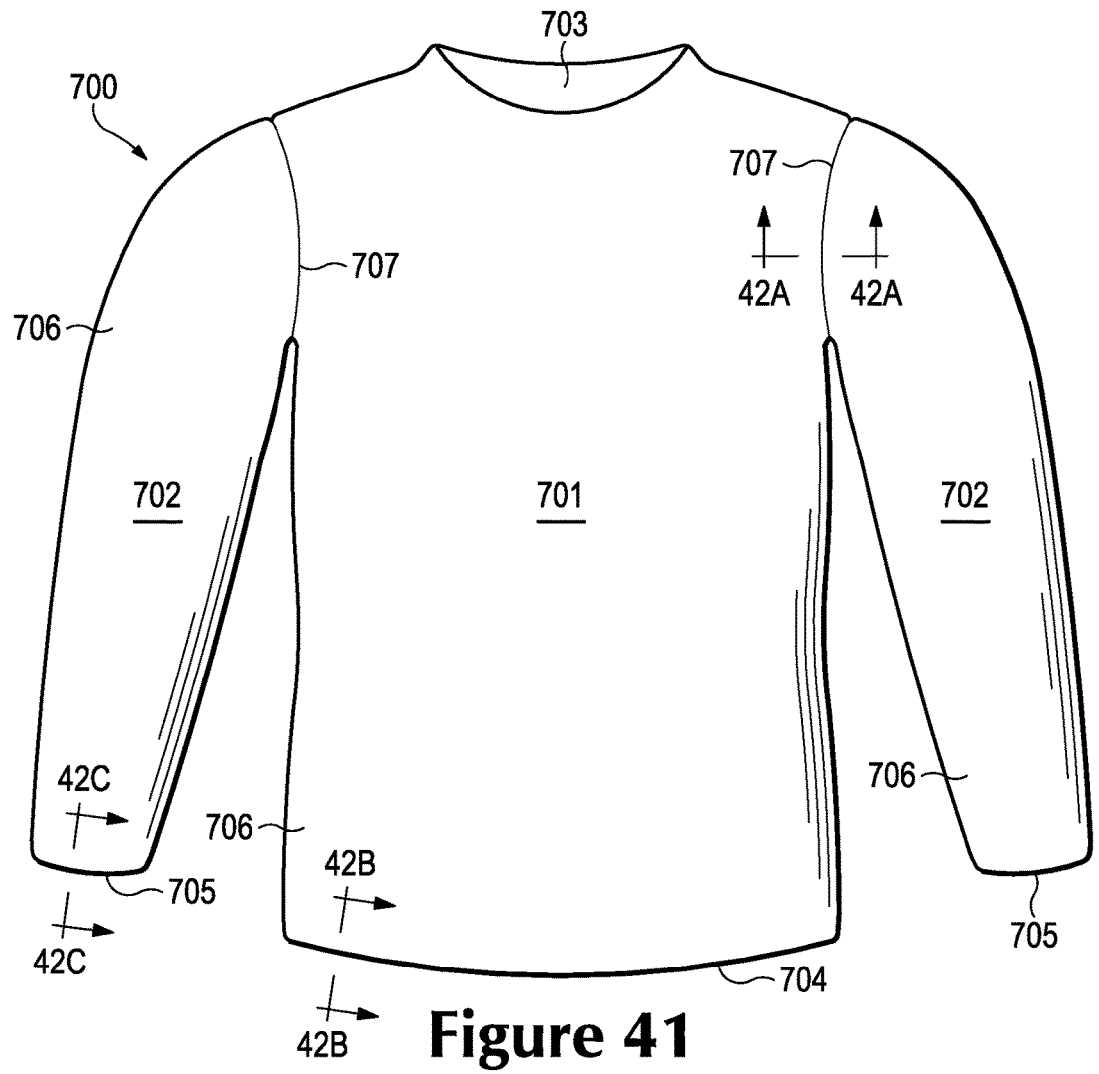
FIG. 41 is an elevational view of a first configuration of a shirt.

A first configuration of shirt 700 is depicted in FIG. 41 as including a torso region 701 and a pair of arm regions 702. Torso region 701 corresponds with a torso of a wearer and covers at least a portion of the torso when worn. An upper area of torso region 701 defines a neck opening 703 through which the neck and head of the wearer protrude when shirt 700 is worn. Similarly, a lower area of torso region 701 defines a waist opening 704 through which the waist or pelvic area of the wearer protrudes when shirt 700 is worn. Arm regions 702 extend outward from torso region 701 and respectively correspond with a right arm and a left arm of the wearer when shirt 700 is worn. As such, one of arm regions 702 covers at least a portion of the right arm, and the other of arm regions 702 covers at least a portion of the left arm. Each of arm regions 702 define an arm opening 705 through which the hands, wrists, or arms of the wearer protrude when shirt 700 is worn.

Torso region 701 and arm regions 702 are formed from various textile elements 706 that are joined at a plurality of seams 707. Textile elements 706 are generally formed to have the configuration of woven textile 300, knitted textile 400, or any other textile that incorporates a thermoplastic polymer material. As such, textile elements 706 may incorporate strands (e.g., yarn 100, thread 200) that have a plurality of substantially aligned filaments formed from a thermoplastic polymer material. Although each of textile elements 706 may be woven or knitted, other textile elements 706 may be a non-woven textile or a polymer sheet, for example, that incorporates a thermoplastic polymer material. Some of textile elements 706 may also be formed from cotton, silk, thermoset polymer filaments, or other materials that do not include a thermoplastic polymer material. Shirt 700 may also include elastic components, zippers, hook-and-loop fasteners, or other closure devices, for example.

Figure 42A:
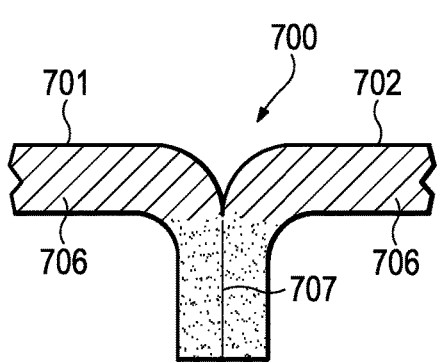
FIGS. 42A-42C are cross-sectional views of the first configuration of the shirt, as defined in FIG. 41.

Two of seams 707 extend between torso region 701 and arm regions 702 in order to join various textile elements 706 together. Although not depicted, additional seams 707 may extend along (a) side areas of torso region 701 to join front and back textile elements 706 and (b) rear areas of arm regions 702 to join edge areas of the textile element 706 forming each arm region 702, for example. In general, seams 707 define regions where edge areas of textile elements 706 are joined with each other, possibly through thermal bonding. Referring to FIG. 42A, one of seams 707 is depicted as having the general configuration of seam 603, but may also have the general configuration of seam 604. Moreover, any of the various methods discussed above for forming seams 603 and 604, with or without stitching strand 605, may be utilized to form seams 707. As such, an article of apparel incorporating textile elements formed from a thermoplastic polymer material may include thermal bonds that join textile elements at various seams.

Figure 42B:
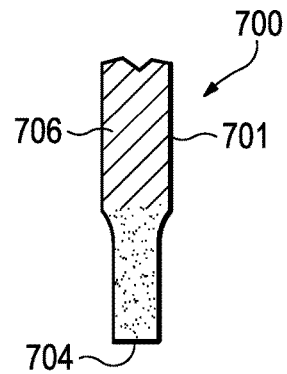
Figure 42C:
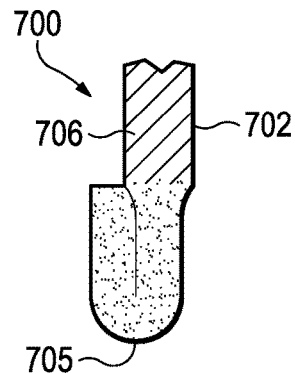

Many of the edge areas of textile elements 706 are joined at seams 707. Other edge areas are present at openings 703, 704, and 705. In order to prevent fraying or unraveling of strands forming textile elements 706 at openings 703, 704, and 705, various types of thermal bonds may be employed. Referring to FIG. 42B, the edge area of textile element 706 that forms waist opening 704 is thermal bonded to effectively fuse the various strands within textile element 706. That is, filaments or yarns that incorporate a thermoplastic polymer material may be thermal bonded with each other adjacent to waist opening 704 to prevent fraying or unraveling of strands forming textile elements 706. Another manner in which thermal bonding may be utilized to prevent fraying or unraveling is depicted in FIG. 42C. More particularly, the edge area of textile element 706 at one of arm openings 705 is turned inward and folded back on itself. A thermal bond is formed to join surfaces of textile element 706, and the thermal bond also effectively fuses the various strands within textile element 706. That is, filaments or yarns that incorporate a thermoplastic polymer material may be thermal bonded with each other adjacent to arm openings 705 to prevent fraying or unraveling of strands forming textile elements 706.

Figure 43:
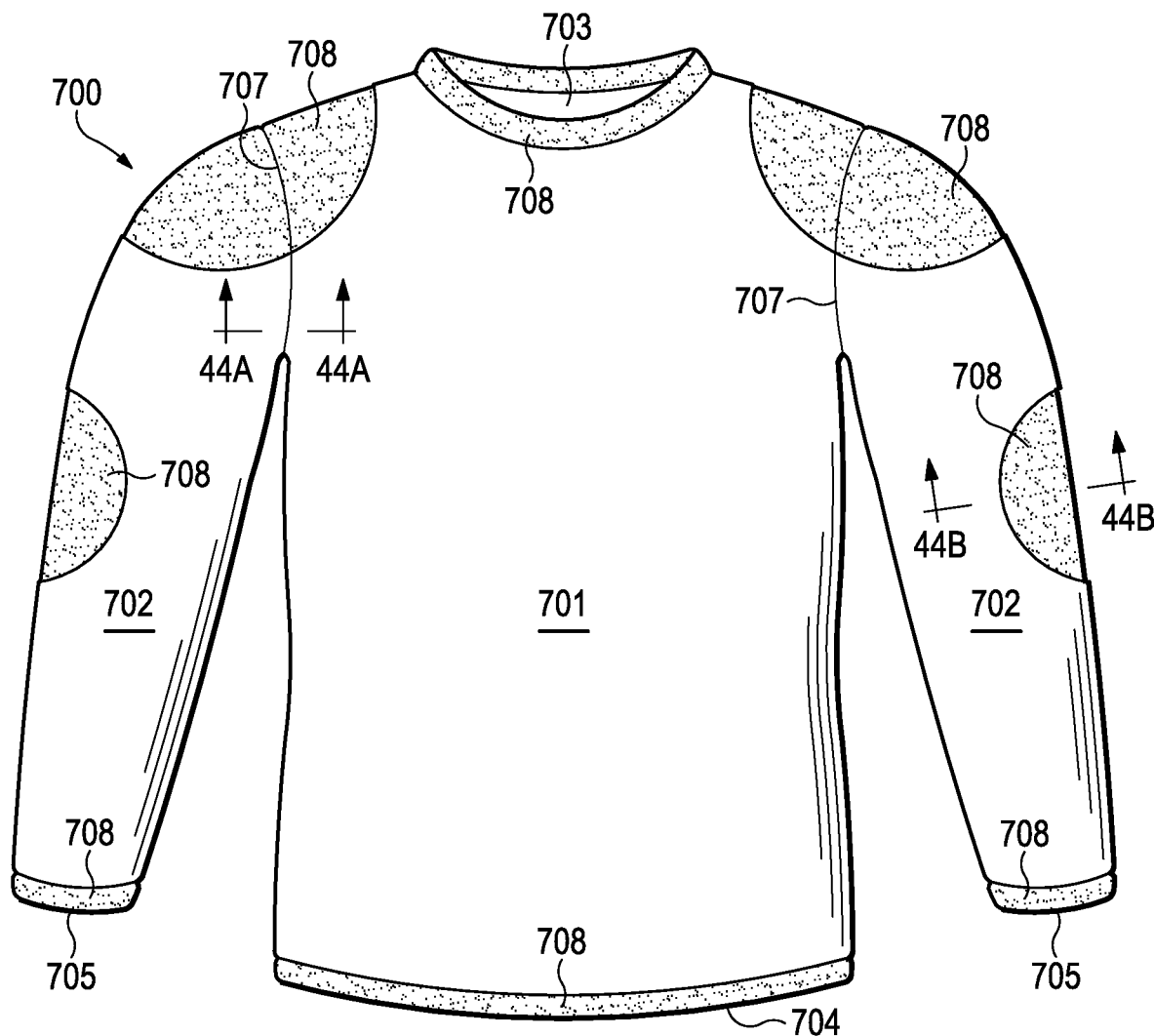
FIG. 43 is an elevational view of a second configuration of the shirt.
Figure 44A:
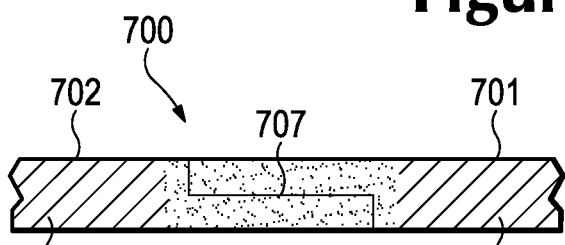
FIGS. 44A and 44B are cross-sectional views of the second configuration of the shirt, as defined in FIG. 43.

A second configuration of shirt 700 is depicted in FIG. 43 as having many of the features discussed with reference to FIG. 41. Although seams 707 may exhibit the configuration in FIG. 42A, seam 707 is depicted in FIG. 44A as having the general configuration of seam 604. As such, an edge area of one textile element 706 overlaps and is thermal bonded with an edge of the other textile element 706. A variety of seam configurations, including those of seams 603 and 604, may be utilized in articles of apparel.

In order to impart different properties to specific areas of shirt 700, various fused regions 708 are formed in textile elements 706. More particularly, fused regions 708 are formed around neck opening 703, waist opening 704, and each of arm openings 705. Given that each of openings 703-705 may be stretched as shirt 700 is put on an individual and taken off the individual, fused regions 708 are located around openings 703-705 in order to impart greater stretch-resistance to these areas. Strands incorporating a thermoplastic polymer material in fused regions 708 are generally fused to a greater degree than in other areas of shirt 700. Similar to the discussion of FIGS. 42B and 42C above, some of fused regions 708 may prevent fraying or unraveling in the areas around openings 703-705.

Given that elbow areas of shirt 700 may be subjected to relatively high abrasion as shirt 700 is worn, some of fused regions 708 may be located in the elbow areas to impart greater durability. Also, backpack straps that extend over shoulder areas of shirt 700 may abrade and stretch the shoulder areas. Additional fused regions 708 are, therefore, located in the shoulder areas of shirt 200 to impart both durability and stretch-resistance. Portions of textile elements 706 that are located in the shoulder areas and around seams 707 effectively form both seams 707 and fused regions 708 in the shoulder areas. Two separate processes may be utilized to form these areas. That is, one thermal bonding process may form seams 707, and another thermal bonding process may form fused regions 708 in the shoulder areas. In some processes, however, seams 707 and fused regions 708 in the shoulder areas may be formed through a single thermal bonding process.

Figure 44B:
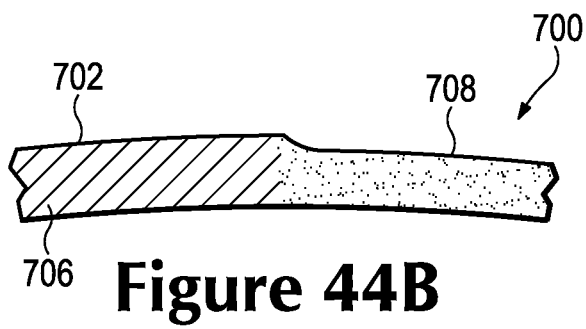

During the thermal bonding that forms fused regions 708, areas of textile elements 706 are heated and compressed. In addition to fusing strands within textile elements 706, the heating and compression may also cause fused regions 708 to compress or reduce in thickness. More particularly, processes that form a fused regions 708 may effectively cause thinning in the areas of fused regions 708. This effect may be seen in FIG. 44B and may occur in other locations where thermal bonding or fusing forms areas similar to fused regions 303, 304, 403, 404, and 708.

Figure 45:
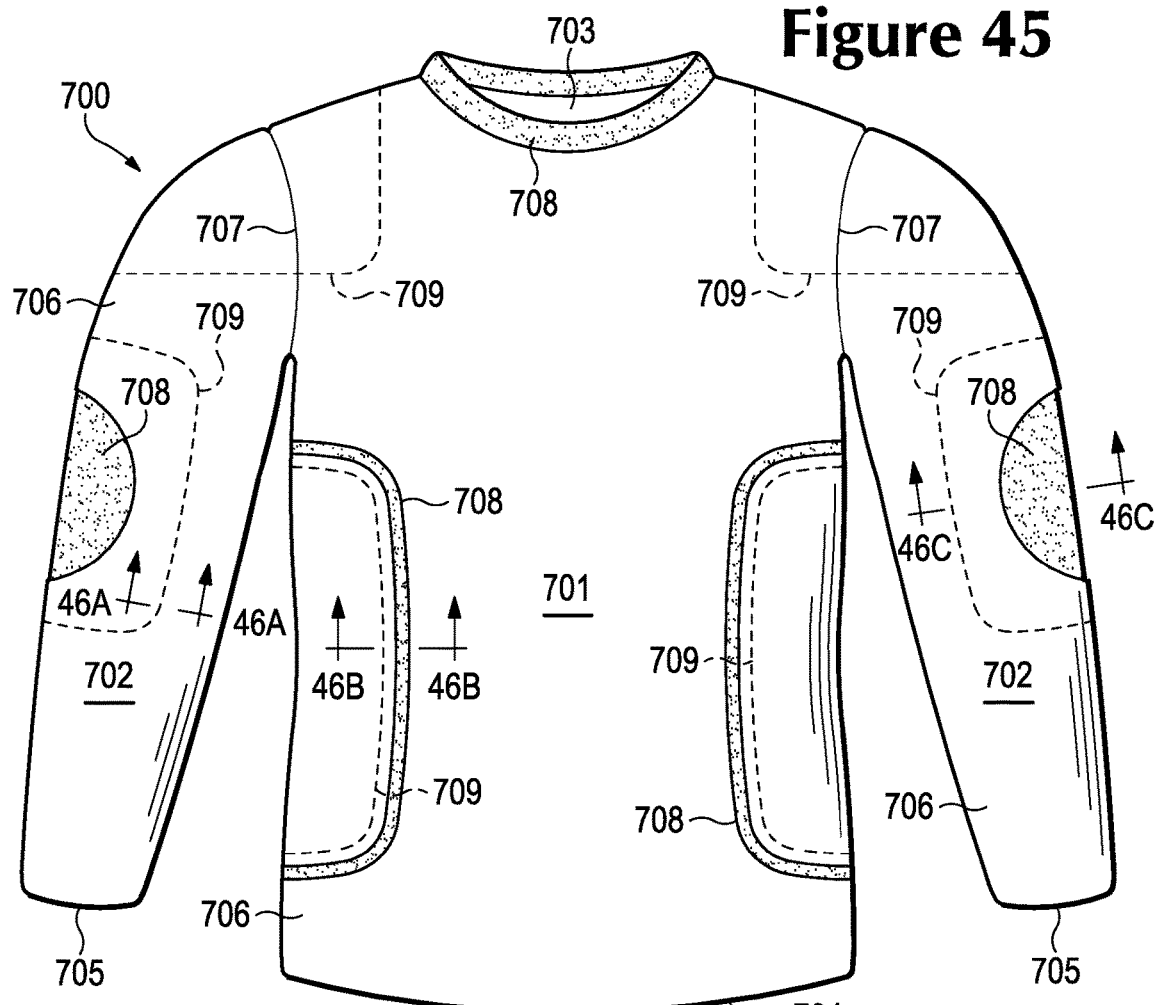
FIG. 45 is an elevational view of a third configuration of the shirt.
Figure 46A:
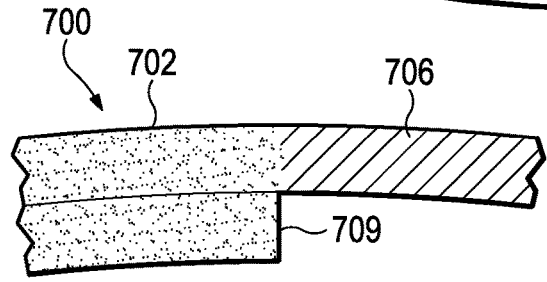
FIGS. 46A-46C are cross-sectional views of the third configuration of the shirt, as defined in FIG. 45.
Figure 46B:
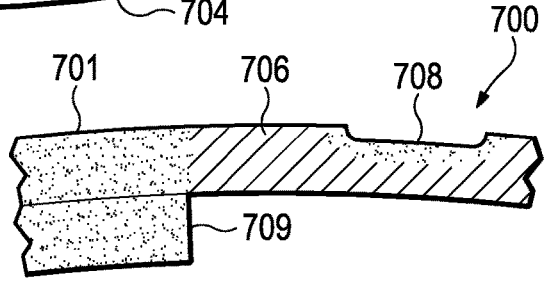
Figure 46C:
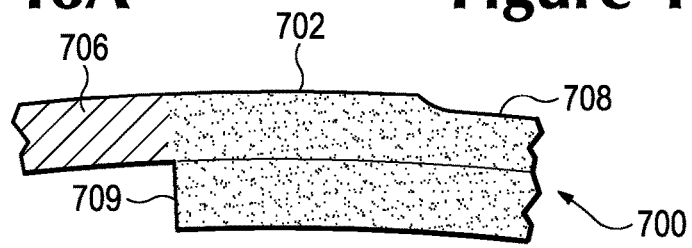

A third configuration of shirt 700 is depicted in FIG. 45 as including various components 709 are secured to textile elements 706. More particularly, components 709 are thermal bonded to an interior surface of shirt 700, as depicted in FIGS. 46A-46C. In other configurations, components 700 may be secured to an exterior surface of shirt 700. Components 709 may be additional textile elements that may incorporate thermoplastic polymer materials or may be formed from other materials. Additionally, components 709 may be a compressible material, such as elements of polymer foam. Components 709 may also be a polymer sheet or plate. Moreover, each of components 709 may be formed from different materials to impart different properties to areas of shirt 700. In effect, the combination of textile elements 706 and components 709 form structures similar to composite element 500.

Components 709 may have various configurations. If component 709 is another textile that absorbs or wicks water, then the combination of textile elements 706 and the other textile may be suitable for configurations of shirt 700 utilized during athletic activities where an individual wearing shirt 700 is likely to perspire. If component 709 is a compressible material, such as an element of polymer foam, then the combination of textile elements 706 and the compressible material may be suitable for configurations of shirt 70 where cushioning (i.e., attenuation of impact forces) is advantageous, such as padding for athletic activities that may involve contact or impact with other athletes, equipment, or the ground. If component 709 is a polymer sheet or plate, then the combination of textile elements 706 and the polymer sheet or plate may be suitable for articles of apparel that impart protection from acute impacts. Accordingly, a variety of materials or other components may be joined through thermal bonding to textile elements 706 of shirt 700.

Various fused regions 708 are also formed in textile elements 706 and adjacent to some of components 709. As an example, two fused regions 708 extend around the areas where components 709 are located in the side areas of torso region 701. A pair of fused regions 708 extend over the areas where components 709 are located in the elbow areas of arm regions 702. These fused regions 708 may be utilized to reinforce or add stretch-resistance to areas surrounding components 709 or provide greater durability to areas over components 709, for example.

Figure 47:
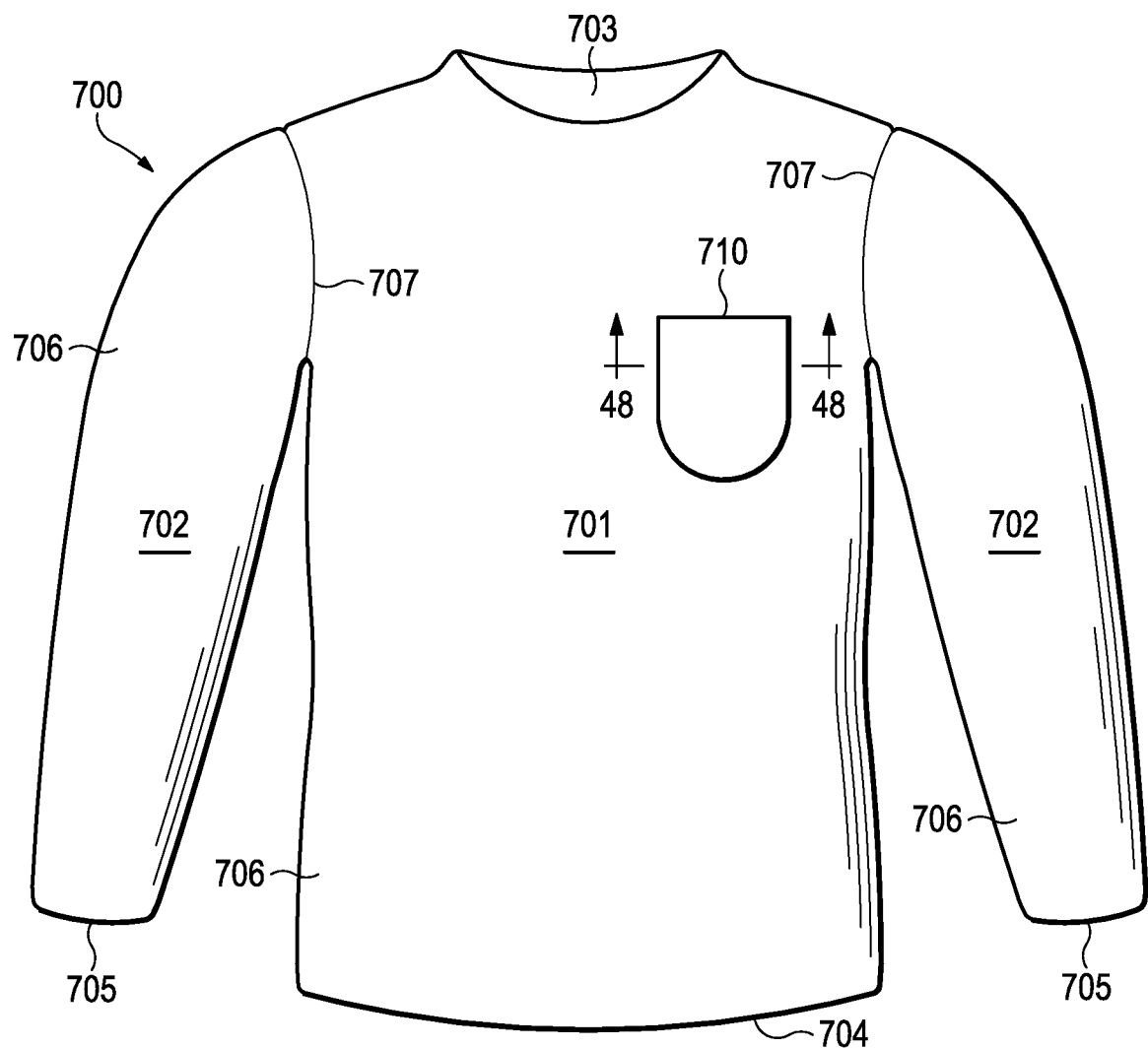
FIG. 47 is an elevational view of a fourth configuration of the shirt.
Figure 48:
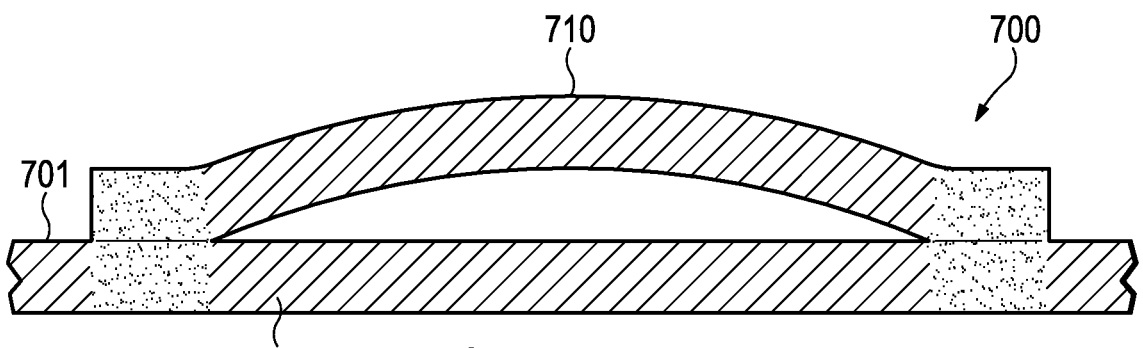
FIG. 48 is a cross-sectional view of the fourth configuration of the shirt, as defined in FIG. 47.

A fourth configuration of shirt 700 is depicted in FIG. 47 as including a pocket 710, which may be utilized to hold or otherwise contain relatively small objects (e.g., keys, wallet, identification card, mobile phone, portable music player). Pocket 710 is formed as two overlapping layers of material, at least one of which is textile element 708. Additionally, a thermal bond is utilized to join the overlapping layers of material to each other. That is, a thermal bond joins a periphery of the material element forming pocket 710 to textile element 706. A central area of pocket 710 remains unbonded. A pocket similar to pocket 710 may also be formed in other products and articles of apparel, including pants and jackets.

Based upon the above discussion, textile elements (e.g., textiles 300 and 400) including a thermoplastic polymer material may be utilized in shirt 700. Given that many other types of apparel have constructions that are similar to shirt 700. That is, pants, socks, outerwear, undergarments, and headwear are all formed from one or more textile elements joined at seams. These other types of apparel may, therefore, incorporate structures that are substantially similar to seams 707 (i.e., seams 603, 604). In order to impart different properties to areas of the apparel, various structures that are substantially similar to fused regions 708 (i.e., fused regions 303, 304, 403, 404) may also be utilized. Similarly, the other types of apparel may also incorporate structures that are substantially similar to components 709 (i.e., components 501, 502). By forming fused regions and combining the textile elements with other components, various properties and combinations of properties may be imparted to different areas of the apparel. That is, the various concepts disclosed herein may be utilized individually or in combination to engineer the properties of apparel to a specific purpose.

K. FOOTWEAR CONFIGURATIONS

Figure 49:
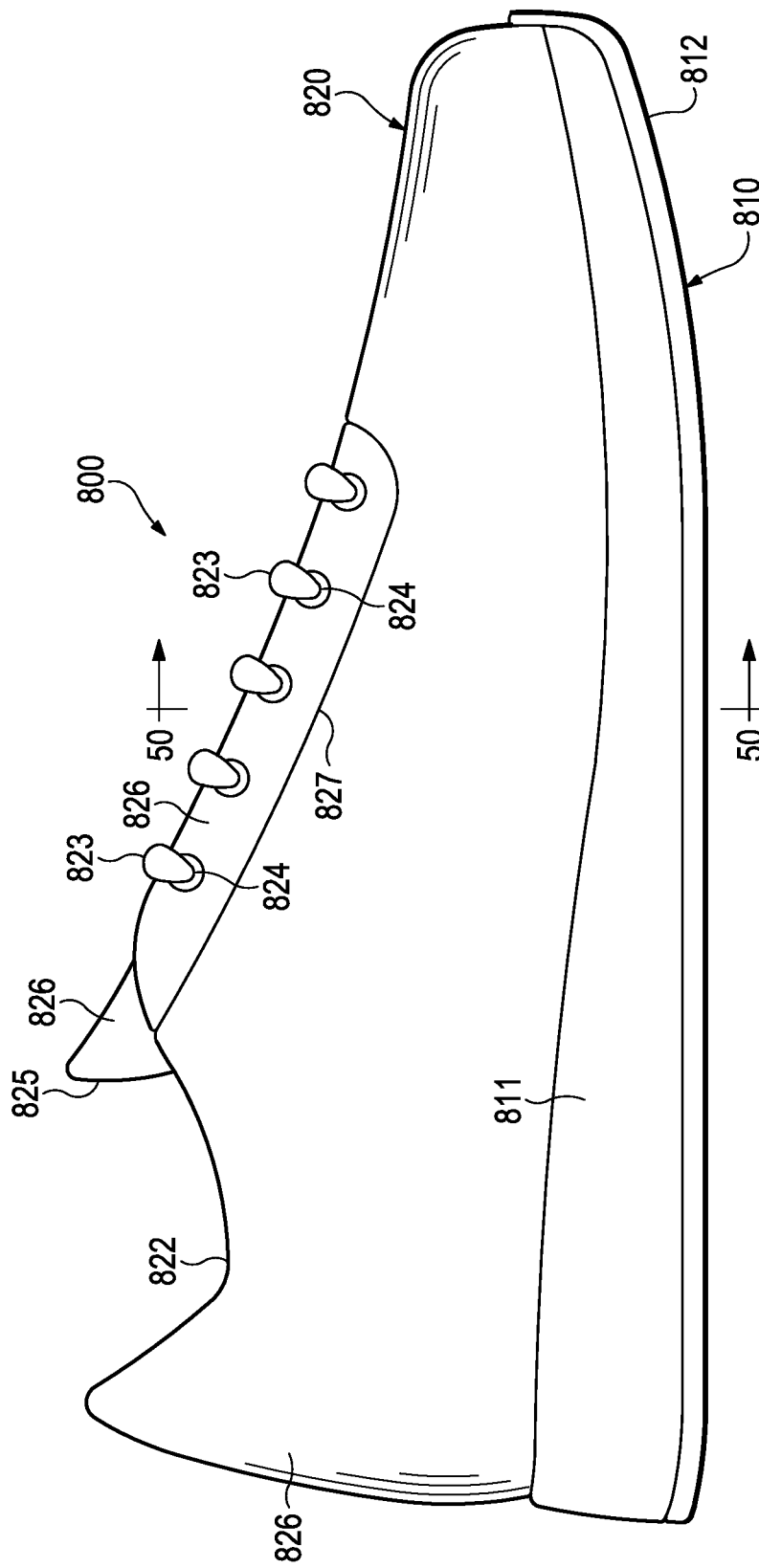
FIG. 49 is an elevational view of a first configuration of footwear.

A first configuration of footwear 800 is depicted in FIG. 49 as including a sole structure 810 and an upper 820. Sole structure 810 is secured to a lower area of upper 820 and extends between upper 820 and the ground. Upper 820 provides a comfortable and secure covering for a foot of a wearer. As such, the foot may be located within upper 820, which effectively secures the foot within footwear 800, and sole structure 810 extends under the foot to attenuate forces, enhance stability, or influence the motions of the foot, for example.

Figure 50:
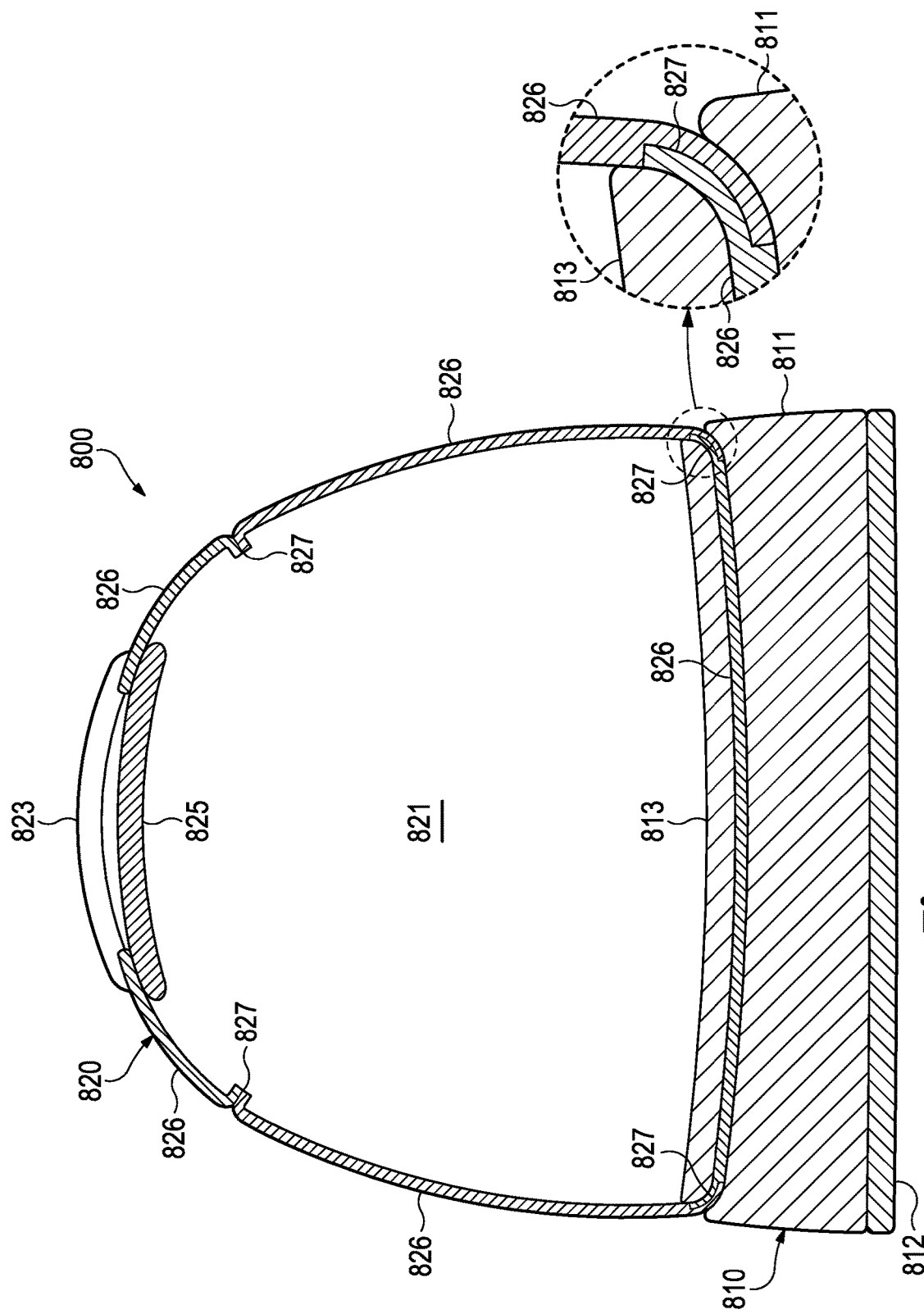
FIG. 50 is a cross-sectional view of the first configuration of the footwear, as defined in FIG. 49.

Sole structure 810 includes a midsole 811, an outsole 812, and an sockliner 813. Midsole 811 is secured to a lower surface of upper 820 and may be formed from a compressible polymer foam element (e.g., a polyurethane or ethylvinylacetate foam) that attenuates ground reaction forces (i.e., provides cushioning) when compressed between the foot and the ground during walking, running, or other ambulatory activities. In further configurations, midsole 811 may incorporate fluid-filled chambers, plates, moderators, or other elements that further attenuate forces, enhance stability, or influence the motions of the foot, or midsole 811 may be primarily formed from a fluid-filled chamber. Outsole 812 is secured to a lower surface of midsole 811 and may be formed from a wear-resistant rubber material that is textured to impart traction. Sockliner 813 is located within upper 820, as depicted in FIG. 50, and is positioned to extend under a lower surface of the foot. Although this configuration for sole structure 810 provides an example of a sole structure that may be used in connection with upper 820, a variety of other conventional or nonconventional configurations for sole structure 810 may also be utilized.

Upper 820 may be formed from a variety of elements that are joined together to form a structure for receiving and securing the foot relative to sole structure 810. As such, upper 820 extends along opposite sides of the foot, over the foot, around a heel of the foot, and under the foot. Moreover, upper 820 defines a void 821, which is a generally hollow area of footwear 800, that has a general shape of the foot and is intended to receive the foot. Access to void 821 is provided by an ankle opening 822 located in at least a heel region. A lace 823 extends through various lace apertures 824 and permits the wearer to modify dimensions of upper 820 to accommodate the proportions of the foot. More particularly, lace 823 permits the wearer to tighten upper 820 around the foot, and lace 823 permits the wearer to loosen upper 820 to facilitate entry and removal of the foot from the void (i.e., through ankle opening 822). As an alternative to lace apertures 824, upper 820 may include other lace-receiving elements, such as loops, eyelets, hooks, and D-rings. In addition, upper 820 includes a tongue 825 that extends between void 821 and lace 823 to enhance the comfort and adjustability of footwear 800. In some configurations, upper 820 may also incorporate other elements, such as reinforcing members, aesthetic features, a heel counter that limits heel movement, a wear-resistant toe guard, or indicia (e.g., a trademark) identifying the manufacturer. Accordingly, upper 820 is formed from a variety of elements that form a structure for receiving and securing the foot.

Portions of upper 820 that extend along sides of the foot, over the foot, and under the foot include various textile elements 826, which are generally formed to have the configuration of woven textile 300, knitted textile 400, or any other textile that incorporates a thermoplastic polymer material. As such, textile elements 826 may incorporate strands (e.g., yarn 100, thread 200) that have a plurality of substantially aligned filaments formed from a thermoplastic polymer material. Although each of textile elements 826 may be woven or knitted, other textile elements 826 may be a non-woven textile or a polymer sheet, for example, that incorporates a thermoplastic polymer material. Some of textile elements 826 may also be formed from cotton, silk, thermoset polymer filaments, or other materials that do not include a thermoplastic polymer material. Tongue 825 may also incorporate one or more of textile elements 826.

Although a single textile element 826 may form a relatively large area of upper 820, multiple textile elements 826 are joined at various seams 827. In general, seams 827 define regions where edge areas of textile elements 826 are joined with each other, possibly through thermal bonding. As an example, two seams 827 are located on opposite sides of upper 820 and join a textile element 826 that forms lace apertures 824 with a textile element 826 that extends along sides of the foot. These seams 827 exhibit the general configuration of seam 603, but may also have the general configuration of seam 604. An advantage to the configuration of seam 604 is that the edge areas of textile element 826 do not protrude inward, which may cause discomfort for the wearer. As another example, two seams 827 are located on opposite sides of upper 820 and join the textile element 826 that extends along sides of the foot with a textile element 826 that extends under the foot, which may be a strobel material. These seams 827 exhibit the general configuration of seam 604, but may also have the general configuration of seam 603. Accordingly, various textile elements 826 may be joined with seams 827, which may be formed through the various thermal bonding processes discussed above for forming seams 603 and 604.

Two of seams 707 extend between torso region 701 and arm regions 702 in order to join various textile elements 706 together. Although not depicted, additional seams 707 may extend along (a) side areas of torso region 701 to join front and back textile elements 706 and (b) rear areas of arm regions 702 to join edge areas of the textile element 706 forming each arm region 702, for example. Referring to FIG. 42A, one of seams 707 is depicted as having the general configuration of seam 603, but may also have the general configuration of seam 604. Moreover, any of the various methods discussed above for forming seams 603 and 604, with or without stitching strand 605, may be utilized to form seams 707. As such, an article of apparel incorporating textile elements formed from a thermoplastic polymer material may include thermal bonds that join textile elements at various seams.

A relatively large percentage of footwear 800 may be formed from thermoplastic polymer materials. As discussed above, textile elements 826 may be at least partially formed from thermoplastic polymer materials. Although lace 823 is not generally joined to upper 820 through bonding or stitching, lace 823 may also be formed from a thermoplastic polymer material. Similarly, each of midsole 811 and outsole 812 may be formed from a thermoplastic polymer material. Depending upon the number of elements of footwear 800 that incorporate thermoplastic polymer materials or are entirely formed from thermoplastic polymer materials, the percentage by mass of footwear 800 that is formed from the thermoplastic polymer materials may range from thirty percent to one-hundred percent. In some configurations, at least sixty percent of a combined mass of sole structure 810 and upper 820 may be from thermoplastic polymer materials. Accordingly, a majority or even all of footwear 400 may be formed from one or more thermoplastic polymer materials.

Adhesives are conventionally utilized to join uppers to sole structures and midsoles to outsoles. An advantage of forming various elements of footwear 800 from thermoplastic polymer materials is that a thermal bond may be utilized to join upper 820 to sole structure 810 and midsole 811 to outsole 812. In addition to reducing the environmental effects of utilizing adhesives, the recyclability of footwear 800 may also be enhanced.

Figure 51:
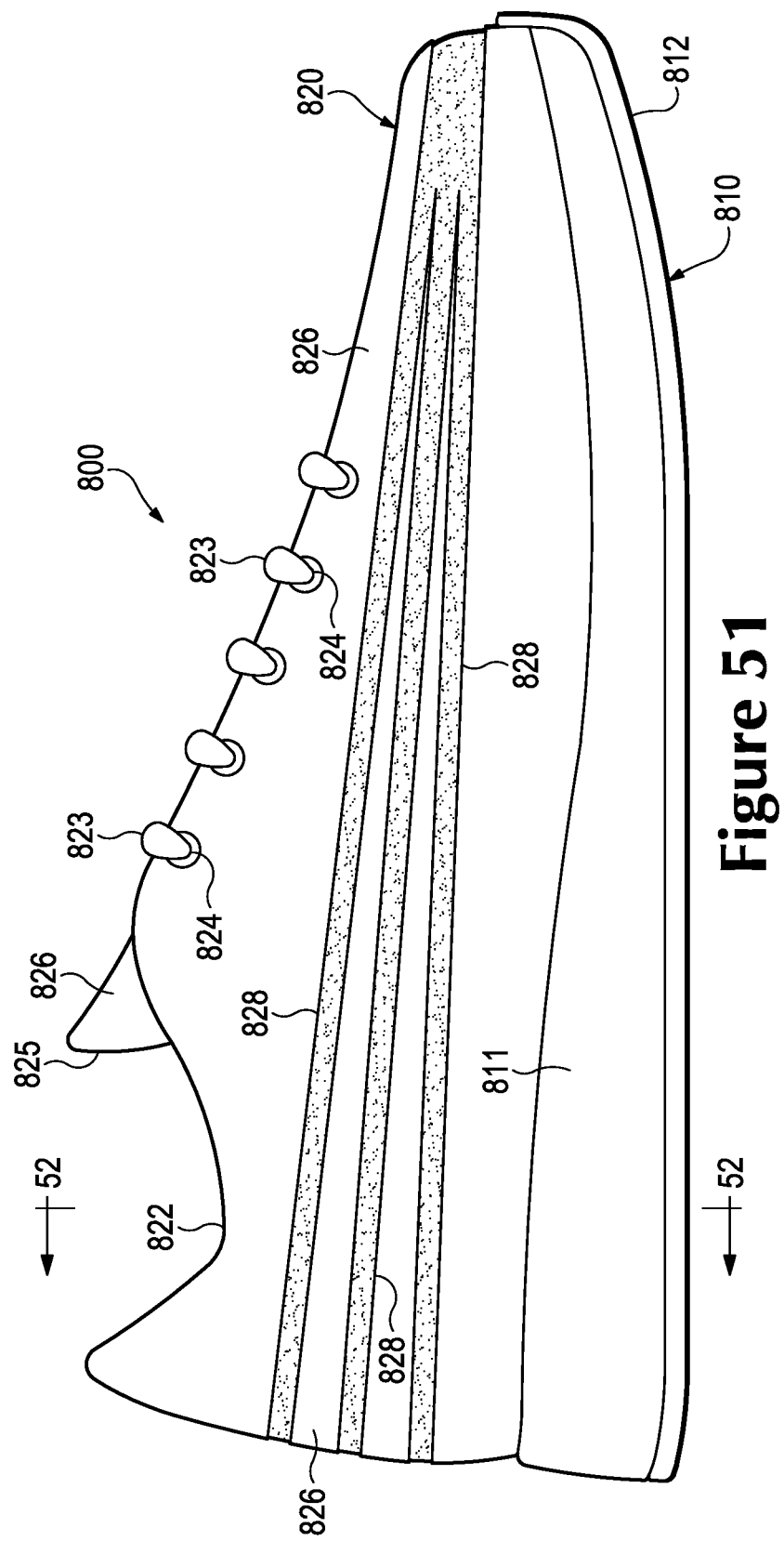
FIG. 51 is an elevational view of a second configuration of the footwear.

A second configuration of footwear 800 is depicted in FIG. 51 as having many of the features discussed above. In order to impart different properties to specific areas of upper 820, three generally linear fused regions 828 extend from a heel area to a forefoot area of footwear 800. As an example, fused regions 828 may impart stretch-resistance. That is, upper 820 may have a tendency to stretch during walking, running, or other ambulatory activities, and fused regions 828 impart greater stretch-resistance along the length of footwear 800. Given that textile elements 826 may (a) be woven textile 300, knitted textile 400, or any other textile that incorporates a thermoplastic polymer material or (b) incorporate strands (e.g., yarn 100, thread 200) that are formed from a thermoplastic polymer material, the strands in fused regions 828 are generally fused to a greater degree than in other areas of footwear 800.

Figure 52:
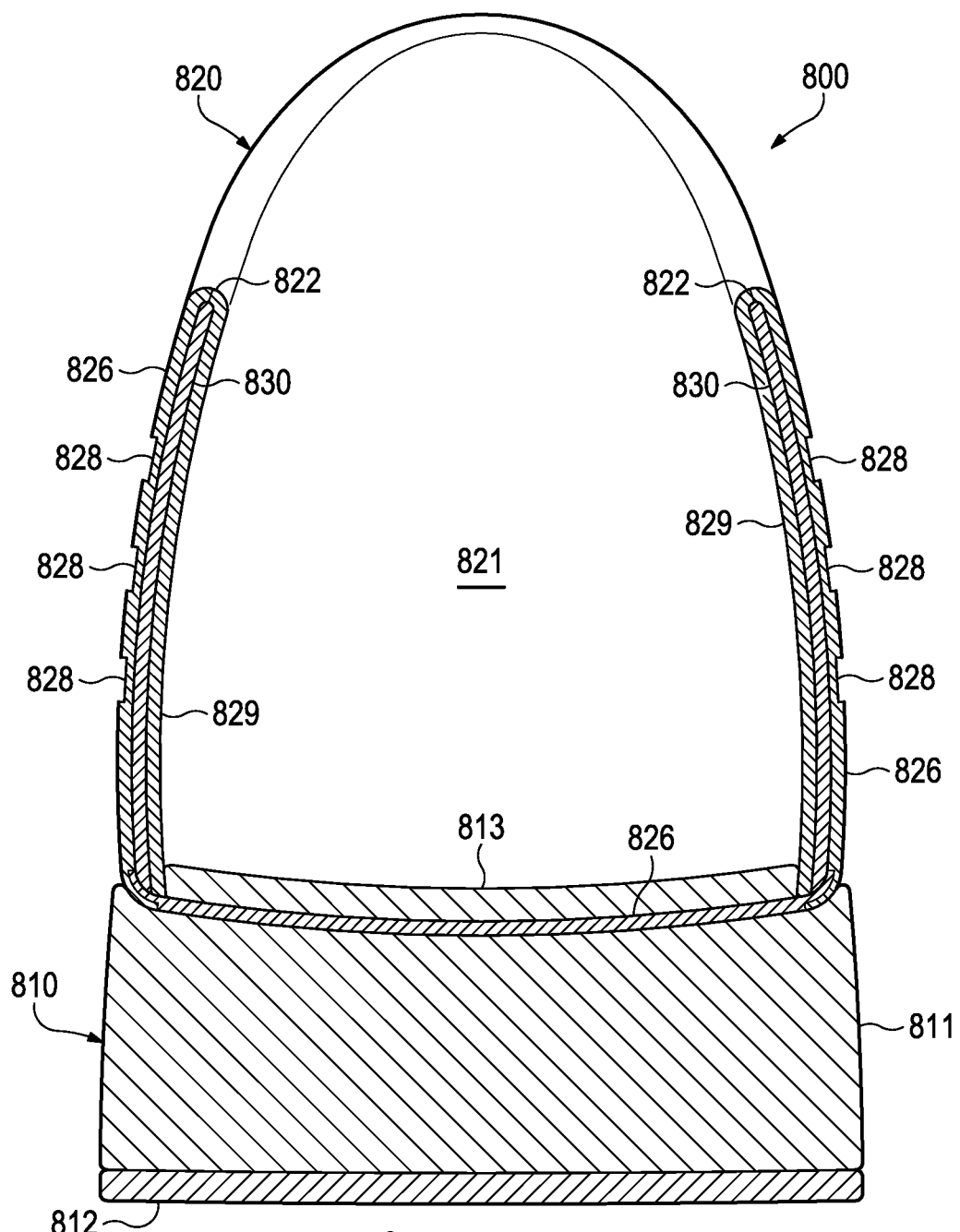
FIG. 52 is a cross-sectional views of the second configuration of the footwear, as defined in FIG. 51.

During the thermal bonding process that forms fused regions 828, areas of textile elements 826 are heated and compressed. In addition to fusing strands within textile elements 826, the heating and compression may also cause fused regions 828 to compress or reduce in thickness. More particularly, processes that form a fused regions 828 may effectively cause thinning in the areas of fused regions 828. This effect may be seen in FIG. 52 and may occur in other locations where thermal bonding or fusing forms areas similar to fused regions 303, 304, 403, and 404.

Although upper 820 may be formed to have a thickness of a single layer of textile elements 826, upper 820 may also have a thickness of multiple layers. Referring again to FIG. 52, the areas of upper 820 that extend along sides of the foot include textile elements 826, as well as components 829 and 830. More particularly, each side of upper 820 has a layered configuration wherein (a) textile element 826 forms an exterior surface of upper 820, (b) component 829 forms an interior surface that defines a portion of void 821, and (c) component 830 is located between textile element 826 and component 829 to form a middle layer. As examples, component 829 may absorb or wick water to manage perspiration within footwear 800, and component 830 may be a compressible polymer foam material that enhances the comfort of footwear 800.

On each side of upper 820, textile element 826 may be thermal bonded to component 830. If one or both of components 829 and 830 incorporate a thermoplastic polymer material, then components 829 and 830 may also be thermal bonded to each other. The process for joining textile element 826 and components 829 and 830 in a layered configuration may, therefore, be similar to the thermal bonding process discussed above for composite element 500.

Figure 53:
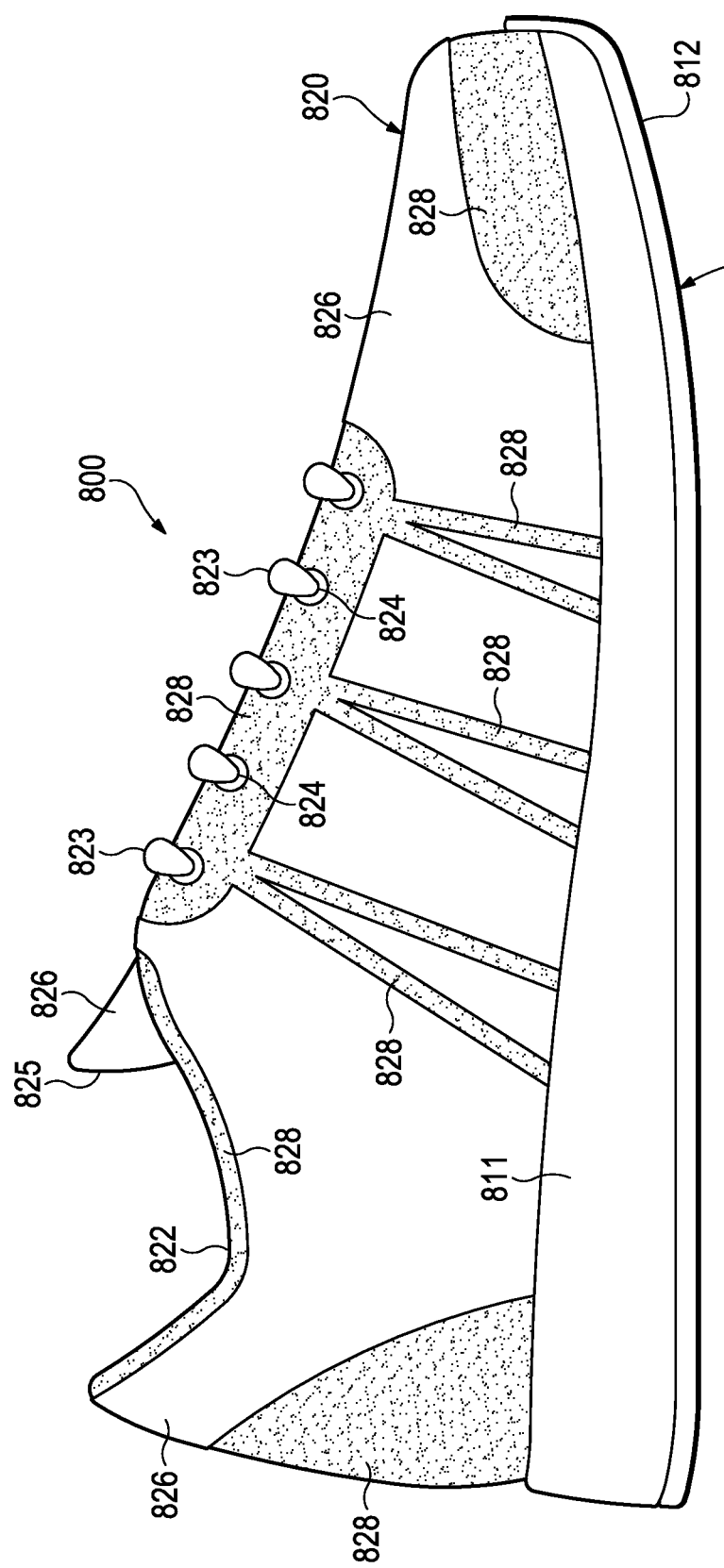
FIG. 53 is an elevational view of a third configuration of the footwear.

A third configuration of footwear 800 is depicted in FIG. 53 as including further examples of fused regions 828. One of fused regions 828 extends around and is proximal to ankle opening 822, which may add greater stretch-resistance to the area around ankle opening 822 and assists with securely-retaining the foot within upper 820. Another fused region 828 is located in the heel region and extends around a rear area of footwear 800 to form a heel counter that resists movement of the heel within upper 820. A further fused region 828 is located in the forefoot area and adjacent to sole structure 810, which adds greater durability to the forefoot area. More particularly, the forefoot area of upper 820 may experience greater abrasive-wear than other portions of upper 820, and the addition of fused region 828 in the forefoot area may enhance the abrasion-resistance of footwear 800 in the forefoot area. An additional fused region 828 extends around lace apertures 824, which may enhance the durability and stretch-resistance of areas that receive lace 823. This fused region 828 also extends downward in various locations to an area that is proximal sole structure 810 in order to enhance the stretch-resistance along the sides of footwear 800. More particularly, tension in lace 823 may place tension in the sides of upper 820. By forming fused regions 828 that extend downward along the sides of upper 820, the stretch in upper 820 may be reduced.

Figure 54:
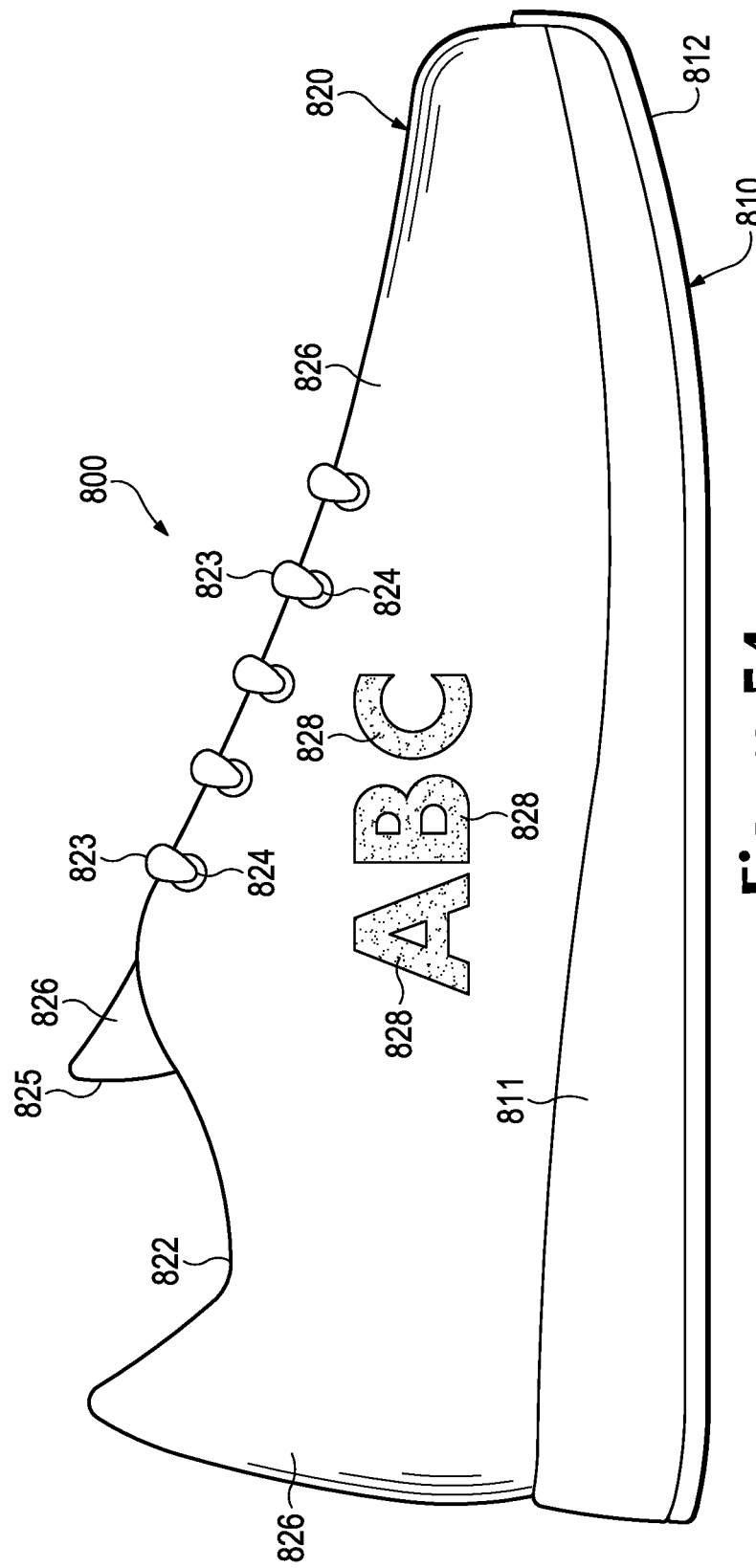
FIG. 54 is an elevational view of a fourth configuration of the footwear.

A fourth configuration of footwear 400 is depicted in FIG. 54 as including three fused region 828 with shapes of the letters "A," "B," and "C." Fused regions 828 may be utilized to modify various properties of textile elements 826, including the properties of permeability, durability, and stretch-resistance. Various aesthetic properties may also be modified by forming fused regions 828, including the transparency, saturation of a color, and contrast in textile elements 826. Utilizing this change in aesthetic properties, fused regions 828 may be utilized to form indicia in areas of footwear 800. That is, fused regions 828 may be utilized to form a name or logo of a team or company, the name or initials of an individual, or an esthetic pattern, drawing, or element. Similarly, fused regions 828 may be utilized to form indicia in shirt 700, other articles of apparel, or any other product incorporating textiles with thermoplastic polymer materials.

As an alternative to forming indicia with fused regions 828, other elements may be thermal bonded to upper 820 to form indicia. For example, a polymer sheet may be cut to form the letters "A," "B," and "C" and then joined with the sides of upper 820 through thermal bonding to textile elements 826. As a related matter, elements of woven textile 300 or knitted textile 400, for example, may be thermal bonded or otherwise joined to various products to form indicia. For example, elements of woven textile 300 or knitted textile 400 with the shapes of the letters "A," "B," and "C" may be thermal bonded to the sides of an article of footwear where the upper is primarily formed from leather, synthetic leather, or any other material. Given that woven textile 300, knitted textile 400, or other textiles incorporating a thermoplastic polymer material may be thermal bonded to a variety of other materials, elements these elements may be thermal bonded to a variety of products in order to form indicia.

Based upon the above discussion, textile elements (e.g., textiles 300 and 400) including a thermoplastic polymer material may be utilized in footwear 800. Other types of footwear may also incorporate structures that are substantially similar to seams 827 (i.e., seams 603, 604). In order to impart different properties to areas of the footwear, various structures that are substantially similar to fused regions 828 (i.e., fused regions 303, 304, 403, 404) may also be utilized. Similarly, other types of footwear may also incorporate structures that are substantially similar to components 829 and 830 (i.e., components 501, 502). By forming fused regions and combining the textile elements with other components, various properties and combinations of properties may be imparted to footwear. That is, the various concepts disclosed herein may be utilized individually or in combination to engineer the properties of footwear to a specific purpose.

L. SHAPING TEXTILES

Figure 55A:
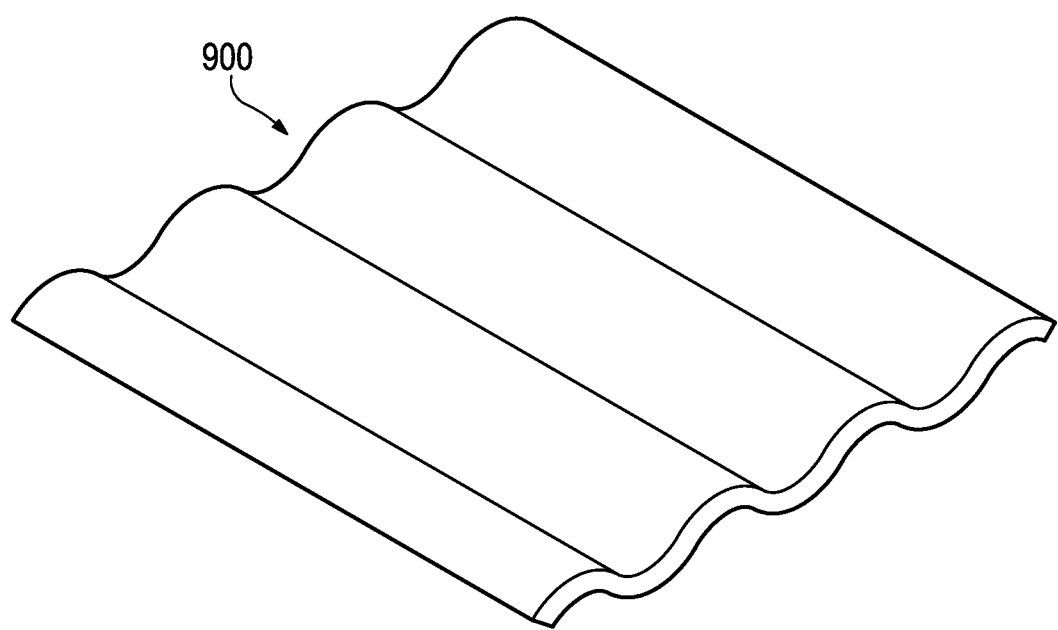
FIGS. 55A-55C are perspective views of shaped textiles.
Figure 55B:
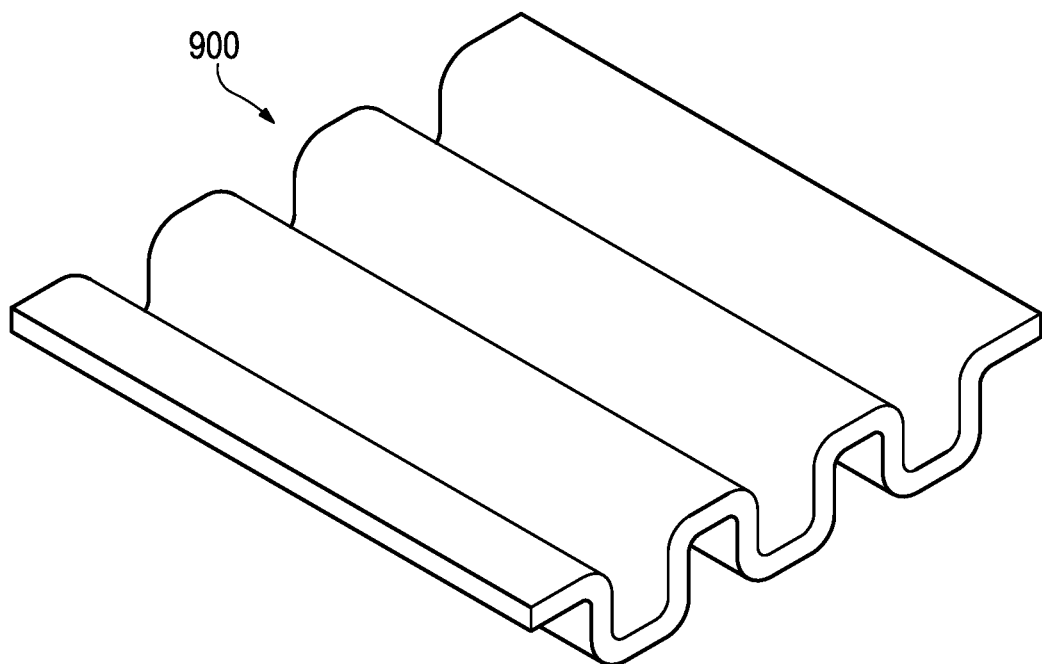
Figure 55C:
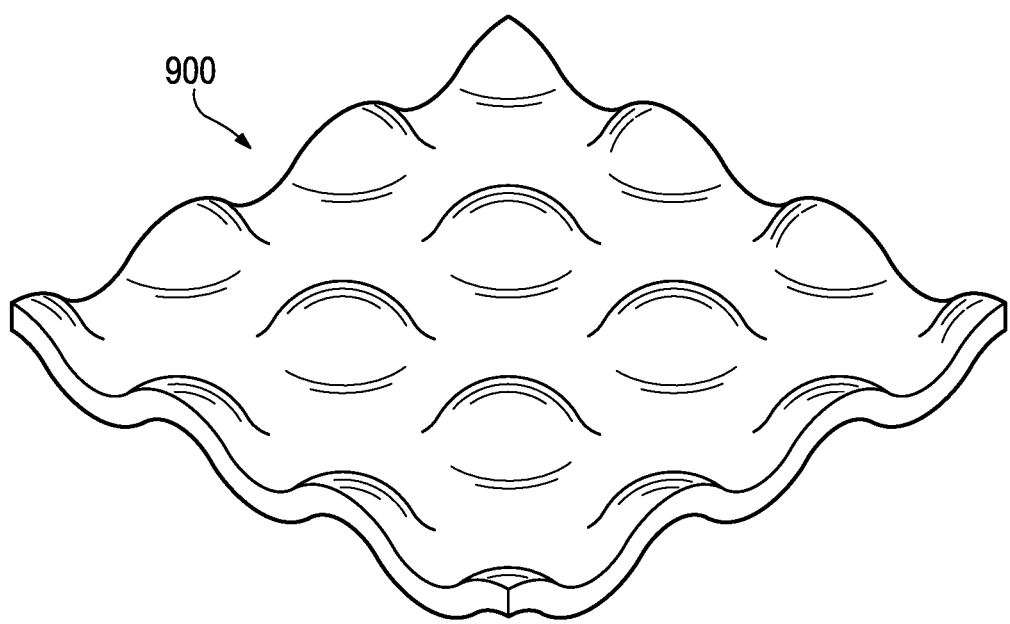

Woven textile 300 and knitted textile 400, as respectively depicted in FIGS. 7 and 9, have a generally planar configuration. Textiles incorporating a thermoplastic polymer material may also exhibit a variety of three-dimensional or otherwise non-planar configurations. As an example, an element of a shaped textile 900 is depicted as having a wavy or undulating configuration in FIG. 55A. Shaped textile 900 may be either of textiles 300 and 400, for example, as well as any textile that includes strands (e.g., yarn 100, thread 200) incorporating a thermoplastic polymer material. A similar configuration with squared waves in shaped textile 900 is depicted in FIG. 55B. As another example, shaped textile 900 may have waves that extend in two directions to impart an egg crate configuration, as depicted in FIG. 55C. Accordingly, shaped textile 900 may be formed to have a variety of three-dimensional or otherwise non-planar configurations.

Figure 56A:
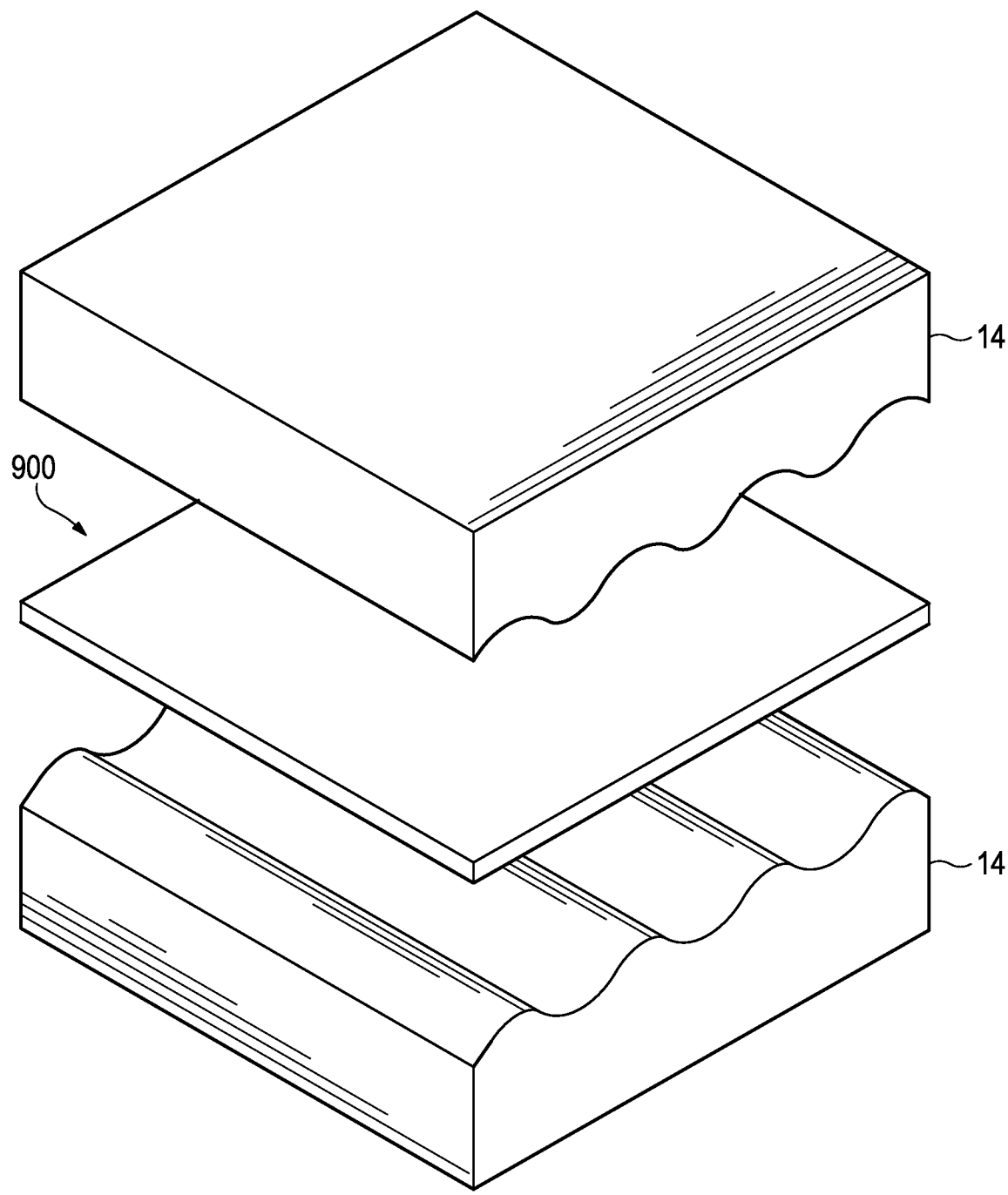
FIGS. 56A-56C are schematic perspective views of a manufacturing process for the shaped textiles.
Figure 56B:
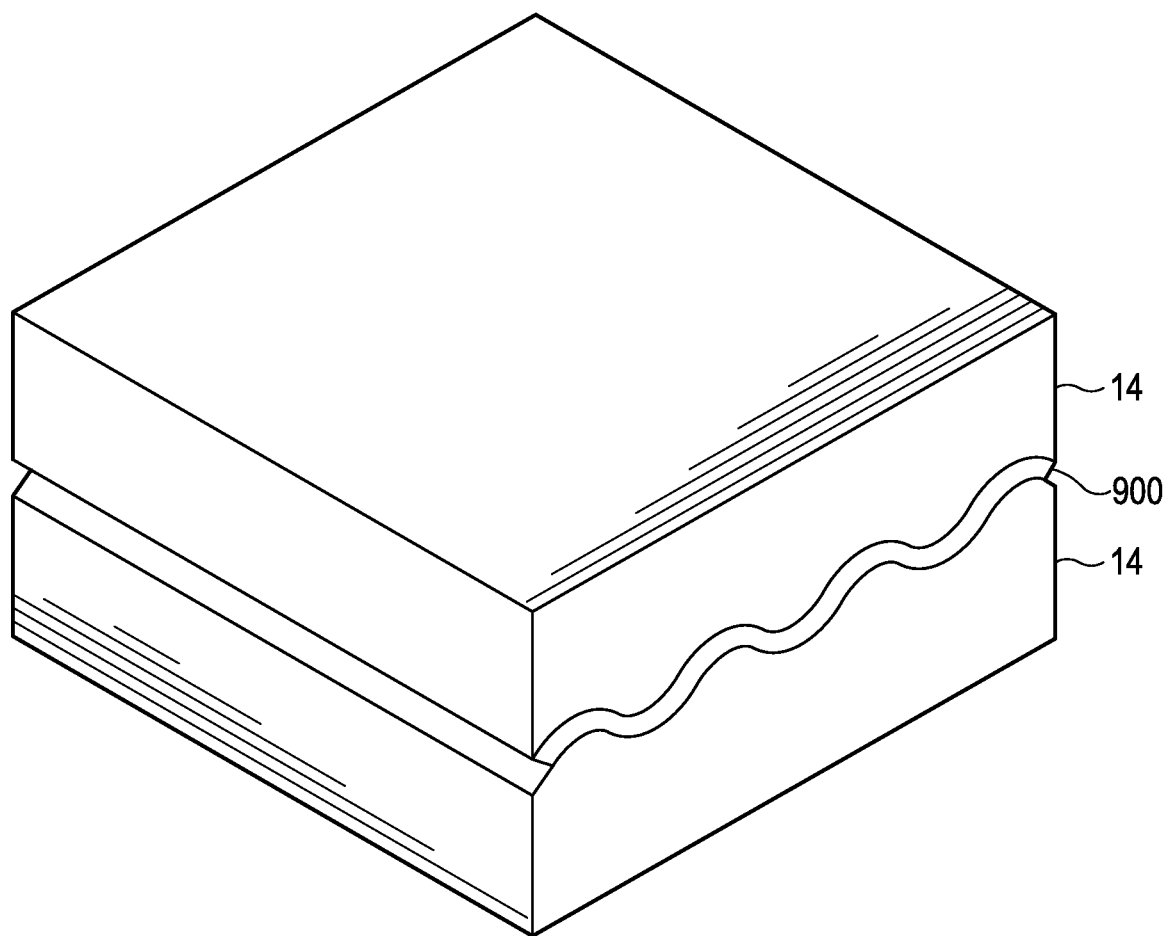
Figure 56C:
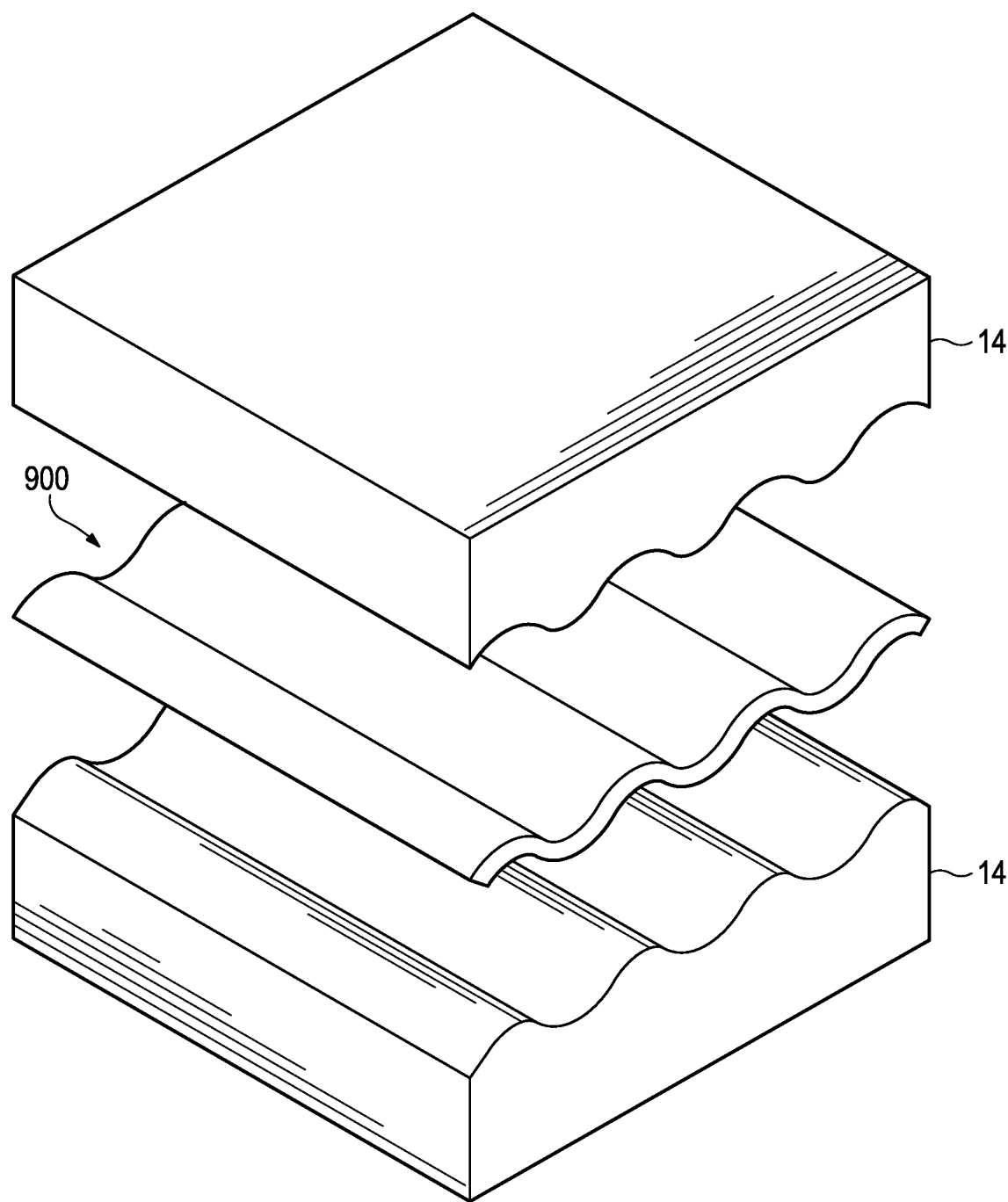

A variety of processes may be utilized to form a three-dimensional configuration in shaped textile 900. In general, however, the processes involve forming thermal bonds within shaped textile 900 to impart the non-planar configuration. Referring to FIGS. 56A-56C, an example of a method is depicted as involving heat press that includes a pair of shaped platens 14, which each have surfaces that correspond with the resulting three-dimensional aspects of shaped textile 900. Initially, shaped textile 900 is located between shaped platens 14, as depicted in FIG. 56A. That is, a planar textile element that becomes shaped textile 900 is located within the heat press, which has non-planar surfaces. Shaped platens 14 then translate or otherwise move toward each other in order to contact and compress shaped textile 900, as depicted in FIG. 56B. In order to form the three-dimensional configuration in shaped textile 900, heat from one or both of shaped platens 14 is applied to shaped textile 900 so as to soften or melt the thermoplastic polymer material within strands forming shaped textile 900. As such, shaped textile 900 is heated to at least a glass transition temperature of the thermoplastic polymer material within shaped textile 900. Upon separating shaped platens 14 and permitting shaped textile 900 to cool, as depicted in FIG. 56C, shaped textile 900 exhibits the three-dimensional configuration from the surfaces of shaped platens 14. In effect, cooling the textile element forming shaped textile 900 sets or otherwise imparts the non-planar configuration. Through this process, shaped textile 900 is molded to have a non-planar configuration, but other shaping or molding processes may be utilized. Although heat may be applied through conduction, radio frequency heating, ultrasonic heating, radiant heating, laser heating, or chemical heating may also be used.

Based upon the above discussion, a textile incorporating a thermoplastic polymer material may be shaped or molded to exhibit a three-dimensional or non-planar configuration. When incorporated into products (e.g., shirt 700, footwear 800), these features may provide both structural and aesthetic enhancements to the products. For example, the three-dimensional configurations may provide enhanced impact force attenuation and greater permeability by increasing surface area.

M. RECYCLING

Woven textile 300 and knitted textile 400 are substantially formed from a thermoplastic polymer material. Given that textile elements 706 of shirt 700 may have the configuration of either of woven textile 300 and knitted textile 400, for example, a majority or substantially all of shirt 700 may be formed from the thermoplastic polymer material. Similarly, a relatively large percentage of footwear 800 may also be formed from a thermoplastic polymer material. Unlike many articles of apparel, therefore, the materials within shirt 700 and footwear 800 may be recycled following their useful lives.

Figure 57:
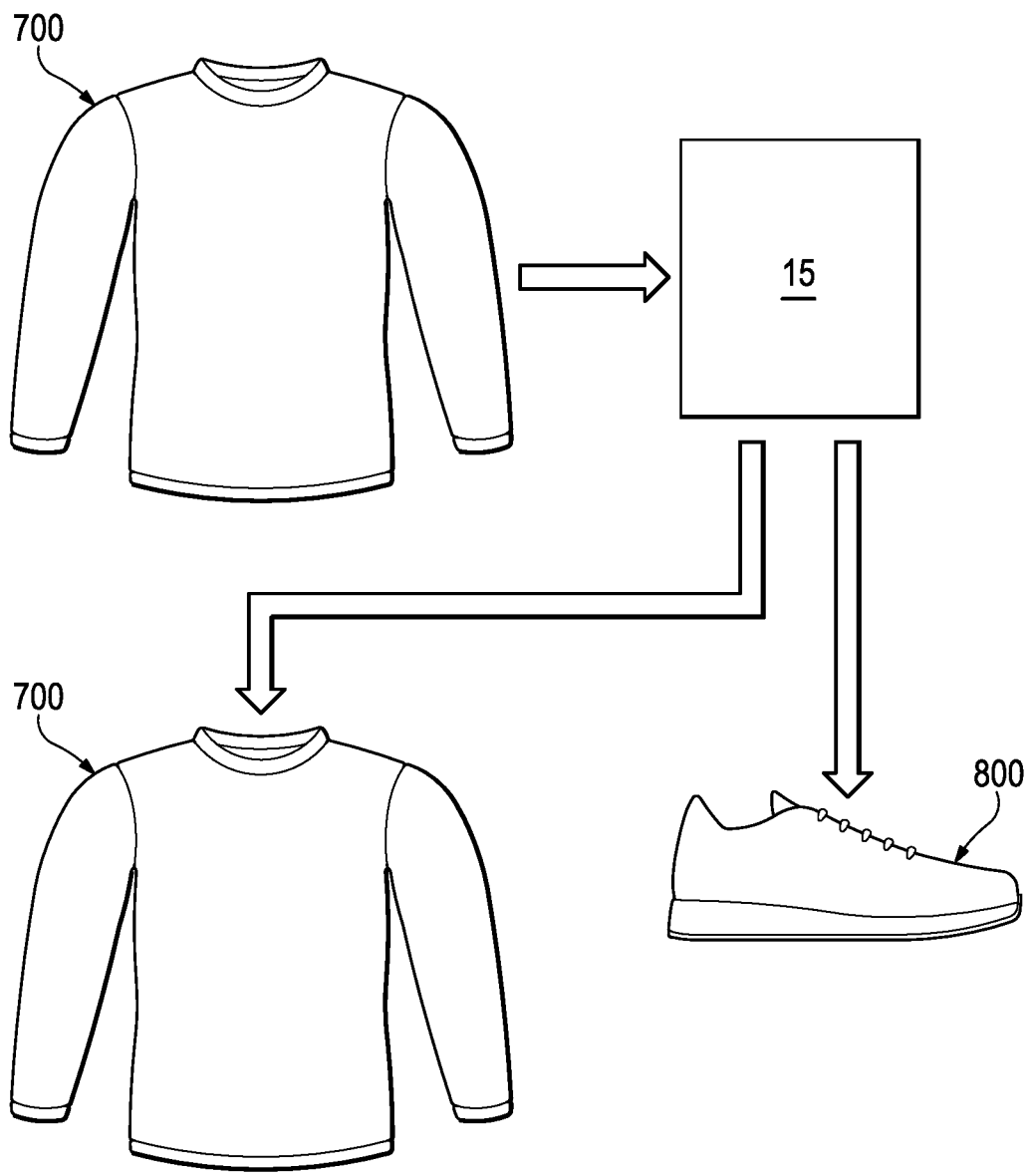
FIG. 57 is a schematic view of a recycling process.

Utilizing shirt 700 as an example, the thermoplastic polymer material from shirt 700 may be extracted, recycled, and incorporated into another product (e.g., apparel, container, upholstery) as a non-woven textile, a woven textile, a knitted textile, a polymer foam, or a polymer sheet. This process is generally shown in FIG. 57, in which shirt 700 is recycled in a recycling center 15, and thermoplastic polymer material from shirt 700 is incorporated into one or more of another shirt 700, footwear 800, or another product. Moreover, given that a majority or substantially all of shirt 700 is formed from the thermoplastic polymer material, then a majority or substantially all of the thermoplastic polymer material may be utilized in another product following recycling. Although the thermoplastic polymer material from shirt 700 was initially utilized within one textile, such as woven textile 300, the thermoplastic polymer material from shirt 700 may be subsequently utilized in another element of textile, such as knitted textile 400. Continuing, the newly-formed shirt 700 and footwear 800 may also be recycled through a similar process. Accordingly, an advantage of forming shirt 700, footwear 800, or other products with the various strands and textiles discussed above relates to recyclability.

N. CONCLUSION

Yarn 100, thread 200, woven textile 300, knitted textile 400, composite element 500, seam element 600, shirt 700, and footwear 800 all are at least partially formed from a thermoplastic polymer material. Various fused regions may be formed in these elements through thermal bonding processes to modify various properties that include permeability, durability, and stretch-resistance. Various components (textiles, polymer sheets, foam layers, strands) may also be secured to or combined with these elements through thermal bonding processes to impart additional properties or advantages. Seams may be formed to join these elements with thermal bonding processes. Accordingly, the various structures and techniques discussed above combined to form numerous products and impart a variety of properties to the products.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of footwear comprising:
an upper comprising a textile that defines at least a top area, a rear area, and a lateral area of the upper, wherein the textile includes a plurality of knitted yarn, wherein the textile comprises:
(i) a first fused region forming a heel counter at the rear area;
(ii) a second fused region forming an indicia at the lateral area that comprises a shape of a logo;
(iii) a plurality of lace apertures positioned adjacent to the top area and the lateral area;
(iv) a tongue filling a void in the upper at the top area; and
(v) a seam that protrudes outward from the upper, the seam includes a length that extends about an outer edge area that is positioned between the top area and the lateral area of the upper, such that the seam positioned between the top area and the latera area is raised radially outwards and the lateral area is separated from the plurality of lace apertures by the seam;
a sockliner disposed within the upper;
a midsole includes a composite element comprising a first component and a second component, the first component including a compressible foam that is thermally coupled to the textile of the upper, and the second component including a plate that is coupled to the compressible foam of the first component;
an outsole coupled to the midsole on an opposite side of the midsole relative to the upper;
the midsole further comprises a plurality of chambers; and
a lace coupled to the upper and received through the plurality of lace apertures;
wherein each of the plurality of knitted yarn of the textile, the compressible foam of the midsole, the outsole, the sockliner, and the lace comprises a thermoplastic polymer material such that substantially all of the article of footwear comprises the thermoplastic polymer material, wherein the thermoplastic polymer material comprises a thermoplastic polyamide, and at least a portion of the thermoplastic polyamide comprises a material extracted or recycled from another article of footwear; and
wherein the plurality of knitted yarn positioned at the first fused region and the second fused region are fused together to form non-filamentous portions along the upper.

2. The article of footwear recited in claim 1, wherein at least ninety-five percent of the article of footwear is formed of the thermoplastic polyamide.

3. The article of footwear recited in claim 1, wherein the non-filamentous portions are configured to increase a stretch-resistance of the textile at the first fused region and the second fused region relative to remaining regions of the textile.

4. The article of footwear of claim 1, wherein the non-filamentous portions are configured to increase a durability of the textile at the first fused region and the second fused region relative to remaining regions of the textile.

5. An article of footwear, comprising:
an upper comprising a textile comprising a plurality of filaments that are spun together to form a plurality of yarn, and the plurality of yarn is knitted together to form the textile, wherein the plurality of filaments compositionally comprise a thermoplastic polymer material;
wherein the textile comprises:
a first set of fused regions positioned along a rear area of the upper, the first set of fused regions forms a heel counter at the rear area that is configured to resist movement of the upper at the rear area;
a second set of fused regions positioned along a side area of the upper, the second set of fused regions forming a shape that is a logo at the side area; and
an edge protruding outwards from the upper, the edge has a longitudinal length disposed below a top area of the upper and above the side area such that the edge separates the top area from the side area and the longitudinal length of the edge is raised radially outwards between the top area and the side area;
a midsole includes a composite element comprising a first component and a second component, the first component including a compressible foam that comprises the thermoplastic polymer material and the second component including a plate that is positioned adjacent to the compressible foam of the first component, wherein the midsole is thermally coupled to the upper along the compressible foam; and
an outsole coupled to the midsole on an opposing side from the upper, the outsole comprises the thermoplastic polymer material;
wherein the thermoplastic polymer material comprises a thermoplastic polyamide such that at least ninety percent of the article of footwear by weight comprises the thermoplastic polyamide.

6. The article of footwear of claim 5, wherein the textile further comprises a tongue positioned along the top area of the upper and defined by the plurality of filaments, such that the tongue comprises the thermoplastic polymer material.

7. The article of footwear of claim 5, wherein the article of footwear by weight that comprises the thermoplastic polyamide equals at least ninety-five percent.

8. The article of footwear of claim 5, wherein the first set of fused regions positioned along the rear area of the upper comprise a linear configuration having a length that extends from the rear area of the upper.

9. The article of footwear of claim 8, wherein the first set of fused regions are configured to increase a stretch-resistance of the textile and inhibit movement of the textile at the rear area of the upper during use of the article of footwear.

10. The article of footwear of claim 5, the textile further comprising a third set of fused regions extending around an ankle opening of the upper, the third set of fused regions is configured to increase a stretch-resistance of the textile and securely retain a foot received within the article of footwear through the ankle opening.

11. The article of footwear of claim 5, wherein at least a portion of the thermoplastic polyamide comprises a material that was extracted or recycled from a mixture of another article of footwear and a shirt.

12. The article of footwear of claim 5, wherein the plurality of filaments positioned at the first fused region and the second fused region are fused together to form non-filamentous portions along the upper.

13. The article of footwear of claim 5, wherein the textile includes a first textile, and the upper further comprises a second textile;
wherein the second textile comprises the plurality of filaments that are spun together to form the plurality of yarn, and the plurality of yarn is knitted together to form the second textile, wherein the plurality of filaments of the second textile compositionally comprise the thermoplastic polymer material;
wherein the second textile is coupled to the first textile along the top area of the upper, such that the first textile and the second textile form the edge that defines a seam that protrudes outward from the upper at a junction between the first textile and the second textile, and the seam extends about an outer edge area of the second textile such that the seam is positioned between the top area and the side area of the upper along a longitudinal length of the second textile; and
wherein at least a portion of the second textile that is positioned adjacent to the seam is raised radially outwards relative to the first textile based on the seam protruding outwards from the upper at the junction between the first textile and the second textile.

14. The article of footwear of claim 5, the midsole further comprising a plurality of chambers.

15. An article of footwear, comprising:
an upper defined by a first textile and a second textile that comprises a plurality of filaments spun together to generate a plurality of yarn, and the plurality of yarn is knitted together to form each of the first textile and the second textile, wherein the plurality of filaments comprise a first thermoplastic polymer material, wherein the first textile comprises a first set of fused regions positioned at a rear of the upper and a second set of fused regions positioned at a side of the upper, and the second textile comprises one or more lace apertures extending radially through the second textile;
a midsole includes a composite element defined by (i) a first component having a first thickness and a first longitudinal length, and (ii) a second component having a second thickness and a second longitudinal length, the first component including a compressible foam that comprises a second thermoplastic polymer material, and the second component including a plate that is positioned below and coupled to a lower surface of the compressible foam, the midsole is coupled to the upper without an adhesive or stitching positioned between the midsole and the upper, and the first thickness is greater than the second thickness along an entirety of the first longitudinal length of the first component relative to the second longitudinal length of the second component;
an outsole coupled to the midsole along the second component such that the outsole is positioned along the midsole opposite from the upper that is coupled to the midsole along the first component, wherein the outsole comprises a third thermoplastic polymer material; and
a lace comprising a fourth thermoplastic polymer material, wherein the lace is coupled to the upper and extends at least partially through the one or more lace apertures of the second textile;
wherein the first textile is bonded to the second textile along an edge that protrudes radially outwards to raise at least a portion of the second textile that is positioned adjacent to the edge radially relative to the first textile; and
wherein the first thermoplastic polymer material, the second thermoplastic polymer material, the third thermoplastic polymer material, and the fourth thermoplastic polymer material comprise a single material, and a percentage of a combined mass of the upper, the midsole, the outsole, and the lace that comprises the single material equals at least ninety percent.

16. The article of footwear of claim 15, wherein the first set of fused regions comprises a linear configuration that extend along the upper from the rear towards the side, wherein the first set of fused regions at least partially define a heel counter of the upper that is configured to resist movement of a foot received within the article of footwear during use of the article of footwear.

17. The article of footwear of claim 15, wherein the first textile further comprises a third set of fused regions positioned at a front of the upper, wherein the plurality of filaments of the first textile are fused together at the third set of fused regions to a lesser thickness extent than the first set of fused regions and the second set of fused regions.

18. The article of footwear of claim 17, wherein the third set of fused regions is configured to increase a durability of the first textile at the front relative to a non-fused region of the upper, and resist abrasion during use of the article of footwear.

19. The article of footwear of claim 15, wherein a transparency or a color of the first textile on at least one of the first set of fused regions and the second set of fused regions varies relative to one or more remaining regions of the upper.

20. The article of footwear of claim 13, wherein the upper includes a plurality of lace apertures that extend through at least the second textile, such that the plurality of lace apertures on the second textile are raised radially outwards relative to the first textile; and
wherein the upper includes a lace coupled to the plurality of lace apertures of the upper and the lace is received through the second textile.

* * * * *